(12) United States Patent
Ohyama et al.

(10) Patent No.: US 7,969,492 B2
(45) Date of Patent: Jun. 28, 2011

(54) IMAGE PICKUP APPARATUS

(75) Inventors: Tatsushi Ohyama, Ogaki (JP);
Toshikazu Ohno, Mizuho (JP)

(73) Assignee: Sanyo Electric Co., Ltd., Osaka (JP)

( * ) Notice: Subject to any disclaimer, the term of this patent is extended or adjusted under 35 U.S.C. 154(b) by 497 days.

(21) Appl. No.: 12/194,140

(22) Filed: Aug. 19, 2008

(65) Prior Publication Data

US 2009/0059049 A1    Mar. 5, 2009

(30) Foreign Application Priority Data

Aug. 28, 2007  (JP) ................................. 2007-221279
Aug. 29, 2007  (JP) ................................. 2007-222555

(51) Int. Cl.
*H04N 5/335*  (2006.01)
*H04N 5/235*  (2006.01)

(52) U.S. Cl. ..................... 348/301; 348/229.1
(58) Field of Classification Search ............... 348/229.1, 348/230.1, 300, 301, 308; 250/208.1; 257/291, 257/292, 293, 294
See application file for complete search history.

(56) References Cited

U.S. PATENT DOCUMENTS

| | | | | |
|---|---|---|---|---|
| 5,337,340 | A * | 8/1994 | Hynecek | 257/246 |
| 6,278,142 | B1 * | 8/2001 | Hynecek | 257/247 |
| 7,538,307 | B1 * | 5/2009 | Lauxtermann | 250/207 |
| 7,821,042 | B2 * | 10/2010 | Nakashima et al. | 257/217 |
| 2005/0219884 | A1 * | 10/2005 | Manabe et al. | 365/10 |
| 2007/0176213 | A1 * | 8/2007 | Oda | 257/247 |
| 2008/0024636 | A1 * | 1/2008 | Oda | 348/308 |
| 2008/0068479 | A1 * | 3/2008 | Ota | 348/294 |
| 2008/0179495 | A1 * | 7/2008 | Shimizu et al. | 250/208.1 |
| 2008/0239129 | A1 * | 10/2008 | Oshima et al. | 348/311 |
| 2009/0001435 | A1 * | 1/2009 | Aurola | 257/292 |
| 2009/0032854 | A1 * | 2/2009 | Nakashima et al. | 257/292 |
| 2009/0086055 | A1 * | 4/2009 | Tower et al. | 348/229.1 |
| 2009/0295952 | A1 * | 12/2009 | Tower et al. | 348/294 |

FOREIGN PATENT DOCUMENTS

JP          07-176721 B2         7/1995

* cited by examiner

*Primary Examiner* — Jason Whipkey
(74) *Attorney, Agent, or Firm* — Ditthavong Mori & Steiner, P.C.

(57) ABSTRACT

An image pickup apparatus includes a plurality of pixels and increasing portions increasing charges stored in the pixels, wherein the frequency of increasing the charges is controlled every group of at least one pixel in response to luminance of light incident upon the pixels by the increasing portions.

20 Claims, 41 Drawing Sheets

IMAGE PICKUP APPARATUS

CROSS-REFERENCE TO RELATED APPLICATIONS

The priority application number JP2007-221279, Image Pickup Apparatus, Aug. 28, 2007, Tatsushi Ohyama, Toshikazu Ohno, JP2007-222555, Image Pickup Apparatus, Aug. 29, 2007, Toshikazu Ohno, Tatsushi Ohyama, upon which this patent application is based is hereby incorporated by reference.

BACKGROUND OF THE INVENTION

1. Field of the Invention

The present invention relates to an image pickup apparatus, and more particularly, it relates to an image pickup apparatus increasing charges stored in pixels.

2. Description of the Background Art

An image pickup apparatus increasing charges stored in pixels is known in general.

A CCD (charge coupled device) image pickup apparatus comprising four gate electrodes, in which a pixel separation barrier, a charge temporary storage well, a charge transfer barrier and a charge accumulation well are formed under the respective gate electrodes, is known in general. In this CCD image pickup apparatus, a high-field region is formed adjacent to each other on an interface between the charge transfer barrier and the charge accumulation well. When charges stored in the temporary storage well pass over the charge transfer barrier and move to the charge accumulation well, the charges are increased in the high-field region by collisional ionization. In this CCD image pickup apparatus, the intensity of an electric field of the high-field region of a frame just after a last frame is controlled as proportional to the luminance value of the last frame. Thus, sensitivity of the CCD image pickup apparatus can be improved.

SUMMARY OF THE INVENTION

An image pickup apparatus according to a first aspect of the present invention comprises a plurality of pixels and increasing portions increasing charges stored in the pixels, wherein the frequency of increasing the charges is controlled every group of at least one pixel in response to luminance of light incident upon the pixels by the increasing portions.

An image pickup apparatus according to a second aspect of the present invention comprises a plurality of pixels, increasing portions increasing charges stored in the pixels and exposure time changing portions changing exposure time of the pixels, wherein control of the frequency of increasing the charges stored in the pixels and control of the exposure time of the pixels are switched every group of at least one pixel in response to luminance of light incident upon the pixels.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

A structure of an image pickup apparatus according to a first embodiment will be described with reference to FIGS. 1 to 4.

Figure 1:
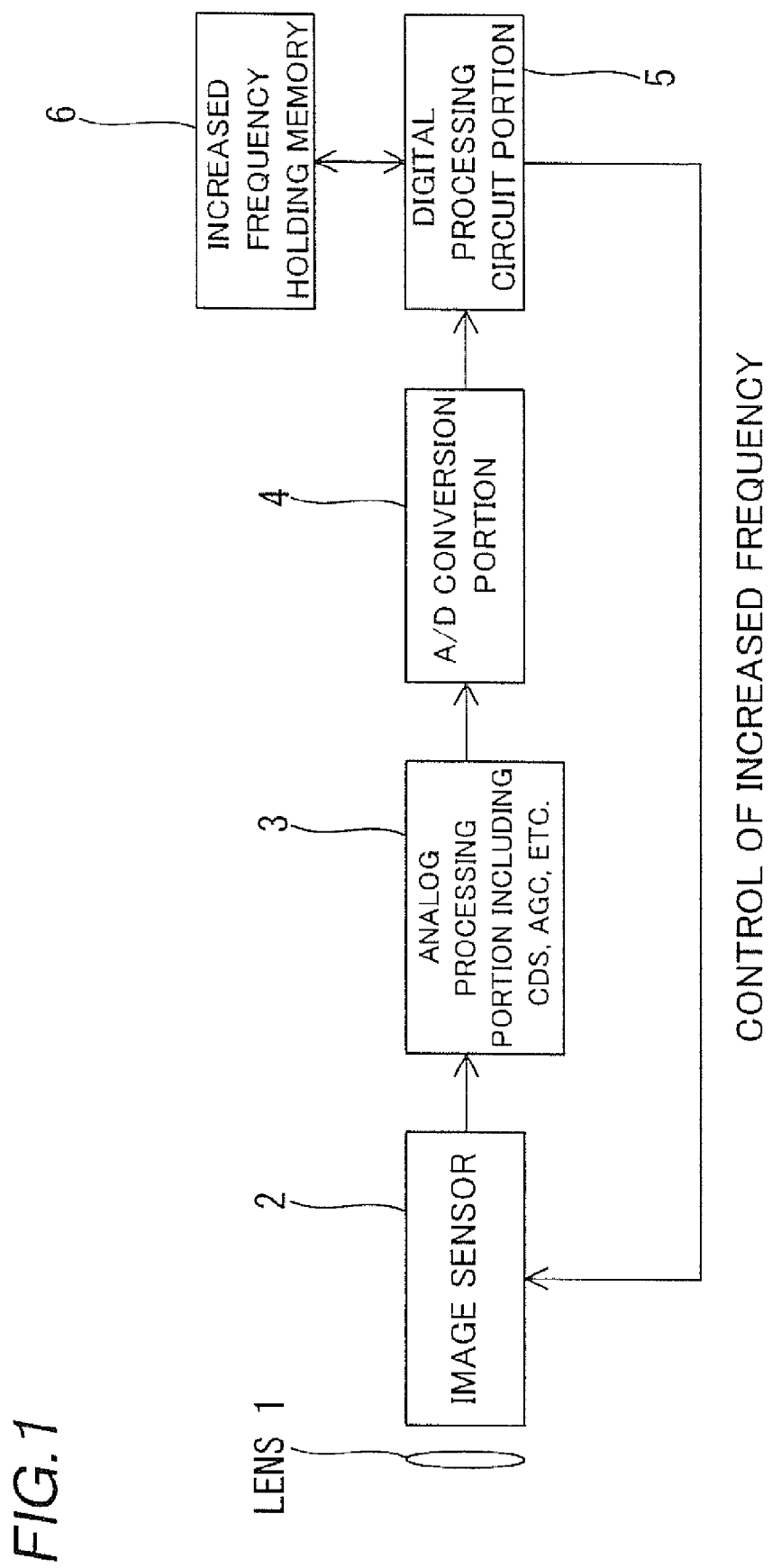
FIG. 1 is a block diagram of a CMOS image pickup apparatus according to a first embodiment of the present invention.

The CMOS image pickup apparatus according to the first embodiment is constituted by a lens 1, an image sensor 2 including charge increasing portions 9 described later, an analog processing portion 3 including CDS (correlated double sampling) for reducing noise, AGC (automatic gain control) for automatically controlling gain and the like, an A/D conversion portion 4 and a digital processing circuit portion 5 and an increased frequency holding memory 6, as shown in FIG. 1.

The image sensor 2 is connected to the analog processing portion 3 and the analog processing portion 3 is connected to the A/D conversion portion 4. The A/D conversion portion 4 is connected to the digital processing circuit portion 5, and the digital processing circuit portion 5 is connected to the increased frequency holding memory 6. The digital processing circuit portion 5 is so formed as to control a frequency of increasing charges in the image sensor 2 on the basis of an increased frequency held in the increased frequency holding memory 6.

Figure 2:
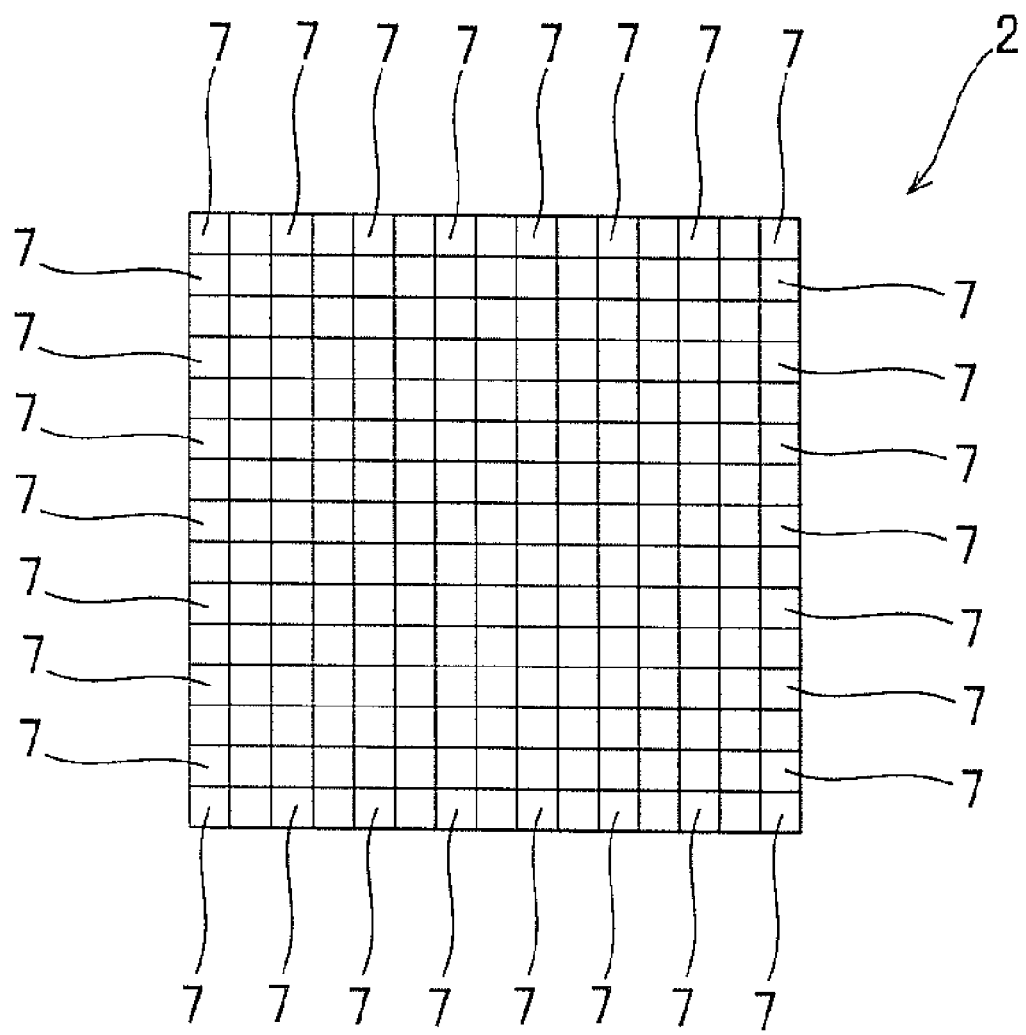
FIG. 2 is a diagram showing an image sensor including a plurality of pixels of the image pickup apparatus according to the first embodiment of the present invention.

As shown in FIG. 2, the image sensor 2 is formed by a plurality of pixels 7 arranged in the form of a matrix. In the first embodiment, the case where the increased frequency is controlled every pixel 7 will be described. The increased frequency may be alternatively controlled every group of two or more pixels in place of every pixel 7.

Figure 3:
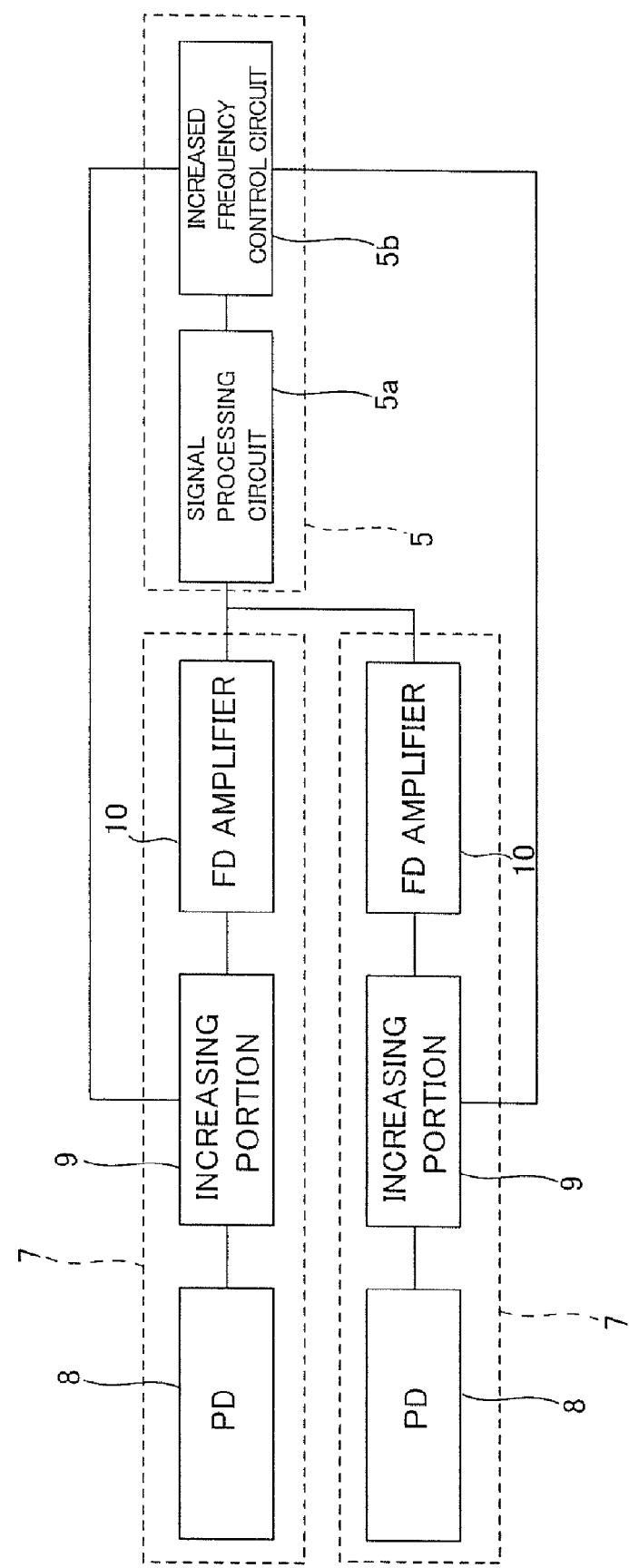
FIG. 3 is a block diagram showing control of increase of the pixels of the image pickup apparatus according to the first embodiment of the present invention.

As shown in FIG. 3, each pixel 7 includes a photodiode (PD) 8 for storing charges generated by photoelectric conversion, having a photoelectric conversion function, the charge increasing portion 9 and a floating diffusion (FD) amplifier 10. The PD 8 is an example of the "storage portion" in the present invention. The PDs 8 are connected to the increasing portions 9 respectively, and the increasing portions 9 are connected to the FD amplifiers 10 respectively. The digital processing circuit portion 5 connected to the FD amplifiers 10 includes a signal processing circuit 5a and an increased frequency control circuit 5b, and the increasing portion 9 of each pixel 7 is so formed as to be independently controlled by the signal processing circuit 5a and the increased frequency control circuit 5b. FIG. 3 shows only two pixels 7 among the plurality of pixels 7 arranged in the form of a matrix.

Figure 4:
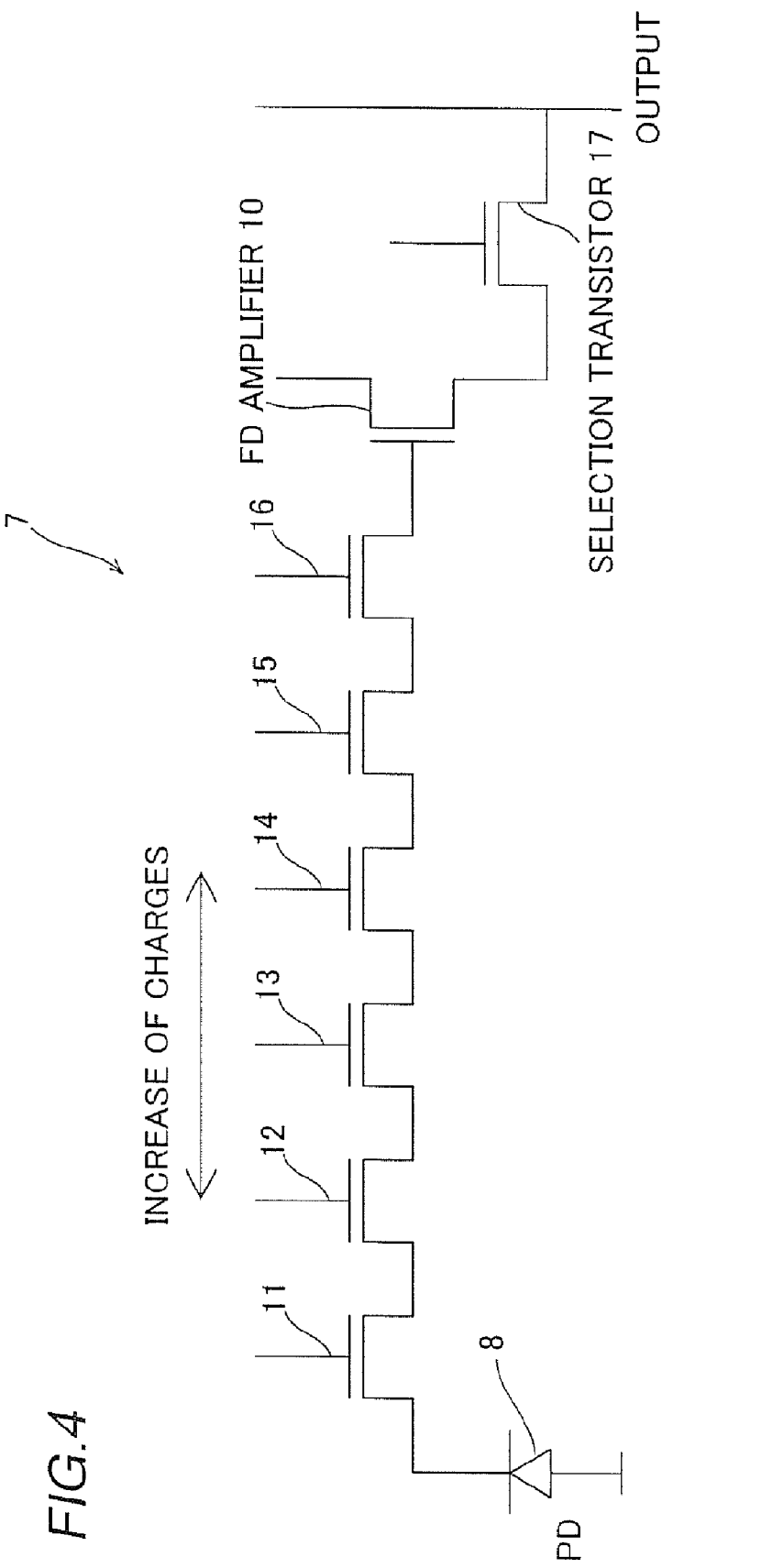
FIG. 4 is a circuit diagram showing a structure of the pixel of the image pickup apparatus according to the first embodiment of the present invention.

As shown in FIG. 4, each pixel 7 includes the PD 8, transfer gate electrodes 11 to 14 provided adjacent to the PD 8, read gate electrodes 15 and 16, the FD amplifier 10 having a gate connected to the read gate electrode 15 and a selection transistor 17 connected to one of source/drain regions of the FD amplifier 10. The transfer gate electrodes 11 to 14 are examples of the "transfer gate electrodes" in the present invention. The transfer gate electrode may be one or at least two. The read gate electrodes 15 and 16 are examples of the "read gate electrodes" in the present invention. The read gate electrode may be one or at least two. According to the first embodiment, an operation of increasing charges is performed under the transfer gate electrodes 12 to 14. The read gate electrode 15 is so formed as to control output in a column direction of the pixels 7 arranged in the form of a matrix and the read gate electrode 16 is so formed as to control output in a row direction. The read gate electrode 15 may be so formed as to control output in the row direction of the pixels 7 and the read gate electrode 16 may be so formed as to control output in the column direction.

An operation of the image pickup apparatus according to the first embodiment of the present invention will be described with reference to FIGS. 5 and 6. In the operation of the image pickup apparatus, the frequency of increasing charges is controlled on the basis of the image information of a last frame and different every pixel 7. In this embodiment, the frequency of increase is set to 0 time, 100 times and 200 times for the respective pixels 7 on the basis of the image information of a last frame. The number of the pixels in the frame is 25 pixels of 5×5 as an example.

Figure 5:
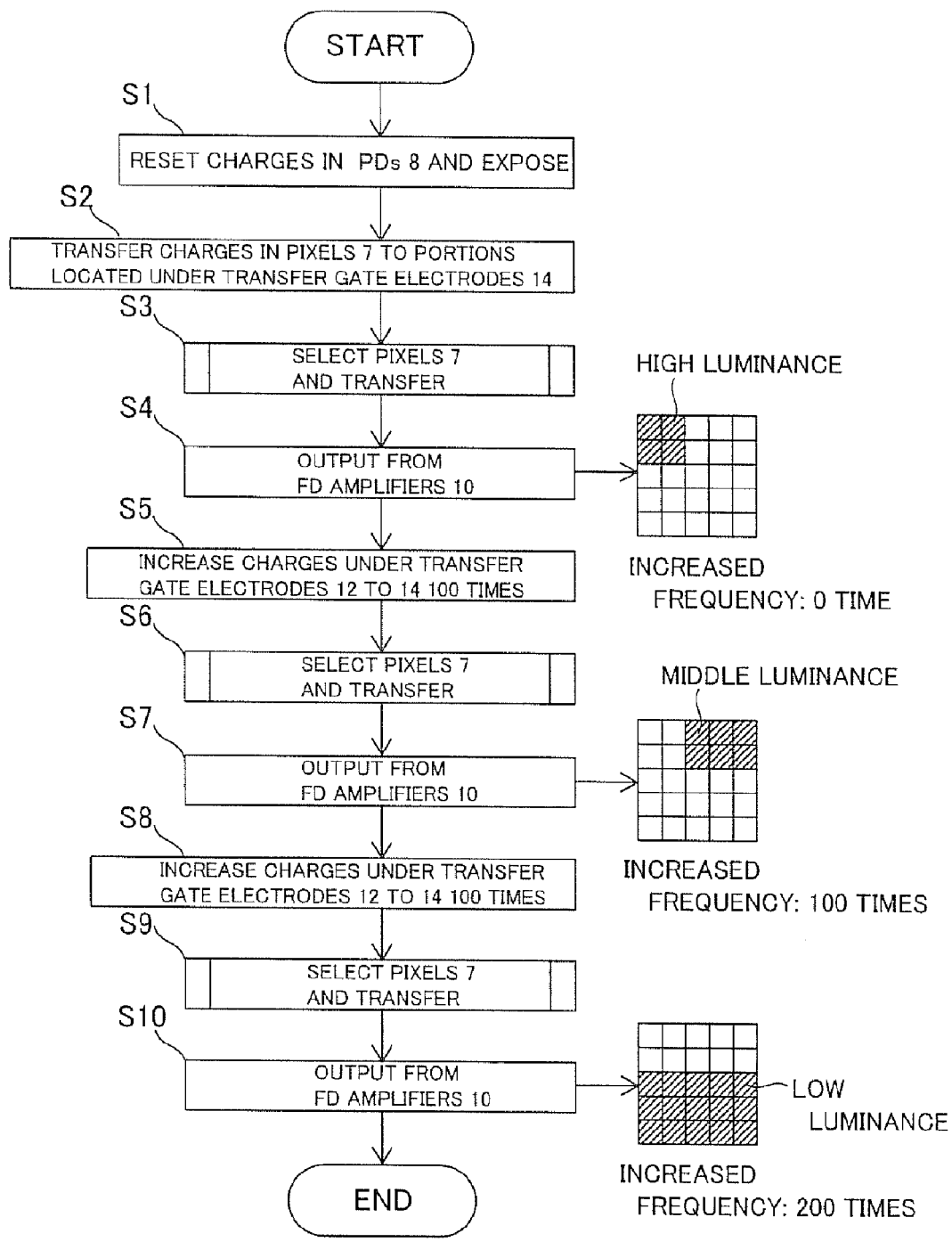
FIG. 5 is a flowchart showing control flow of an operation of the image pickup apparatus according to the first embodiment of the present invention.
Figure 6:
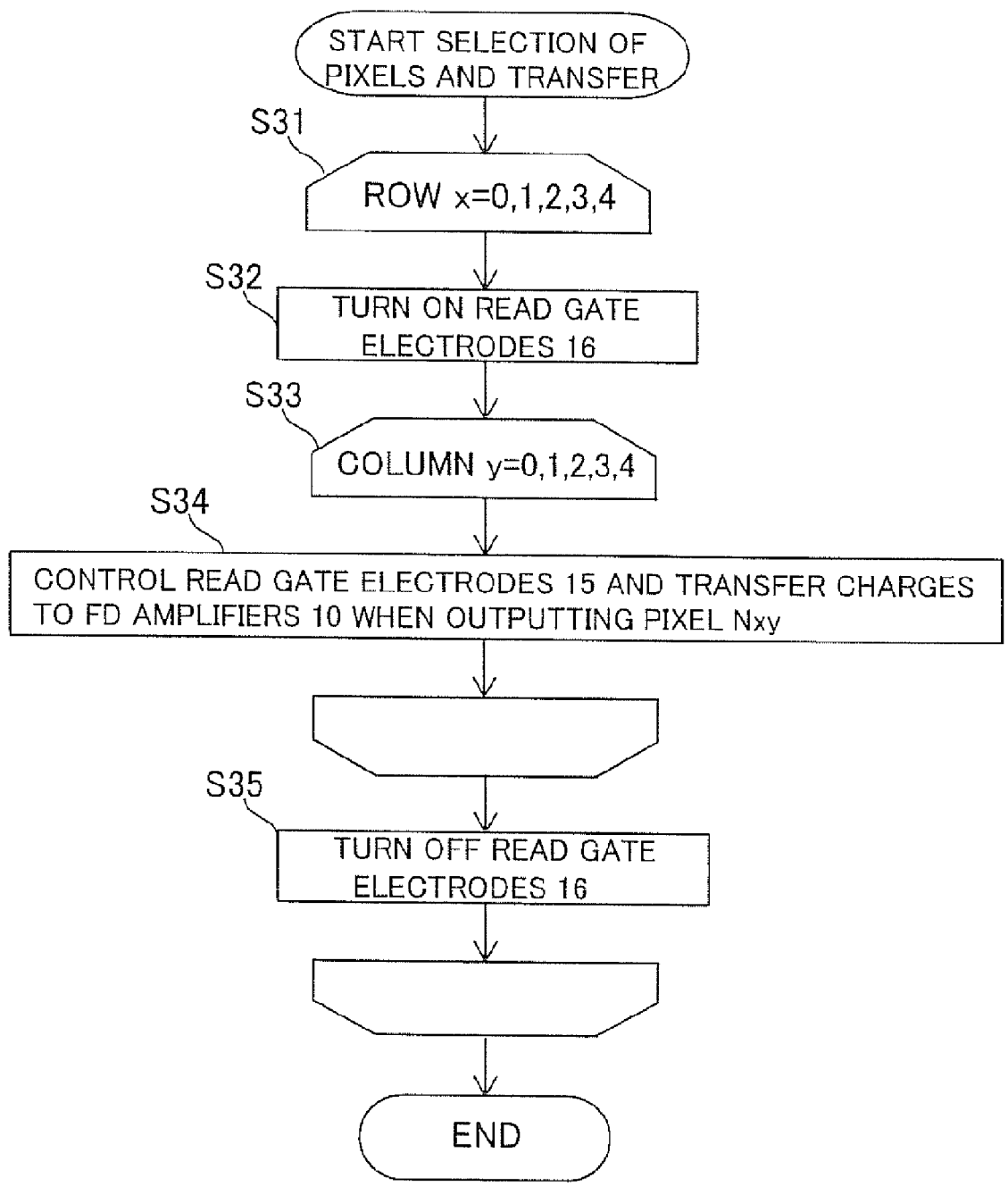
FIG. 6 is a flowchart showing control flow of selection of the pixels of the image pickup apparatus according to the first embodiment of the present invention.

As shown in FIG. 5, pixels 7 are exposed after resetting charges to be stored in the PDs 8 at a step S1. Thus, the charges are stored in the PDs 8. Then, the charges stored in the PDs 8 are stored in portions located under the transfer gate electrodes 14 through portions located under the transfer gate electrodes 11 to 13 at a step S2.

At a step S3, the prescribed pixels 7 (having high luminance) are selected, and the charges stored in the portions located under the transfer gate electrodes 14 are transferred to the FD amplifiers 10. More specifically, the pixels 7 at the 0th row are selected and the read gate electrodes 16 are turned on at a step S31, as shown in FIG. 6. Then the pixels 7 at the zeroth column to the fourth column are successively selected at a step S33. At this time, when the luminance of the pixels 7 is high, the read gate electrodes 15 are turned on and the charges stored in the pixels 7 are transferred to the FD amplifiers 10. The read gate electrodes 16 are turned off at a step S35. Similarly, the charges stored in the pixels 7 having high luminance are transferred to the FD amplifiers 10 by successively performing the row selection operation of the step S31 from the first row to the fourth row.

As shown in FIG. 5, signals are output from the FD amplifiers 10 of the pixels 7 having high luminance by turning on the selection transistors 17 (see FIG. 4) at a step S4. The signals output at the step S4 are not increased.

At a step S5, charges are increased between the portions located under the transfer gate electrodes 12 to 14. More specifically, charges are increased in the high-field regions formed on interfaces between the portions located under the transfer gate electrodes 12 and the portions located under the transfer gate electrodes 13 by collisional ionization when the charges stored in the temporary storage wells formed on the portions located under the transfer gate electrodes 14 get over the charge transfer barriers formed on the portions located under the transfer gate electrodes 13 and move to the charge accumulation wells formed on the portions located under the transfer gate electrodes 12. The high-field region formed on the interface between the portion located under the transfer gate electrode 12 and the portion located under the transfer gate electrode 13 is an example of the "increasing portion" in the present invention. The charges are repeatedly moved between the temporary storage wells and the charge accumulation wells so that the charges are further increased. At this time, the charges are increased 100 times. Although this increase of the charges is performed for all of the pixels 7 in the image sensor 2 (see FIG. 2), any influence is not exerted on the image even when the operation of increasing charges in the pixels 7 having high luminance is performed since signals of the pixels 7 having the high luminance are already output at the step S4.

At a step S6, the charges in the pixels 7 (having middle luminance) on a prescribed region of the image sensor 2 are transferred to the FD amplifiers 10, similarly to the step S3. Thereafter signals of the pixels 7 having the middle luminance are output at a step S7.

At a step S8, the charges are increased between the portions located under the transfer gate electrodes 12 to 14 similarly to the step S5. At this time, the charges are increased 100 times. Thus, the charges are increased 200 times in total by adding the frequency of increasing charges at the step S5. The increase of the charges is performed for all of the pixels 7 in the image sensor 2 similarly to the step S5.

At a step S9, the charges in the pixels 7 (having low luminance) on a prescribed region of the image sensor 2 are transferred to the FD amplifiers 10 similarly to the steps S3 and S6. Thereafter signals of the pixels 7 having low luminance are output at the step S9.

Digital composition of the image will be now described with reference to FIG. 7.

Figure 7:
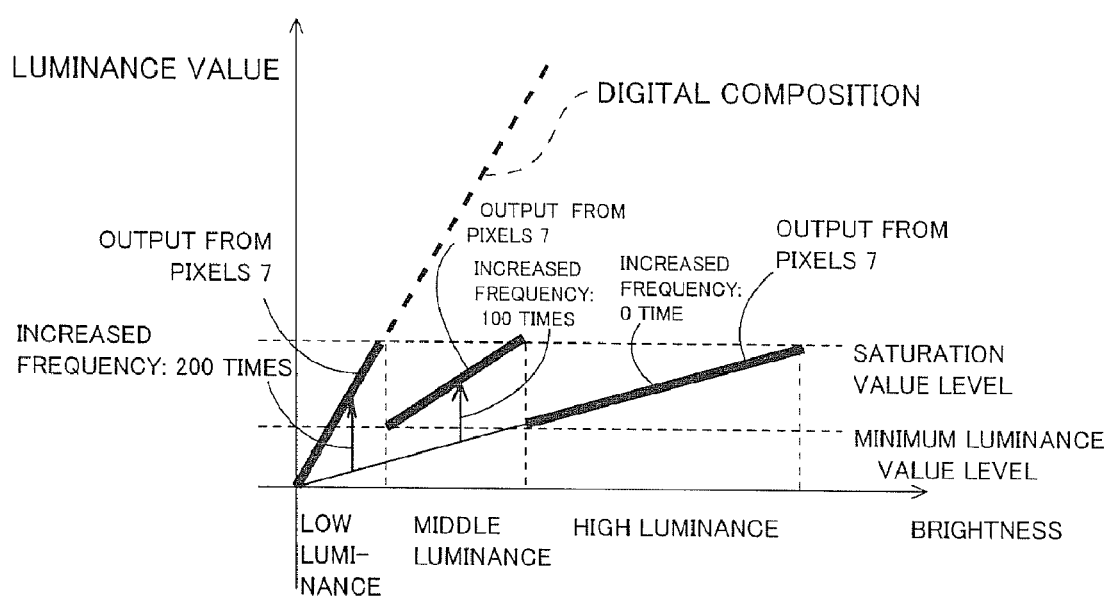
FIG. 7 is a diagram showing the relation between brightness (luminance) of light incident upon the pixels and a luminance value after increasing charges.

As shown in FIG. 7, the light incident upon the pixels 7 is bright (high luminance), the charges are not increased (0 time). In this case, the luminance of the light incident upon the pixels 7 is luminance values output from the pixels 7. When the light incident upon the pixels 7 is middle (middle luminance), the charges are increased 100 times and the luminance of the increased charges is the luminance values output from the pixels 7. Then the light incident upon the pixels 7 is dark (low luminance), the charges are increased 200 times, and the luminance of the increased charges is the luminance values output from the pixels 7. The digital composition of the image is performed with reference to the luminance values output from all of the pixels 7 and the frequency of increasing charges.

An operation of the frequency of increasing charges according to the first embodiment of the present invention will be described with reference to FIG. 8. The case where the frequency of increasing charges is controlled independently every pixel in the plurality of pixels 7 included in the image sensor 2 will be described.

Figure 8:
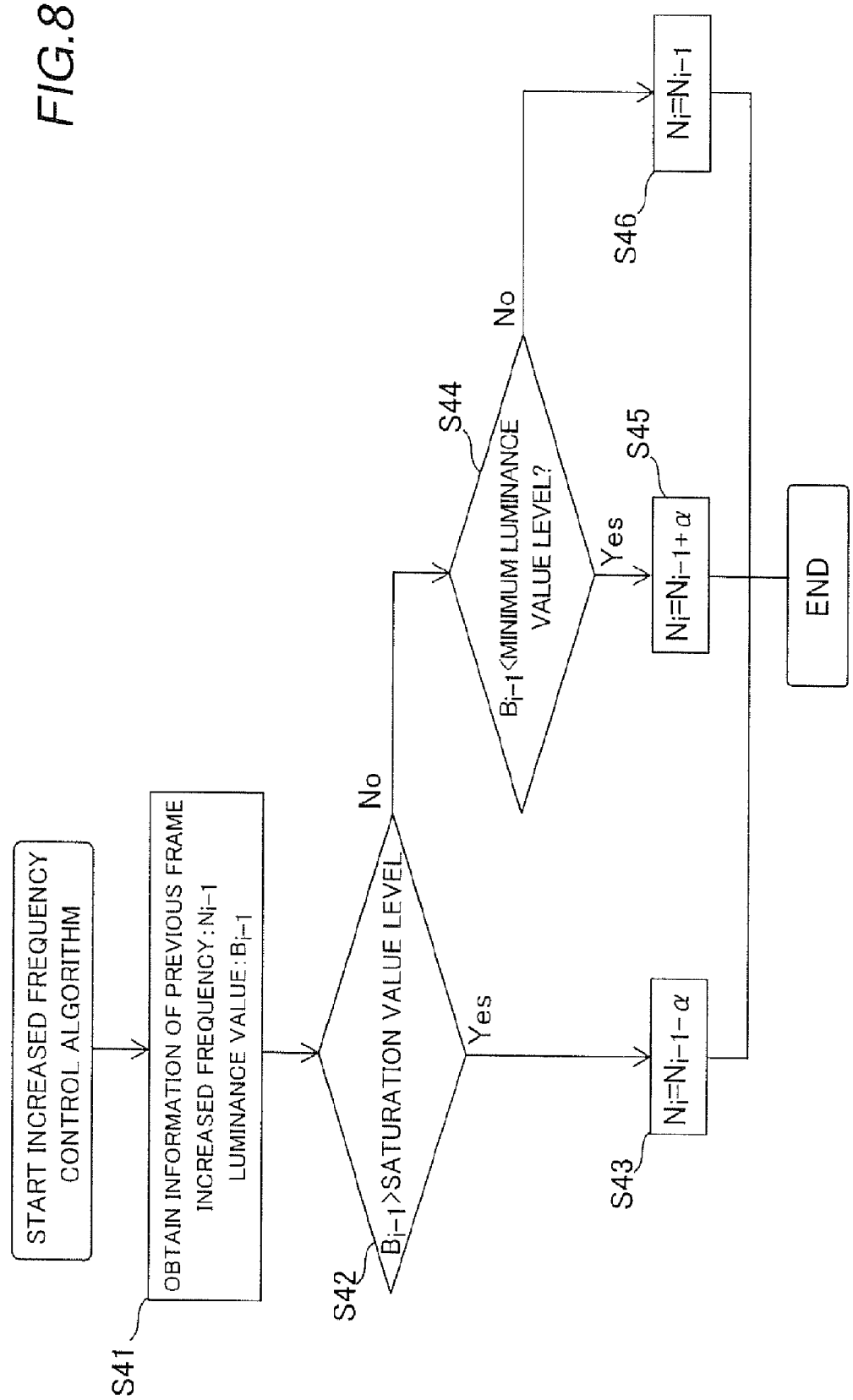
FIG. 8 is a flowchart showing control flow of the frequency of increase of the charges of the image pickup apparatus according to the first embodiment of the present invention.

As shown in FIG. 8, the information of a frequency ($N_{i-1}$) of increasing charges in prescribed pixels 7 of a last frame and luminance ($B_{i-1}$) for the prescribed pixels 7 of the last frame are at a step S41. At a step S42, it is determined whether the luminance ($B_{i-1}$) of each prescribed pixel 7 of the last frame is higher or lower than the saturation value level of each pixel 7. The saturation value level means a maximum level capable of obtaining linear characteristics in the relation between brightness of the light incident upon each pixel 7 and the luminance value. The saturation value level is an example of the "first luminance value level" in the present invention. The luminance value other than the saturation value level may be employed as the first luminance value level. When the luminance ($B_{i-1}$) of the prescribed pixel 7 of the last frame is higher than the saturation value level of the pixel 7, the process proceeds to a step S43 and a frequency ($N_i$) of increasing charges in the prescribed pixel 7 of a current frame is calculated by subtracting a certain frequency ($\alpha$) from the frequency ($N_{i-1}$) of increasing charges in the prescribed pixel 7 of the last frame. According to the first embodiment, the certain frequency ($\alpha$) is set to 100 times (see FIG. 5). The certain frequency ($\alpha$) may be the number of times other than 100 times or may be increased logarithmically.

When the prescribed luminance ($B_{i-1}$) of each prescribed pixel 7 of the last frame is lower than the saturation value level of each pixel 7 at the step S42, the process proceeds to a step S44. At this time, it is determined whether the luminance ($B_{i-1}$) of the prescribed pixel 7 of the last frame is higher or lower than the minimum luminance value level of the pixel 7. The minimum luminance value level means a minimum level capable of obtaining prescribed accuracy of the image pickup apparatus in the relation between brightness of the light incident upon each pixel 7 and the luminance value. The minimum luminance value level is an example of the "second luminance value level" in the present invention. The luminance value other than the minimum luminance value level may be employed as the second luminance value level. When the luminance ($B_{i-1}$) of the prescribed pixel 7 of the last frame is lower than the minimum luminance value level of the pixel 7, the process proceeds to a step S45 and the frequency ($N_i$) of increasing charges in the prescribed pixel 7 of the current frame is calculated by adding the certain frequency ($\alpha$) to the frequency ($N_{i-1}$) of increasing charges in the prescribed pixel 7 of the last frame. When the luminance ($B_{i-1}$) of the prescribed pixel 7 of the last frame is higher than the minimum luminance value level of the pixel 7, the process proceeds to a step S46 and the frequency ($N_i$) of increasing charges in the prescribed pixel 7 of the current frame is set to the same number of times as the frequency ($N_{i-1}$) of increasing charges in the prescribed pixel 7 of the last frame. Thus, the frequency of increasing charges of the prescribed pixel 7 of the current frame is calculated by the frequency ($N_{i-1}$) of increasing charges in the prescribed pixel 7 of the last frame and the luminance ($B_{i-1}$) of the prescribed pixel 7 of the last frame. According to the first embodiment, when the luminance of the light incident upon the pixel 7 is higher than the saturation value level, the frequency of increasing charges is reduced, while when the luminance of the light incident upon the pixel 7 is lower than the minimum luminance value level, feed back control increasing the frequency of increasing charges is performed.

The control of the frequency of increasing charges may be performed every region of the image sensor 2 or may be performed every frame. Alternatively, the control of the frequency of increasing charges may be parallelized for all of the pixels 7 or may be serially processed every pixel 7.

According to the first embodiment, as hereinabove described, the increasing portions 9 are so formed that the frequency of increasing charges is controlled every pixel in response to the luminance of the light incident upon the pixels 7, whereby the frequency of increasing charges is reduced on bright portions in an image while the frequency of increasing charges is increased on dark portions in the image even when the bright portions and the dark portions mix in the image of one frame. Thus, reduction in the dynamic range of the image pickup apparatus can be suppressed. Dispersion of the quantities of the increased charges can be easily suppressed by controlling the frequency of increasing charges dissimilarly to the case where the quantities of the increased charges are changed by changing voltages applied to the increasing portions 9. The similar effects can be obtained also when the increasing portions 9 may be so formed that the frequency of increasing charges is controlled every group of two or more pixels.

According to the first embodiment, as hereinabove described, the frequency of increasing charges is so controlled that the frequency of increasing charges is reduced when the luminance value obtained from the luminance of the light incident upon the pixels 7 is higher than the saturation value levels of the pixels 7, while the feed back control increasing the frequency of increasing charges is performed when the luminance value obtained from the luminance of the light incident upon the pixels 7 is lower than the minimum luminance value level, whereby the frequency of increasing charges can be dynamically changed. Thus, a proper image can be easily obtained.

Second Embodiment

In a second embodiment, a structure of an image pickup apparatus controlling the frequency of increasing charges every frame will be described with reference to FIG. 9, dissimilarly to the aforementioned first embodiment.

Figure 9:
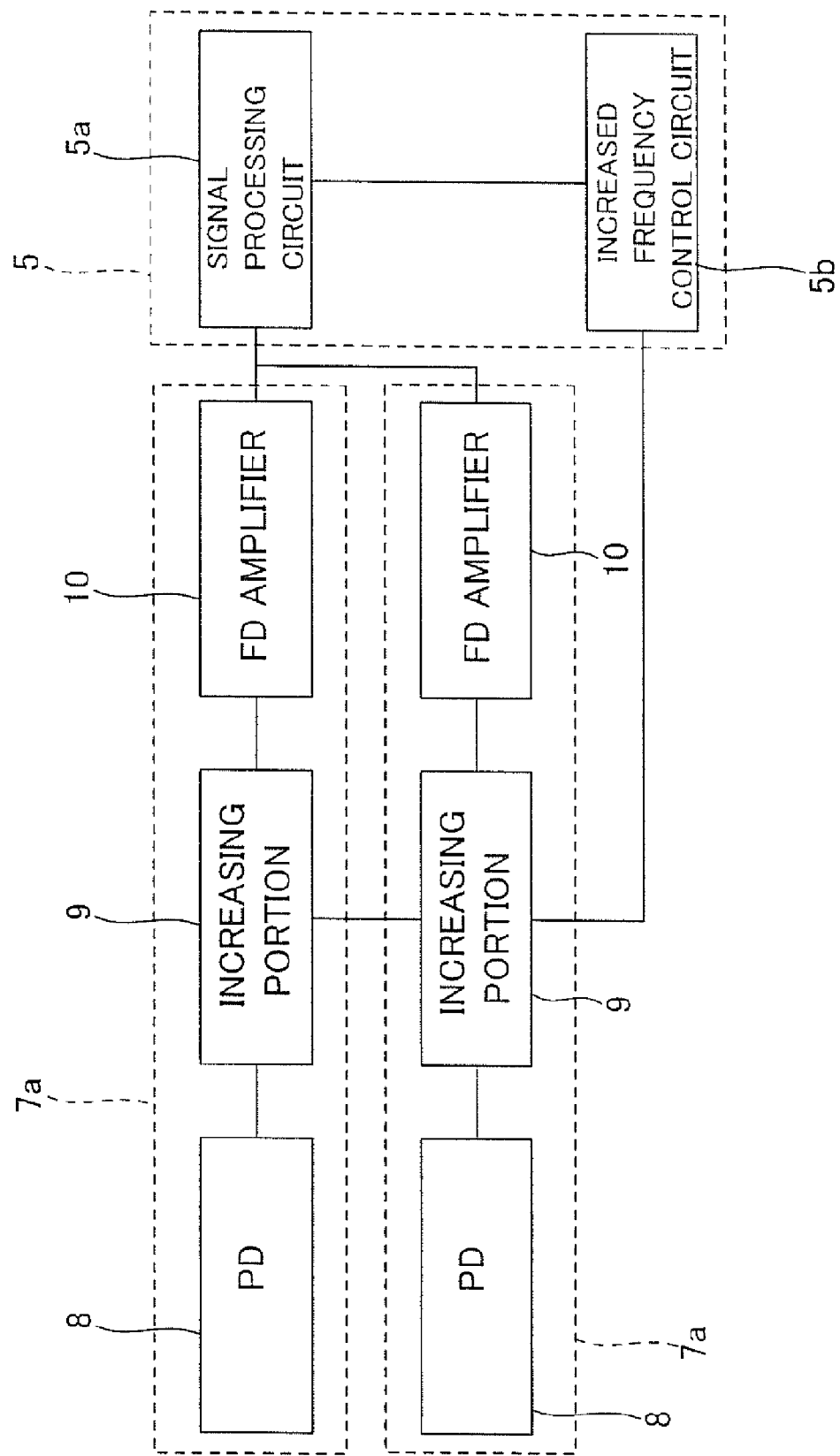
FIG. 9 is a block diagram of control of increasing portions of pixels of an image pickup apparatus according to a second embodiment of the present invention.

Each of pixels 7a of the image pickup apparatus according to this second embodiment includes a PD 8, a charge increasing portion 9 and an FD amplifier 10, as shown in FIG. 9. The digital processing circuit portion 5 includes a signal processing circuit 5a and an increased frequency control circuit 5b, and the signal processing circuit 5a and the increased frequency control circuit 5b give the same control to the increasing portions 9 of all of the pixels 7a included in the image sensor 2. FIG. 9 shows only two pixels 7a among the plurality of pixels 7a arranged in the form of a matrix.

The remaining structure of the second embodiment is similar to that of the aforementioned first embodiment.

An operation of the image pickup apparatus according to the second embodiment of the present invention will be described with reference to FIG. 10.

Figure 10:
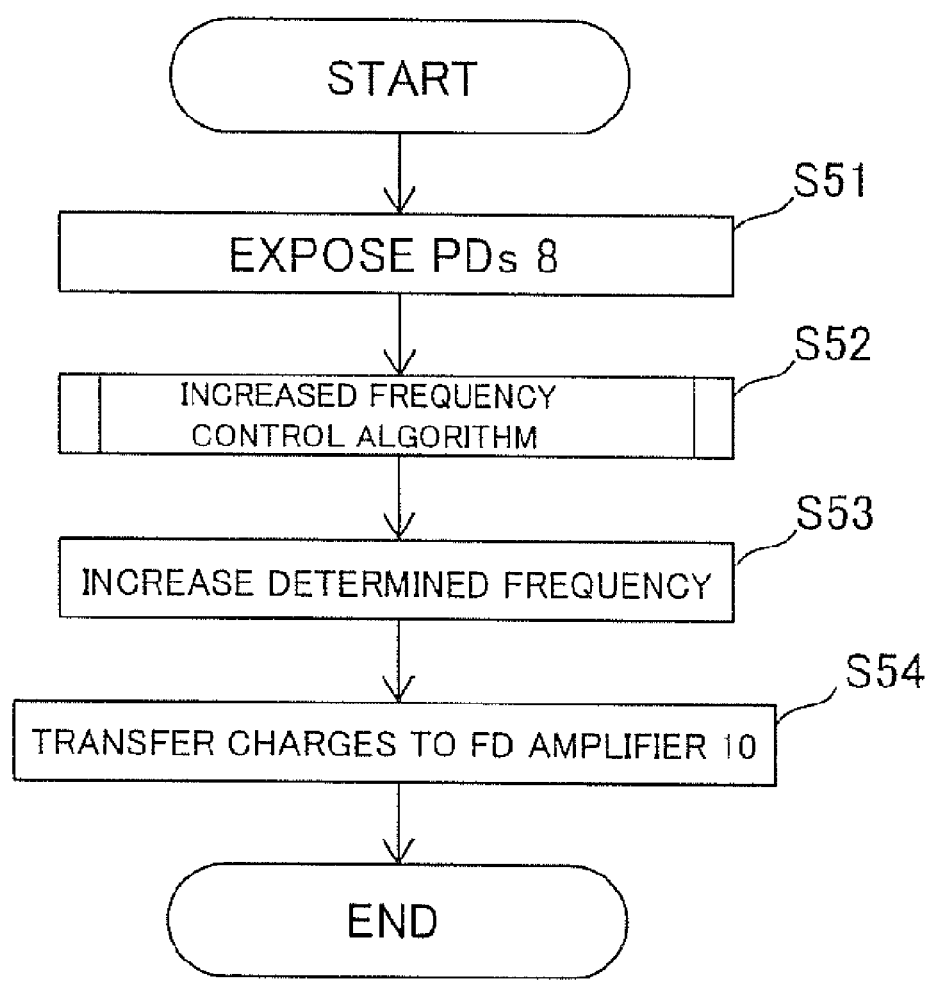
FIG. 10 is a flowchart showing control flow of the image pickup apparatus according to the second embodiment of the present invention.

As shown in FIG. 10, the PDs 8 (see FIG. 9) are exposed at a step S51. At a step S52, the frequency of increasing charges is controlled on the basis of the image information of a last frame. This control of the frequency of increasing charges at this step S52 is similar to that shown in FIG. 8. At a step S53, the charges are increased on the basis of the frequency determined at the step S52. Thereafter the charges are transferred to the FD amplifiers 10 (see FIG. 9) at a step S54.

According to the second embodiment, as hereinabove described, the frequency of increasing charges are controlled so that dispersion of the quantities of the increased charges can be easily suppressed dissimilarly to the case where the quantities of the increased charges are changed by changing voltages applied to the increasing portions 9.

According to the second embodiment, as hereinabove described, the frequency of increasing the charges is controlled every frame in response to the luminance of light incident upon the pixels 7, whereby the control can be simplified as compared with the case where the frequency of increasing charges is controlled every pixel 7.

Third Embodiment

A structure of a CCD image pickup apparatus according to a third embodiment will be described with reference to FIG. 11, dissimilarly to the aforementioned second embodiment.

Figure 11:
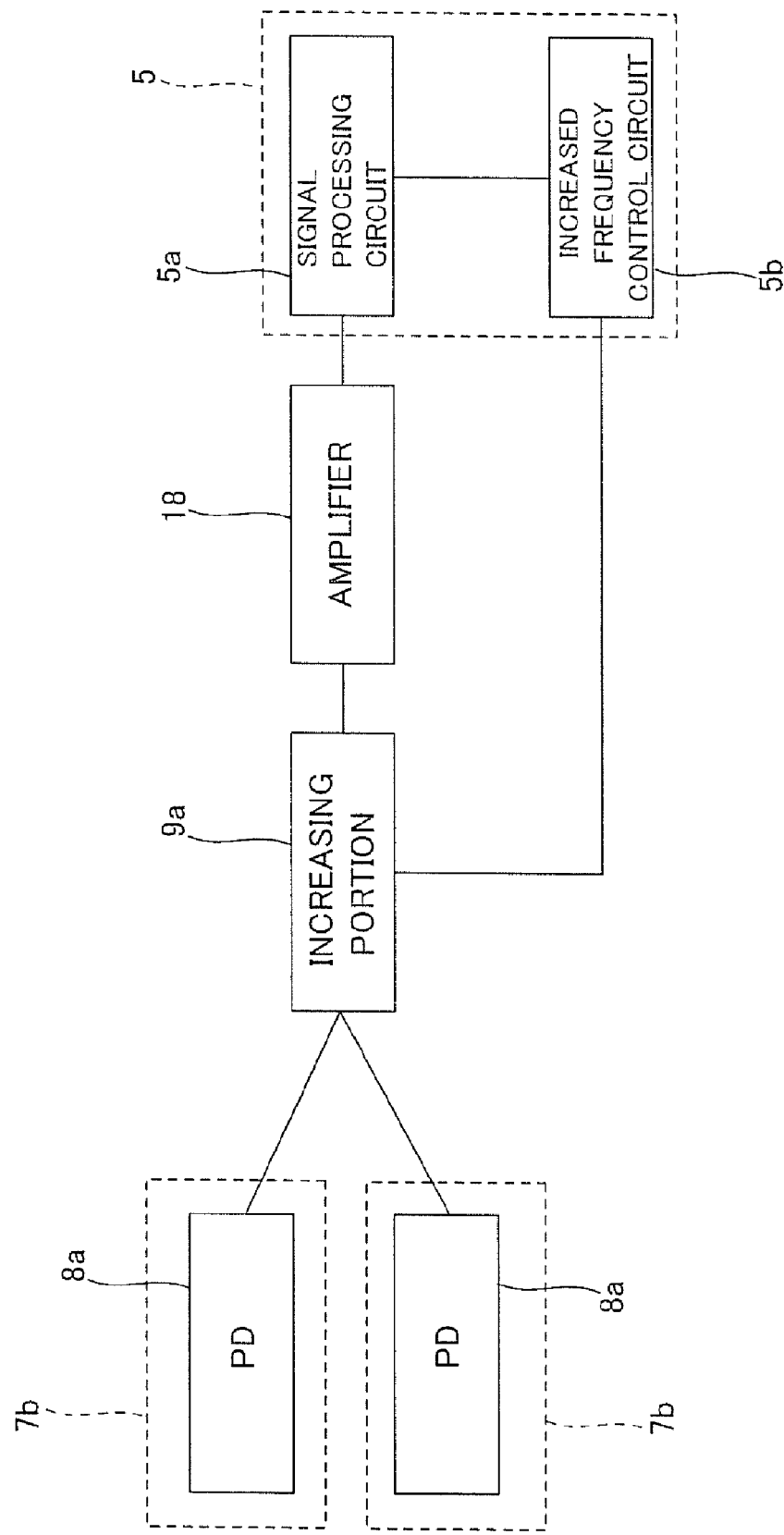
FIG. 11 is a block diagram of control of an increasing portion of pixels of an image pickup apparatus according to a third embodiment of the present invention.

In the CCD image pickup apparatus according to the third embodiment, pixels 7b includes PDs 8a respectively, and a plurality of the PDs 8a are connected to an increasing portion 9a provided outside the pixels 7b, as shown in FIG. 11. The increasing portion 9a is connected to an amplifier 18 and the amplifier 18 is connected to a signal processing circuit 5a. The signal processing circuit 5a and the increasing portion 9a are connected to an increased frequency control circuit 5b. FIG. 11 shows only two pixels 7b among a plurality of the pixels 7b arranged in the form of a matrix. The CCD image pickup apparatus is so formed that the frequency of increasing charges is controlled every frame on the basis of the information of a last frame, similarly to the aforementioned second embodiment.

The remaining effects of the third embodiment are similar to those of the aforementioned second embodiment.

Fourth Embodiment

Figure 12:
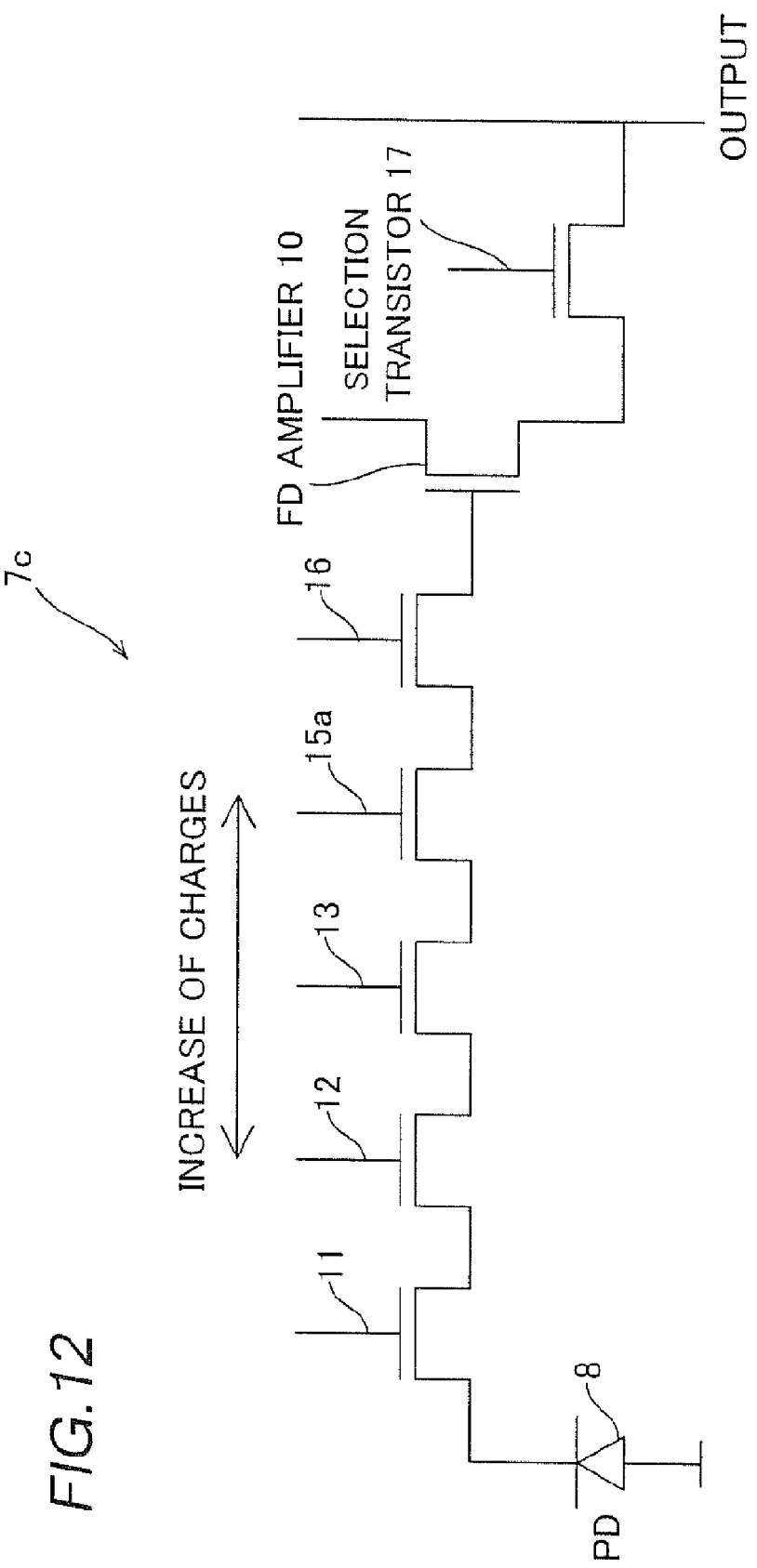
FIG. 12 is a circuit diagram showing a structure of a pixel of an image pickup apparatus according to a fourth embodiment of the present invention.

In a fourth embodiment, a structure of an image pickup apparatus including read gate electrodes 15a each functioning also as a transfer gate electrode in increasing charges will be described with reference to FIG. 12.

Each of pixels 7c of the image pickup apparatus according to the fourth embodiment includes a PD 8, transfer gate electrodes 11 to 13 provided adjacent to the PD 8, the read gate electrode 15a functioning also as the transfer gate electrode in increasing the charges, a read gate electrode 16, an FD amplifier 10 and a selection transistor 17. In an operation of increasing the charges, the charges are increased under the transfer gate electrodes 12 and 13 and under the read gate electrode 15a. In an operation of reading the charges, the read gate electrode 15a is so formed as to control output in a column direction of the pixels 7c arranged in the form of a matrix, and the read gate electrode 16 is so formed as to control output in a row direction.

The remaining structure of the fourth embodiment is similar to that of the aforementioned first embodiment.

Further, the remaining operation of the fourth embodiment is similar to that of the aforementioned first embodiment.

According to the fourth embodiment, as hereinabove described, the read gate electrode 15a functions also as the transfer gate electrode in increasing the charges, whereby the read gate electrode and the transfer gate electrode can be shared and hence the structure of the pixels 7c can be simplified dissimilarly to the case where the read gate electrode and the transfer gate electrode are separately provided.

The remaining effects of the fourth embodiment are similar to those of the aforementioned first embodiment.

Fifth Embodiment

In a fifth embodiment, a structure of an image pickup apparatus where charges are increased between PDs 8 and portions located under transfer gate electrodes 13a and 14a will be described with reference to FIG. 13, dissimilarly to the aforementioned first embodiment.

Figure 13:
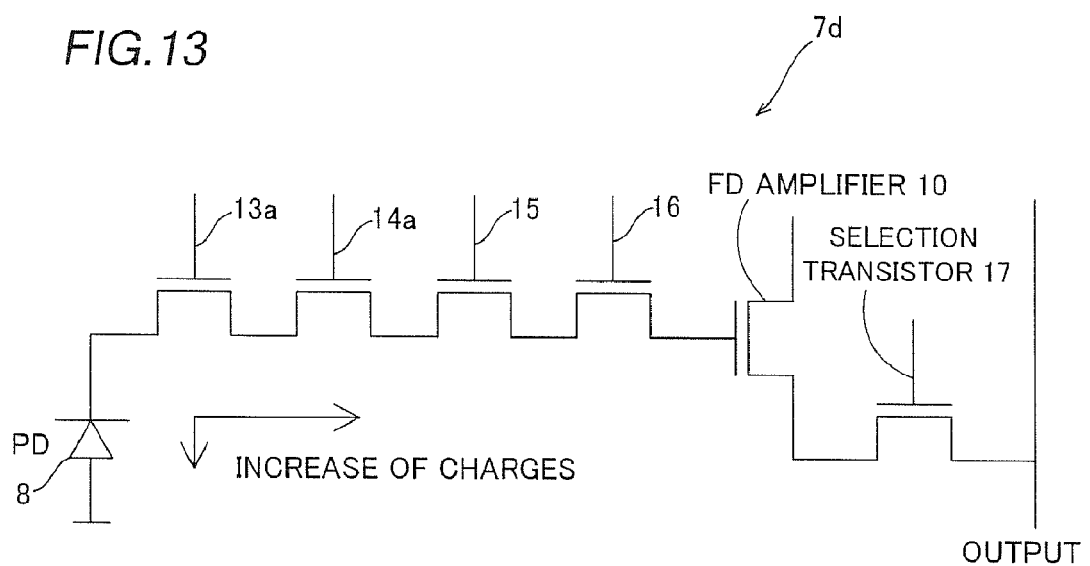
FIG. 13 is a circuit diagram showing a structure of a pixel of an image pickup apparatus according to a fifth embodiment of the present invention.

Each of the pixels 7d of the image pickup apparatus according to the fifth embodiment includes the PD 8, the transfer gate electrode 13a and 14a provided adjacent to the PD 8, read gate electrodes 15 and 16, an FD amplifier 10 and a selection transistor 17, as shown in FIG. 13. According to the fifth embodiment, the charges are increased in the PD 8 and the portions located under the transfer gate electrode 13a and 14a. The read gate electrode 15 is so formed as to control output in a column direction of the pixels 7d arranged in the form of a matrix, and the read gate electrode 16 is so formed as to control output in a row direction.

The remaining structure of the fifth embodiment is similar to that of the aforementioned first embodiment.

An operation of increasing the charges according to the fifth embodiment of the present invention will be now described with reference to FIG. 13.

First, the charges stored in the PDs 8 get over charge transfer barriers formed on the portions located under the transfer gate electrodes 13a and move to charge accumulation wells formed on the portions located under the transfer gate electrodes 14a. At this time, the charges are increased in high-field regions formed on interfaces between the portions located under the transfer gate electrodes 13a and the portions located under the transfer gate electrodes 14a by collisional ionization. The high-field region formed on the interface between the portion located under the transfer gate electrodes 13a and the portion located under the transfer gate electrode 14a is an example of the "increasing portion" in the present invention. The charges are repeatedly moved between the PDs 8 and the charge accumulation wells so that the charges are further increased.

The remaining operation of the fifth embodiment is similar to that of the aforementioned first embodiment.

According to the fifth embodiment, as hereinabove described, the charges are increased between the PDs 8 and the portions located under the transfer gate electrodes 13a and 14a, whereby the number of the transfer gate electrodes can be reduced as compared with the case where the charges are increased under three transfer gate electrodes, and hence the structure of the image pickup apparatus can be simplified.

Sixth Embodiment

In a sixth embodiment, an image pickup apparatus where charges in all of pixels 7 are simultaneously read after transferring the charges stored in all of the pixels 7 to FD amplifiers 10 will be described with reference to FIGS. 4, 6 and 14, dissimilarly to the aforementioned first embodiment.

A structure of the pixels 7 of the image pickup apparatus according to this sixth embodiment is similar to that of the aforementioned first embodiment shown in FIG. 4.

An operation of the image pickup apparatus according to the sixth embodiment of the present invention will be now described with reference to FIGS. 6 and 14.

Figure 14:
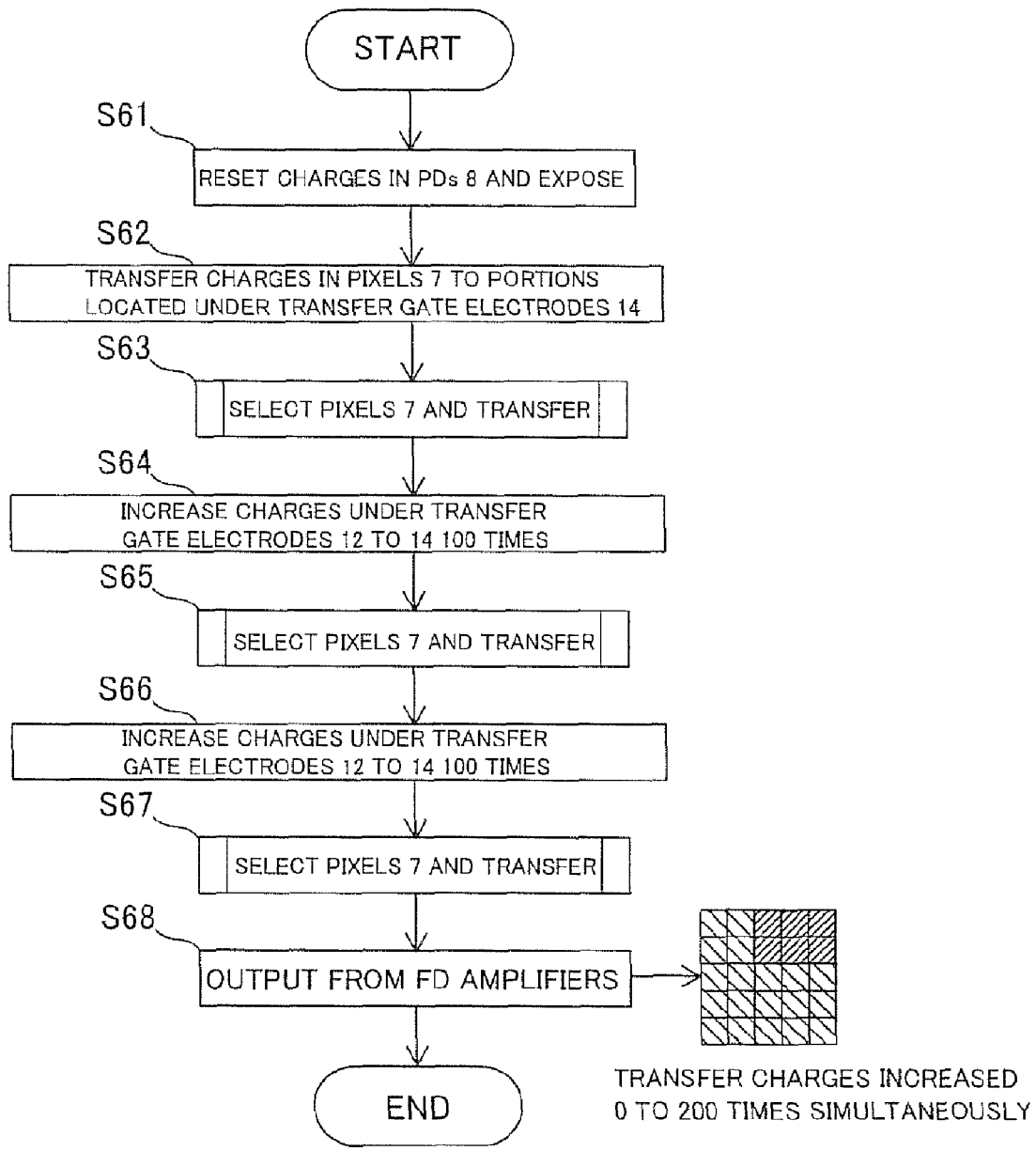
FIG. 14 is a flowchart showing control flow of an image pickup apparatus according to a sixth embodiment of the present invention.

As shown in FIG. 14, the pixels 7 are exposed after resetting charges to be stored in the PDs 8 at a step S61. Thus, the charges are stored in the PDs 8. Then, the charges stored in the PDs 8 are stored in portions located under transfer gate electrodes 14 through portions located under transfer gate electrodes 11 to 13 at a step S62.

At a step S63, the prescribed pixels 7 (having high luminance) are selected, the charges stored in the portions located under the transfer gate electrodes 14 are transferred to the FD amplifiers 10. The specific operation is similar to that of the first embodiment shown in FIG. 6.

As a step S64, the charges are increased under the transfer gate electrodes 12 to 14. The specific operation is similar to that of the aforementioned first embodiment. At this time, the charges are increased 100 times. Although this increase of the charges is performed for all of the pixels 7 in the image sensor 2, any influence is not exerted on the image even when the operation of increasing charges in the pixels 7 having high luminance is performed since signals of the pixels 7 having the high luminance are already transferred to the FD amplifiers 10 at the step S63.

At a step S65, the charges in the pixels 7 (having middle luminance) on a prescribed region of the image sensor 2 are transferred to the FD amplifiers 10, similarly to the step S63.

At a step S66, the charges are increased between the portions located under the transfer gate electrodes 12 to 14 similarly to the step S64. At this time, the charges are increased 100 times. Thus, the charges are increased 200 times in total by adding the frequency of increasing charges at the step S64. The increase of the charges is performed for all of the pixels 7 in the image sensor 2 similarly to the step S64.

At a step S67, the charges in the pixels 7 (having low luminance) on a prescribed region of the image sensor 2 are transferred to the FD amplifiers 10 similarly to the steps S63 and S67.

At a step S68, signals of the charges stored in the FD amplifiers 10 in all of the pixels 7 are simultaneously output. Thus, a single operation of outputting the signals can be performed dissimilarly to the case where the signals of the pixels having high luminance, middle luminance and low luminance respectively are output separately, and hence the outputting operation of the image sensor 2 can be performed at a high speed.

The remaining effects of the sixth embodiment are similar to those of the aforementioned first embodiment.

Seventh Embodiment

In a seventh embodiment, a structure of an image pickup apparatus having a plurality of column decoders 19a and 19b will be described with reference to FIG. 15, dissimilarly to the aforementioned first embodiment.

Figure 15:
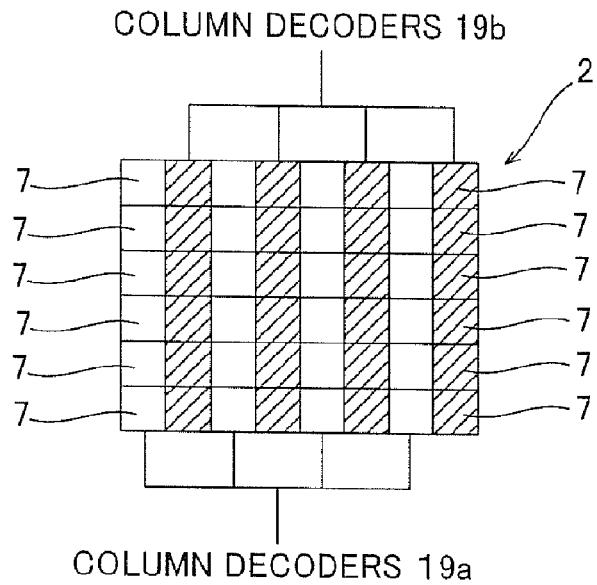
FIG. 15 is a diagram showing column decoders of an image sensor of an image pickup apparatus according to a seventh embodiment of the present invention.

In the image pickup apparatus according to the seventh embodiment, pixels 7 at odd columns and pixels 7 at even columns are connected to the column decoders 19a and 19b respectively, as shown in FIG. 15. Thus, signals of the pixels 7 at the odd columns and signals of the pixels 7 at the even columns can be read in parallel by the column decoders 19a and 19b dissimilarly to the case where one column decoder is provided, and hence the signals of the pixels 7 can be read at a high speed.

The remaining structure of the seventh embodiment is similar to that of the aforementioned first embodiment.

The remaining effects of the seventh embodiment are similar to those of the aforementioned first embodiment.

Eighth Embodiment

In an eighth embodiment, a structure of an image pickup apparatus where pixels 7 at four columns are simultaneously selected will be described with reference to FIG. 16, dissimilarly to the aforementioned first embodiment.

Figure 16:
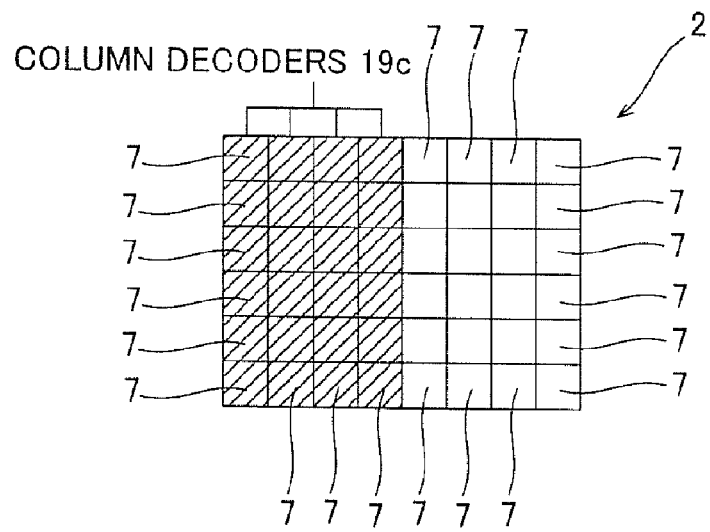
FIG. 16 is a diagram showing column decoders and an image sensor according to an eighth embodiment of the present invention.

As shown in FIG. 16, an image pickup apparatus according to the eighth embodiment is so formed that signals of the pixels 7 at the four columns are read with respect to one address of a column decoder 19c. Thus, the signals of the pixels 7 at the four columns are simultaneously read dissimilarly to the case where signals of the pixels 7 at one column are read with respect to one address of the column decoder 19c, and hence the signals of the pixels 7 can be read at a high speed.

The remaining structure of the eighth embodiment is similar to that of the aforementioned first embodiment.

The remaining effects of the eighth embodiment are similar to those of the aforementioned first embodiment.

Ninth Embodiment

In a ninth embodiment, an image pickup apparatus where two pixels 7e share an FD amplifier 10a will be described with reference to FIG. 17, dissimilarly to the aforementioned fourth embodiment.

Figure 17:
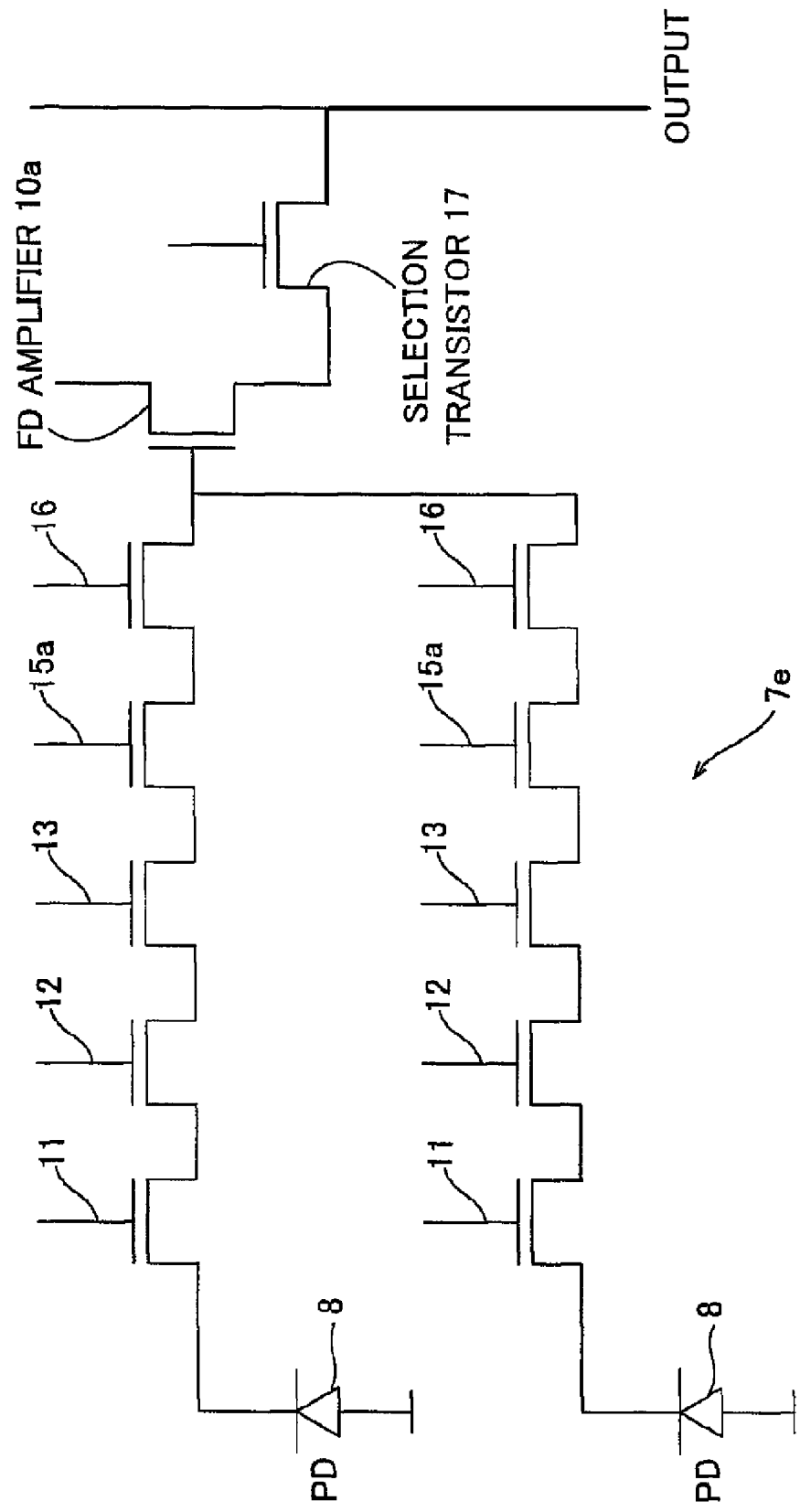
FIG. 17 is a diagram showing a structure of pixels of an image pickup apparatus according to a ninth embodiment of the present invention.

In the image pickup apparatus according to the ninth embodiment, the read gate electrodes 16 of the two pixels 7e are connected to the one FD amplifier 10a and the two pixels 7e share the FD amplifier 10a as shown in FIG. 17. The FD amplifier 10a is an example of the "voltage conversion portion" in the present invention. Thus, the sizes of the pixels 7e can be reduced due to the share of the FD amplifier 10a.

The remaining structure of the ninth embodiment is similar to that of the aforementioned fourth embodiment.

The remaining effects of the ninth embodiment are similar to those of the aforementioned fourth embodiment.

Tenth Embodiment

Figure 18:
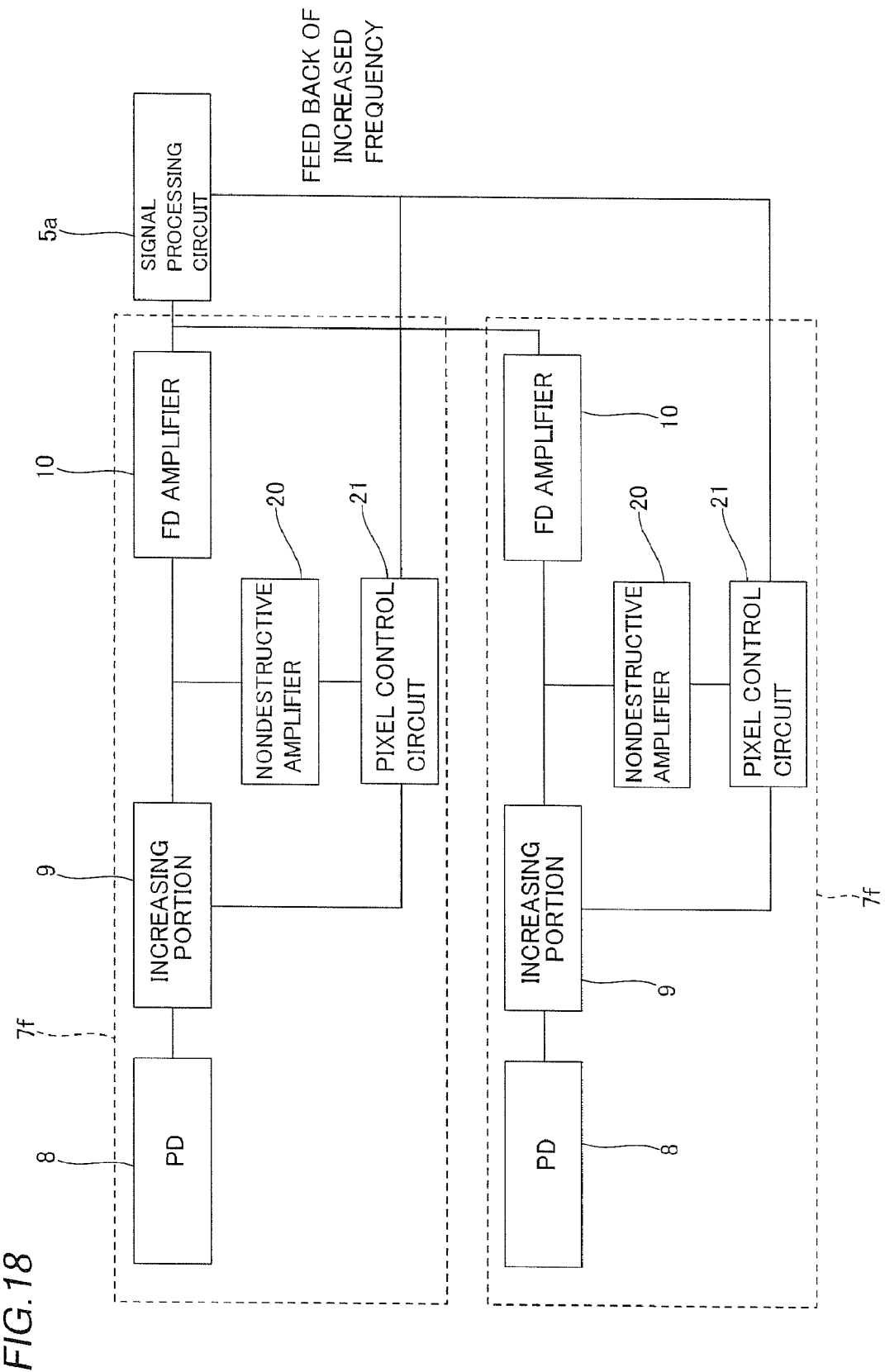
FIG. 18 is a block diagram showing control of increase of pixels of an image pickup apparatus according to a tenth embodiment of the present invention.

In a tenth embodiment, a structure of an image pickup apparatus where control of an increased frequency is performed in pixels 7f will be described with reference to FIGS. 18 and 19, dissimilarly to the aforementioned fourth embodiment.

Each of the pixels 7f according to the tenth embodiment includes a PD 8, a charge increasing portion 9, an FD amplifier 10, a nondestructive amplifier (floating gate amplifier: FG amplifier) 20 and a pixel control circuit 21, as shown in FIG. 18. The PD 8 is connected to the increasing portion 9 connected to the FD amplifier 10. The nondestructive amplifier 20 is connected to the increasing portion 9 and the FD amplifier 10. In the FD amplifier 10, signal charges are reset after detecting signals and therefore the signal charges can not be reused. In the nondestructive amplifier 20, on the other hand, signals can be detected while holding the signal charges. The pixel control circuit 21 is connected to the increasing portion 9 and the nondestructive amplifier 20. The signal processing circuit 5a is provided outside the pixels 7f and is connected to the pixel control circuit 21 of each pixel 7f. The frequency of increasing charges in each pixel 7f can be feedback-controlled by the signal processing circuit 5a.

Figure 19:
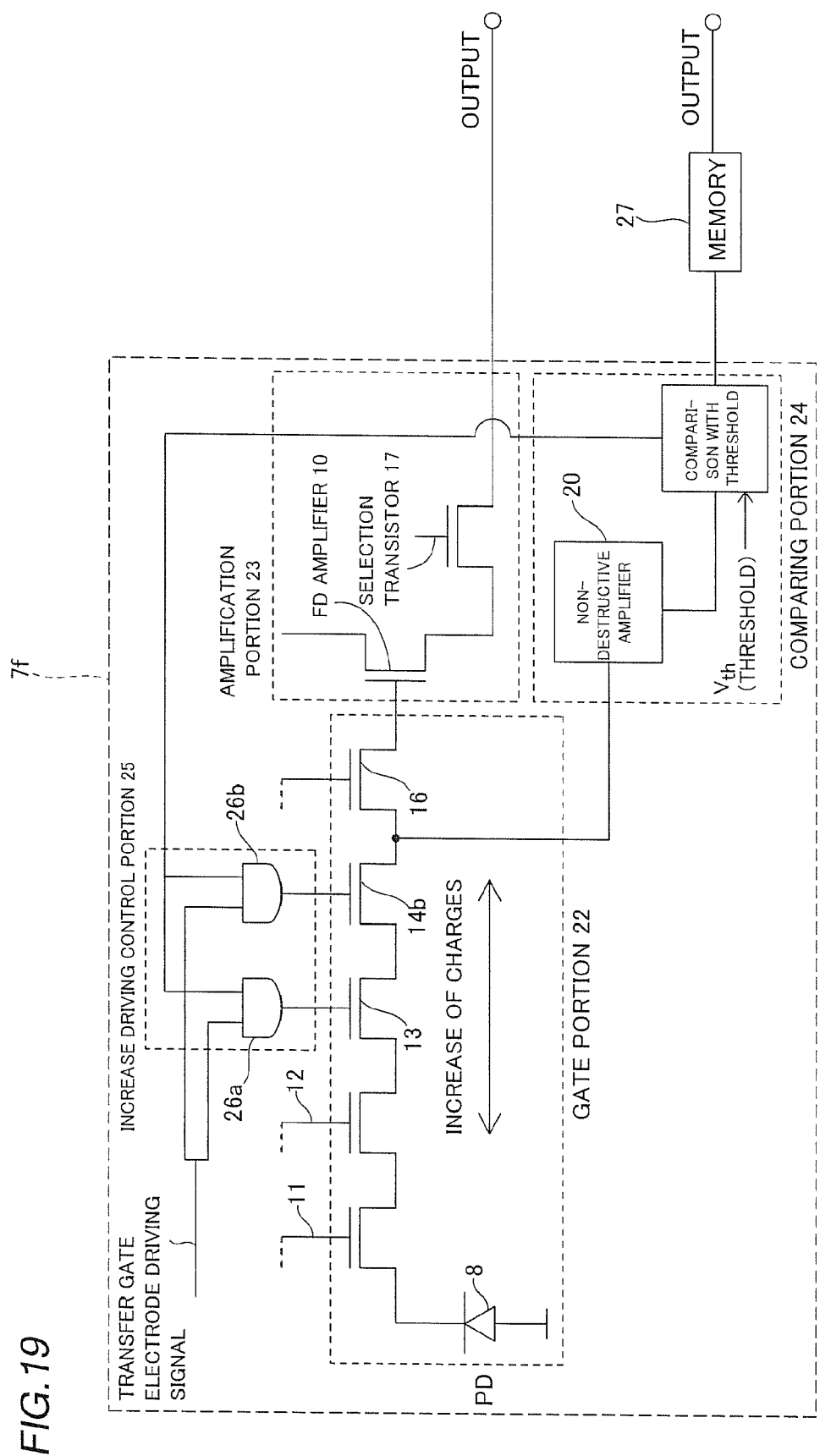
FIG. 19 is a circuit diagram showing a structure of the pixel of the image pickup apparatus according to the tenth embodiment of the present invention.

As shown in FIG. 19, each of the pixels 7f includes a gate portion 22, an amplifier portion 23, a comparing portion 24 and an increase driving control portion 25. The gate portion 22 is constituted by a PD 8, transfer gate electrodes 11 to 13 and 14b provided adjacent to the PD 8 and a read gate electrode 16. In an operation of increasing charges, the charges are increased under the transfer gate electrodes 12, 13 and 14b.

The amplifier portion 23 is constituted by the FD amplifier 10 and the selection transistor 17. The FD amplifier 10 is connected to the read gate electrode 16 of the gate portion 22 and the selection transistor 17. A signal is output through the selection transistor 17.

The comparing portion 24 is constituted by the nondestructive amplifier 20 and the nondestructive amplifier 20 is connected to a portion between the transfer gate electrodes 14b and the read gate electrode 16. The nondestructive amplifier 20 is so formed as to control increase of the charges by comparing the charges stored in the pixel 7f with a threshold ($V_{th}$) of a prescribed voltage.

The increase driving control portion 25 includes two logic circuits each selecting whether or not a transfer gate electrode driving signal is applied on the basis of output of the comparing portion 24. For example, the increase driving control portion 25 is constituted by two AND circuits 26a and 26b shown in FIG. 19. The AND circuits 26a and 26b are so formed as to receive signals obtained by comparing the charges stored in each pixel 7f with the threshold ($V_{th}$) respectively.

A memory 27 is provided outside the pixels 7f and stores a frequency increased by the operation of increasing the charges stored in the pixels 7f up to the threshold ($V_{th}$).

The remaining structure of the tenth embodiment is similar to that of the aforementioned fourth embodiment.

An operation of the pixels 7f according to the tenth embodiment of the present invention will be described with reference to FIGS. 19 and 20.

Figure 20:
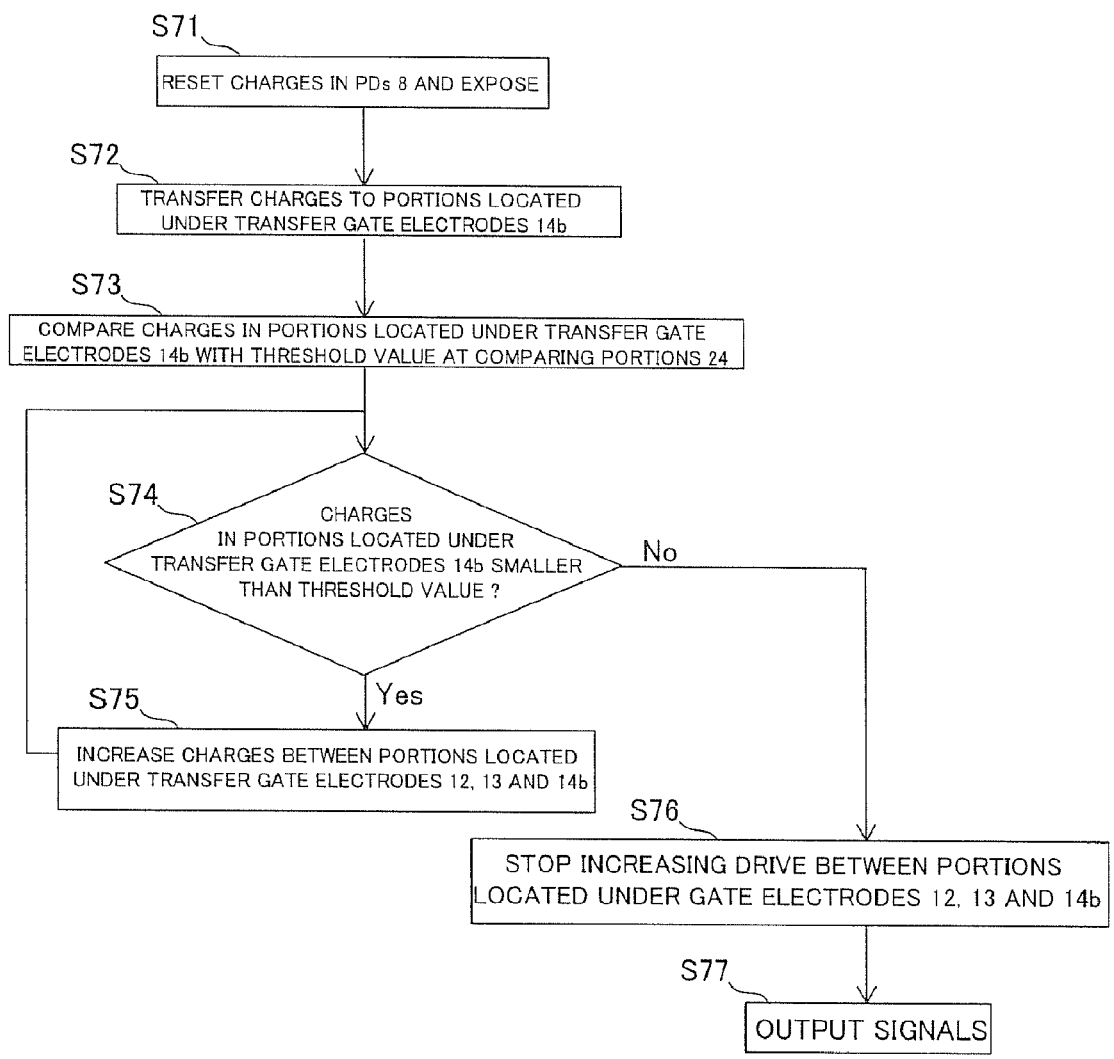
FIG. 20 is a flowchart showing control of the pixels of the image pickup apparatus according to the tenth embodiment of the present invention.

As shown in FIG. 20, the pixels 7f are exposed after resetting charges to be stored in the PDs 8 at a step S71. Thus, the charges are stored in the PDs 8. Then, the charges stored in the PDs 8 are stored in portions located under the transfer gate electrodes 14b through portions located under the transfer gate electrodes 11 to 13 at a step S72.

At a step S73, the comparing portions 24 (see FIG. 19) compare the charges stored in the portions located under the transfer gate electrodes 14b with the threshold ($V_{th}$). At a step S74, when it is determined that the charges stored in the portions located under the transfer gate electrodes 14b are smaller than the threshold ($V_{th}$), the charges are increased between the portions located under the transfer gate electrodes 12, 13 and 14b at a step S75. This operation is repeated until the charges stored in the portions located under the transfer gate electrodes 14b are larger than the threshold ($V_{th}$). When it is determined that the charges stored in the portions located under the transfer gate electrodes 14b are larger than the threshold ($V_{th}$) at a step S74, the increasing operation is stopped at a step S76. Thereafter signals are output through the read gate electrodes 16, the FD amplifiers 10 and the selection transistors 17 at a step S77.

The operation of the pixels 7f shown in FIG. 20 is parallelized for a plurality of the pixels 7f. Thus, the frequencies of increasing charges are controlled for a plurality of the pixels 7f respectively.

The effects of the tenth embodiment are similar to those of the aforementioned fourth embodiment.

Eleventh Embodiment

In an eleventh embodiment, a structure of an image pickup apparatus increasing charges between PDs 8 and portions located under transfer gate electrodes 14a will be described with reference to FIG. 21 dissimilarly to the aforementioned tenth embodiment.

Figure 21:
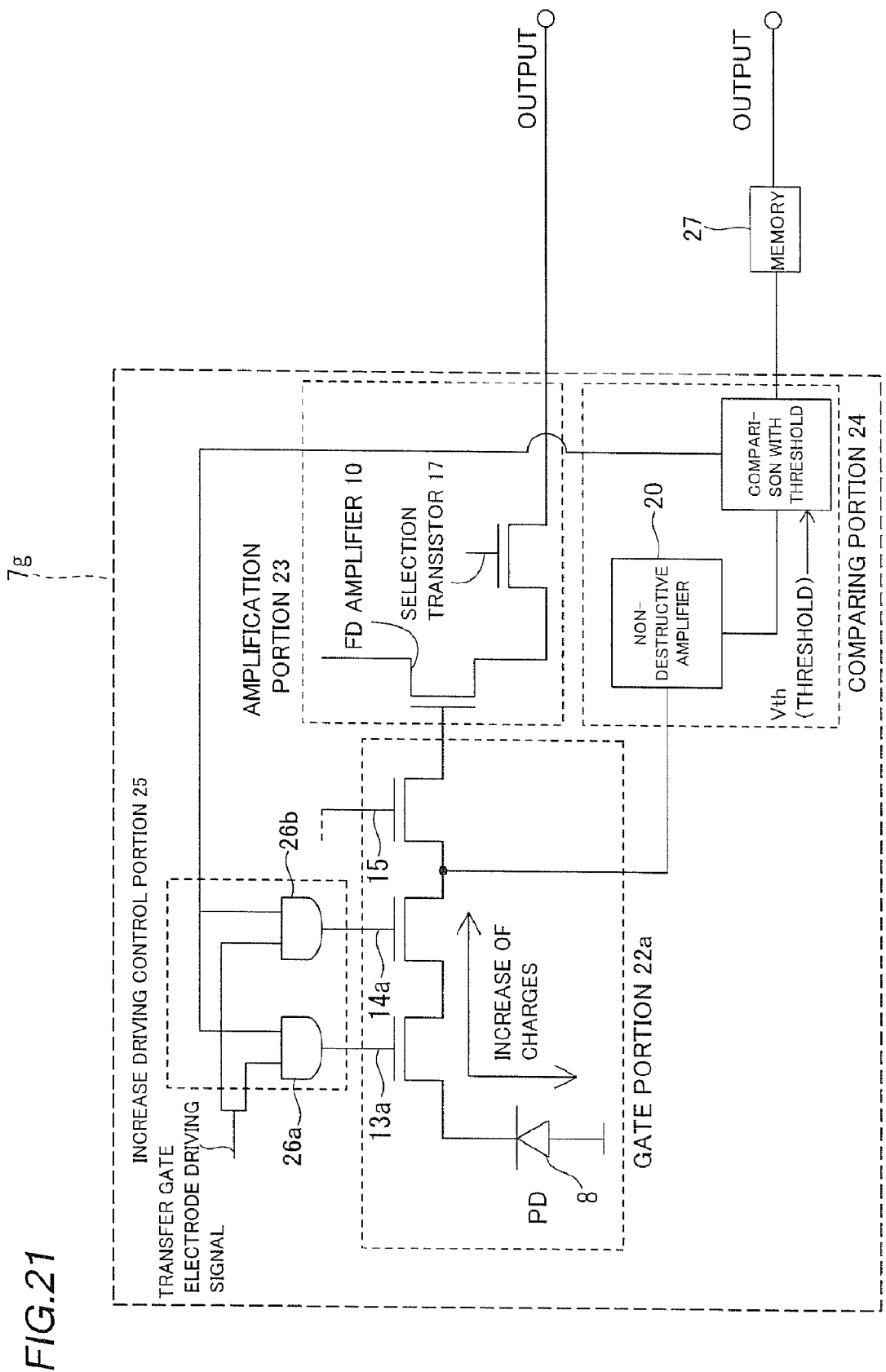
FIG. 21 is a circuit diagram showing a structure of a pixel of an image pickup apparatus according to an eleventh embodiment of the present invention.

Each of pixels 7g according to the eleventh embodiment includes a gate portion 22a, an amplifier portion 23, a comparing portion 24 and an increase driving control portion 25 as shown in FIG. 21. The gate portion 22a is constituted by the PD 8, transfer gate electrodes 13a and 14a provided adjacent to the PD 8 and a read gate electrode 15. According to the eleventh embodiment, in an operation of increasing charges, the charges are increased in the PDs 8 and portions located under the transfer gate electrode 13a and 14a similarly to the aforementioned fifth embodiment.

The remaining structure of the eleventh embodiment is similar to that of the aforementioned tenth embodiment.

The operation of the eleventh embodiment is similar to that of the aforementioned tenth embodiment except that the charges are increased between the PDs 8 and the portions located under the transfer gate electrodes 13a and 14a.

According to the eleventh embodiment, as hereinabove described, the charges are increased between the PDs 8 and the portions located under the transfer gate electrodes 13a and 14a, whereby the number of the transfer gate electrodes can be reduced as compared with the case where the charges are increased under portions located under three transfer gate electrodes and hence the structure of the image pickup apparatus can be simplified.

Twelfth Embodiment

In a twelfth embodiment, a structure of an image pickup apparatus estimating frequencies of increasing charges with reference to charges stored in a pixel 7g where the frequency of increasing charges are 0 time will be described with reference to FIG. 22, dissimilarly to the aforementioned first embodiment.

Figure 22:
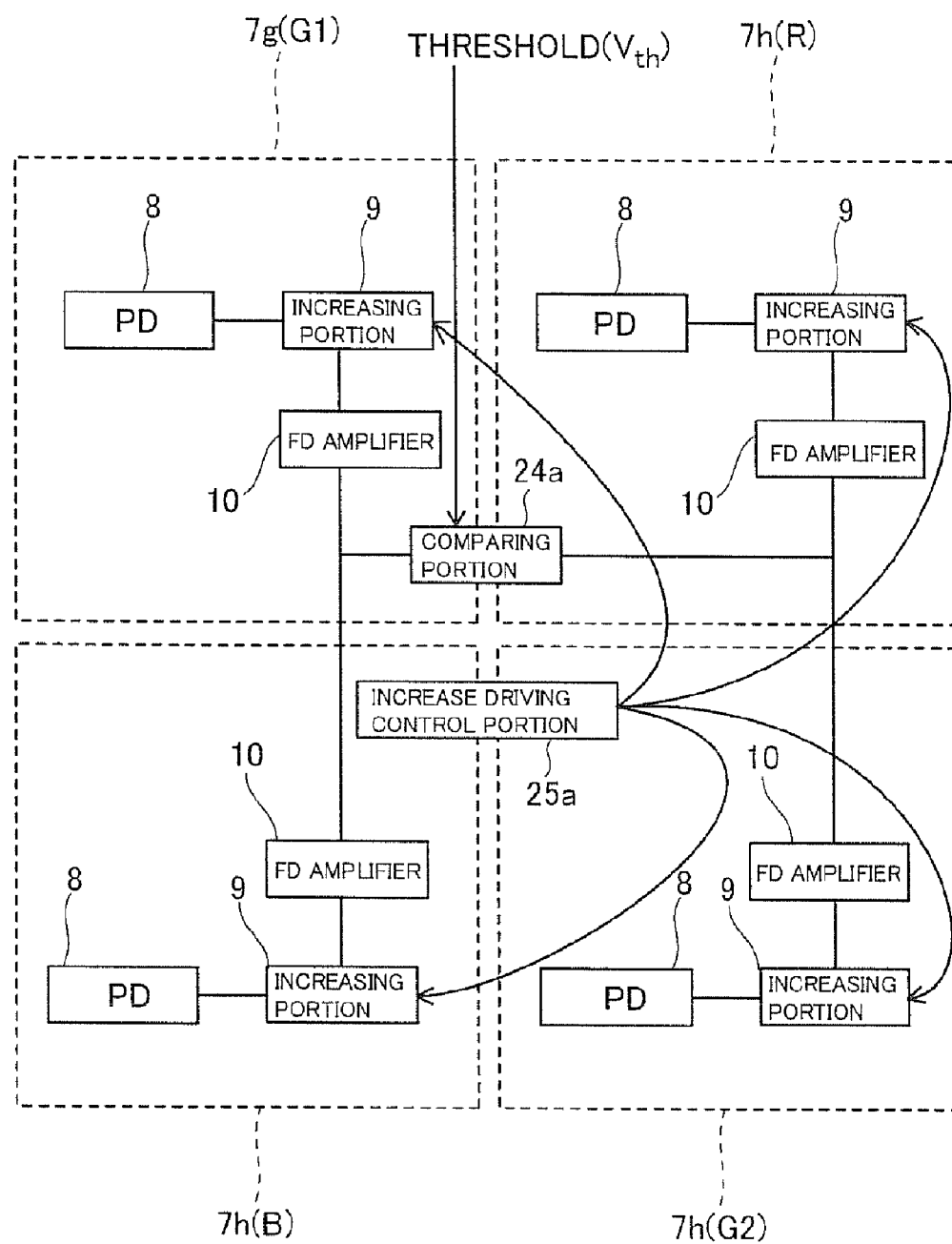
FIG. 22 is a block diagram showing a structure of pixels of an image pickup apparatus according to a twelfth embodiment of the present invention.

The image pickup apparatus according to a twelfth embodiment includes pixels 7g and 7h having red (R), green (G1, G2) and blue (B) color sensitivity characteristics as shown in FIG. 22. A group of the pixels is composed of the pixel 7h having one red (R) color sensitivity characteristic, the pixel 7h having one blue (B) color sensitivity characteristic and the pixels 7g and 7h having two green (G1, G2) color sensitivity characteristics. The pixels 7g and 7h include PDs 8, increasing portions 9 and FD amplifiers 10 respectively. Each FD amplifier 10 is connected to a comparing portion 24a receiving a threshold ($V_{th}$) and the increasing portion 9 is connected to an increase driving control portion 25a. According to the twelfth embodiment, in the two pixels 7g and 7h having the green (G1, G2) color sensitivity characteristics, the frequency of increasing charges in the pixel 7g is fixed to 0 time, and the frequency of increasing charges is calculated by comparing output of the pixel 7h where the increasing operation is performed with output of the pixels 7g where no increasing operation is performed.

The operation of the image pickup apparatus according to the twelfth embodiment of the present invention will be described with reference to FIGS. 23 and 24.

Figure 23:
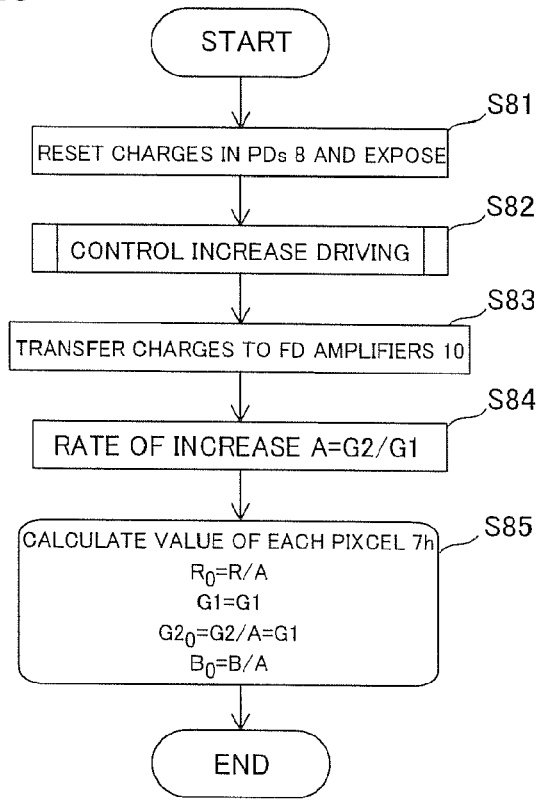
FIG. 23 is a flowchart showing control of an operation of the image pickup apparatus according to the twelfth embodiment of the present invention.
Figure 24:
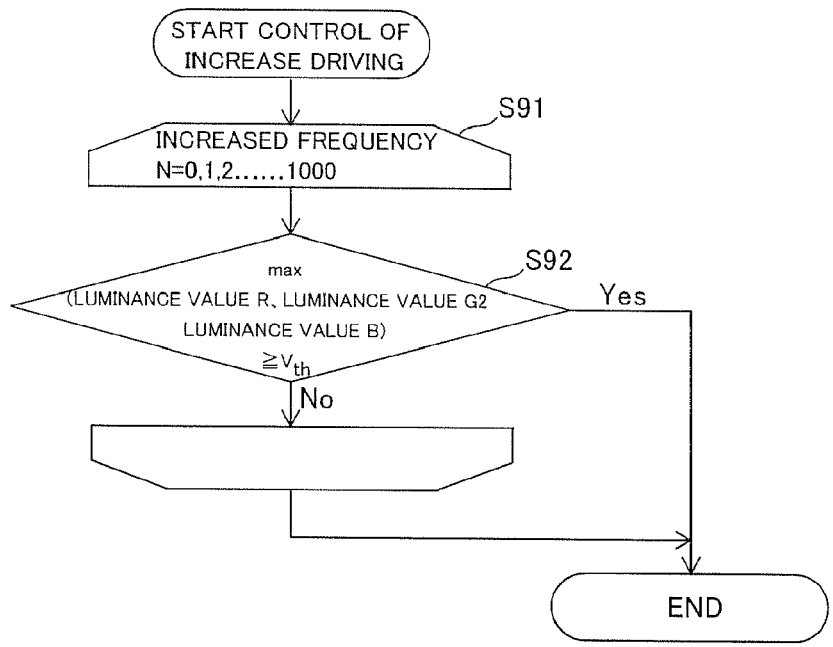
FIG. 24 is a flowchart showing control flow of the frequency of increase of the image pickup apparatus according to the twelfth embodiment of the present invention.

As shown in FIG. 23, the pixels 7g and 7h are exposed after resetting charges to be stored in the PDs 8 at a step S81. Thus, the charges are stored in the PDs 8. Then the increase driving control portion 25a (see FIG. 22) increases the charges in each pixel 7h at a step S82. More specifically, increase of the charges is started at a step S91, as shown in FIG. 24. At a step S92, when maximum charges (luminance) among charges stored in pixels 7h having the red (R), green (G2) and blue (B) color sensitivity characteristics are smaller than the threshold ($V_{th}$), the operation of increasing charges is repeated. This operation of increasing charges is repeated until the maximum charges among the charges stored in the pixels 7h having the red (R), green (G2) and blue (B) color sensitivity characteristics are larger than the threshold ($V_{th}$) at the step S92.

The charges are transferred to the FD amplifiers 10 at a step S83. At a step S84, the rate of increase A is calculated by comparing charges G1 in the pixel 7g having the green (G1) color sensitivity characteristic where the increasing operation is not performed with charges G2 in the pixel 7h having the green (G2) color sensitivity characteristic where the increasing operation is performed. More specifically, the rate of increase is calculated according to the following formula (1):

$$A = G2/G1 \quad (1)$$

At a step S85, the quantities of charges (luminance) before increasing the charges in the pixels 7h having the red (R), green (G2) and blue (B) color sensitivity characteristics are calculated according to the following formulas (2) to (5) by employing the rate of increase A calculated at the step S84:

$$R_0 = R/A \quad (2)$$

$$G1 = G1 \quad (3)$$

$$G2_0 = G2/A \quad (4)$$

$$B_0 = B/A \quad (5)$$

R, G2 and B represent the quantities of charges after increasing the charges in the pixels 7h having the red (R), green (G2) and blue (B) color sensitivity characteristics respectively. $R_0$, $G2_0$ and $B_0$ represent the quantities of charges before increasing the charges in the pixels 7h having the red (R), green (G2) and blue (B) color sensitivity characteristics respectively. Image composition is performed on the basis of the quantities of charges calculated according to the formulas (2) to (5). The pixel 7g having the green (G1) color sensitivity characteristic where the increasing operation is not performed and the pixel 7h having the green (G2) color sensitivity characteristic where the increasing operation is performed are adjacent to each other and hence it is assumed that the quantities of charges in the pixels 7g and the pixel 7h are equal to each other if the charges are not increased in both of them. Thus, $R_0$, $G2_0$ and $B_0$ can be calculated by the rate of increase A.

According to the twelfth embodiment, as hereinabove described, in the two pixels 7g and 7h having the green (G1, G2) color sensitivity characteristics, the frequency of increasing charges in the pixel 7g is fixed to 0 time and the frequency of increasing charges is calculated by comparing output of the pixel 7h where the increasing operation is performed with output of the pixels 7g where no increasing operation is performed, whereby no memory for holding the frequency of increasing charges in each pixel 7h may be provided and hence the structure of the image pickup apparatus can be simplified.

Thirteenth Embodiment

In a thirteenth embodiment, an operation of an image pickup apparatus where a frequency of increasing charges is previously discretely set will be described with reference to FIGS. 25 and 15 dissimilarly to the aforementioned twelfth embodiment. A structure of the image pickup apparatus according to the twelfth embodiment is similar to that of the aforementioned thirteenth embodiment shown in FIG. 22.

Figure 25:
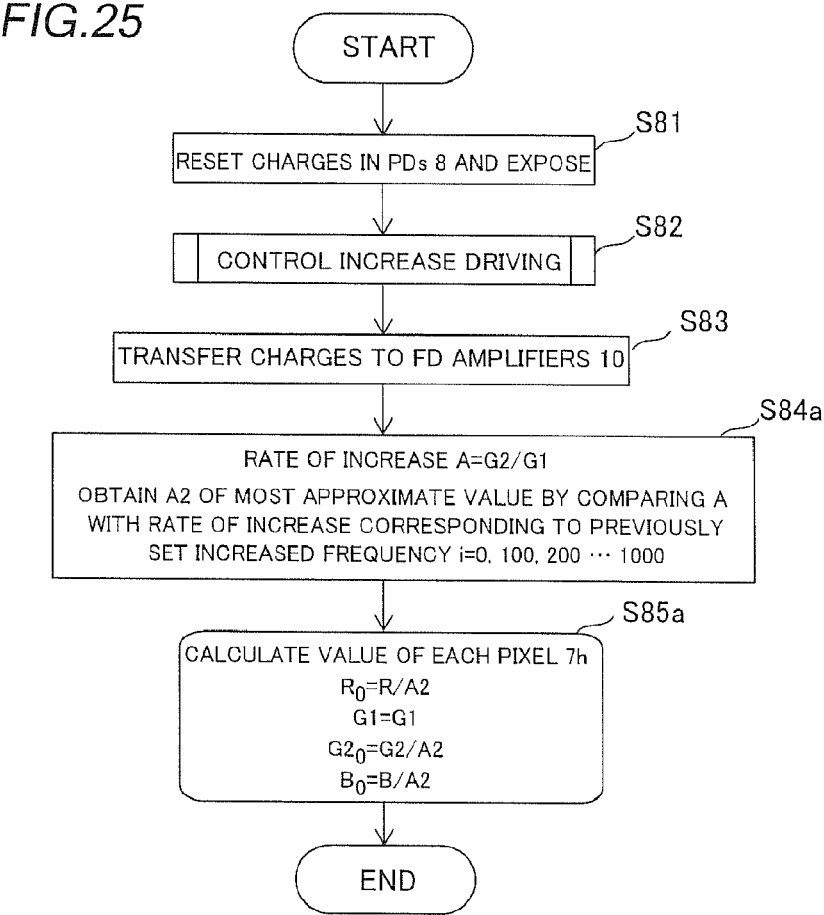
FIG. 25 is a flowchart showing control flow of an operation of an image pickup apparatus according to a thirteenth embodiment of the present invention.
Figure 26:
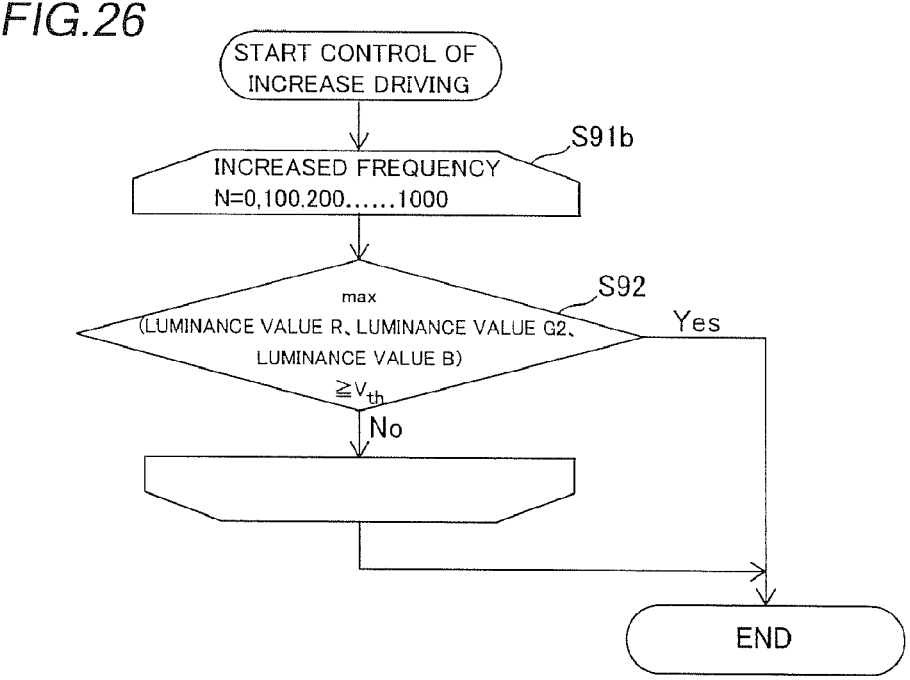
FIG. 26 is a flowchart showing control flow of the frequency of increase of the image pickup apparatus according to the thirteenth embodiment of the present invention.

As shown in FIG. 25, pixels 7g and 7h are exposed after resetting charges to be stored in PDs 8 at a step S81. Thus, the charges are stored in the PDs 8. Then the increase driving control portion 25a (see FIG. 22) increases the charges in each pixel 7h at a step S82. More specifically, increase of the charges is started at a step S91b, as shown in FIG. 26. The frequencies of increasing charges are previously set to 0 time, 100 times, 200 times, . . . and 1000 times, for example. At a step S92, when maximum charges among charges stored in pixels 7h having red (R), green (G2) and blue (B) color sensitivity characteristics are smaller than a maximum threshold ($V_{th}$), the operation of increasing charges is repeated. This operation of increasing charges is repeated until the maximum charges among the charges stored in the pixels 7h having the red (R), green (G2) and blue (B) color sensitivity characteristics are larger than the threshold ($V_{th}$) at the step S92.

The charges are transferred to the FD amplifiers 10 at a step S83. At a step S84, the rate of increase A is calculated by comparing charges G1 in the pixel 7g having the green (G1) color sensitivity characteristic where the increasing operation is not performed with charges G2 in the pixel 7h having the green (G2) color sensitivity characteristic where the increasing operation is performed. More specifically, the rate of increase is calculated according to the aforementioned formula (1). At this time, the rate of increase A2 corresponding to the most approximate number of times is employed among 0 time, 100 times, 200 times, . . . and 1000 times previously set as the rate of increase A.

At a step S85a, the quantities of charges before increasing the charges in the pixels 7h having the red (R), green (G2) and blue (B) color sensitivity characteristics are calculated according to the following formulas (6) to (9) by employing the rate of increase A2 employed at the step S84a:

$$R_{02} = R/A2 \quad (6)$$

$$G1 = G1 \quad (7)$$

$$G2_{02} = G2/A2 \quad (8)$$

$$B_{02} = B/A2 \quad (9)$$

R, G2 and B represent the quantities of charges after increasing the charges in the pixels 7h having the red (R), green (G2) and blue (B) color sensitivity characteristics respectively. $R_{02}$, $G2_{02}$ and $B_{02}$ represent the quantities of charges before increasing the charges in the pixels 7h having the red (R), green (G2) and blue (B) color sensitivity characteristics respectively. Image composition is performed on the basis of the quantities of charges calculated according to the formulas (6) to (9). When the charges stored in the pixel 7g having the green (G1) color sensitivity characteristic where the increasing operation is not performed and the charges stored in the pixel 7h, adjacent to the pixel 7h, having the green (G2) color sensitivity characteristic where the increasing operation is performed are different from each other, the correct frequency of increasing charges can not be obtained by the formula (1) according to the aforementioned twelfth embodiment. On the other hand, the correct frequency of increasing charges can be obtained by previously setting the frequency of increasing charges and employing the most approximate value among the set frequencies of increasing charges even when errors are observed in the quantities of charges stored in the pixels 7g and 7h.

Fourteenth Embodiment

In a fourteenth embodiment, a structure of an image pickup apparatus provided with a region for setting a circuit in each of pixel groups will be described with reference to FIG. 27.

Figure 27:
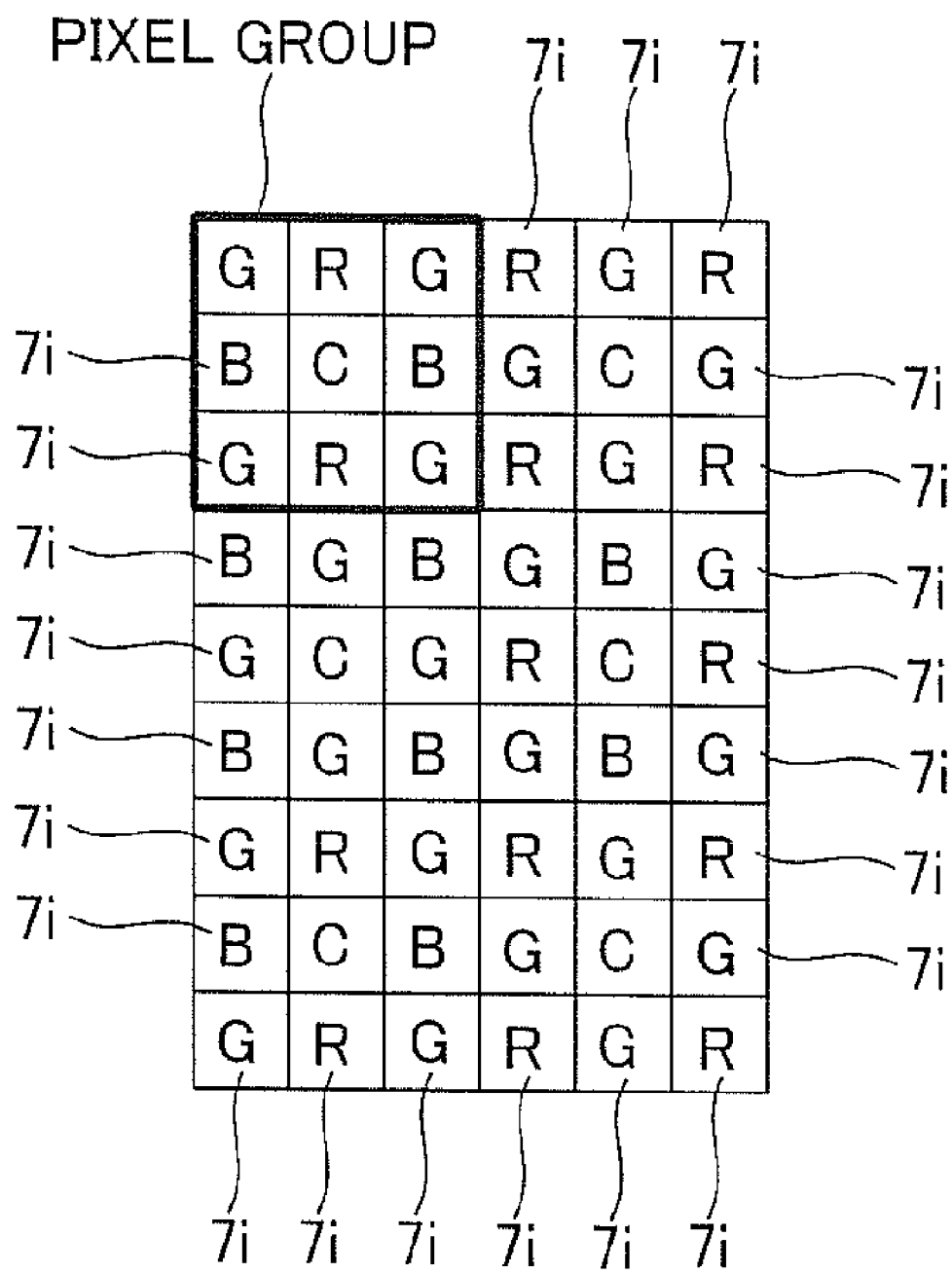
FIG. 27 is a diagram showing a structure of pixels of an image sensor of an image pickup apparatus according to a fourteenth embodiment of the present invention.

In the image pickup apparatus according to the fourteenth embodiment, each pixel group is composed of pixels 7i on a region of 3 rows×3 columns, as shown in FIG. 27. No pixel 7i is provided on a central region in each region of 3 rows×3 columns and a circuit such as a signal processing circuit 5a (see FIG. 3) is set on each central region. Thus, the circuits are easily set.

Fifteenth Embodiment

A structure of an image pickup apparatus according to a fifteenth embodiment will be described with reference to FIGS. 28 to 31.

Figure 28:
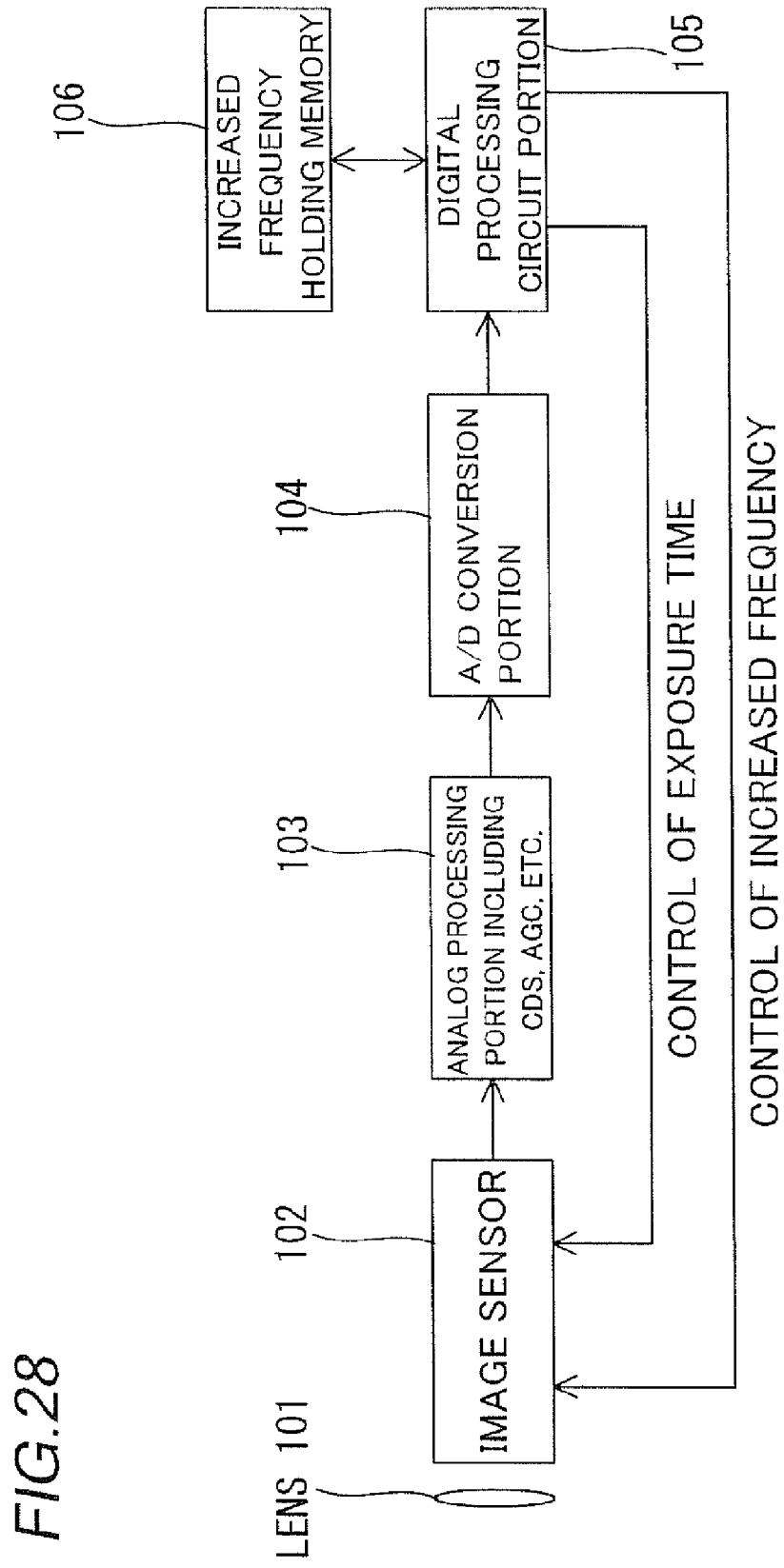
FIG. 28 is a block diagram of a CMOS image pickup apparatus according to a fifteenth embodiment of the present invention.

The CMOS image pickup apparatus according to the fifteenth embodiment is constituted by a lens 101, an image sensor 102 including charge increasing portions 110 described later, an analog processing portion 103 including CDS for reducing noise, AGC for automatically controlling gain and the like, an A/D conversion portion 104 and a digital processing circuit portion 105 and an increased frequency holding memory 106, as shown in FIG. 28.

The image sensor 102 is connected to the analog processing portion 103 and the analog processing portion 103 is connected to the A/D conversion portion 104. The A/D conversion portion 104 is connected to the digital processing circuit portion 105, and the digital processing circuit portion 105 is connected to the increased frequency holding memory 106. The digital processing circuit portion 105 is so formed as to control a frequency of increasing charges in the image sensor 102 on the basis of an increased frequency held in the increased frequency holding memory 106 and exposure time of pixels 107 described later.

Figure 29:
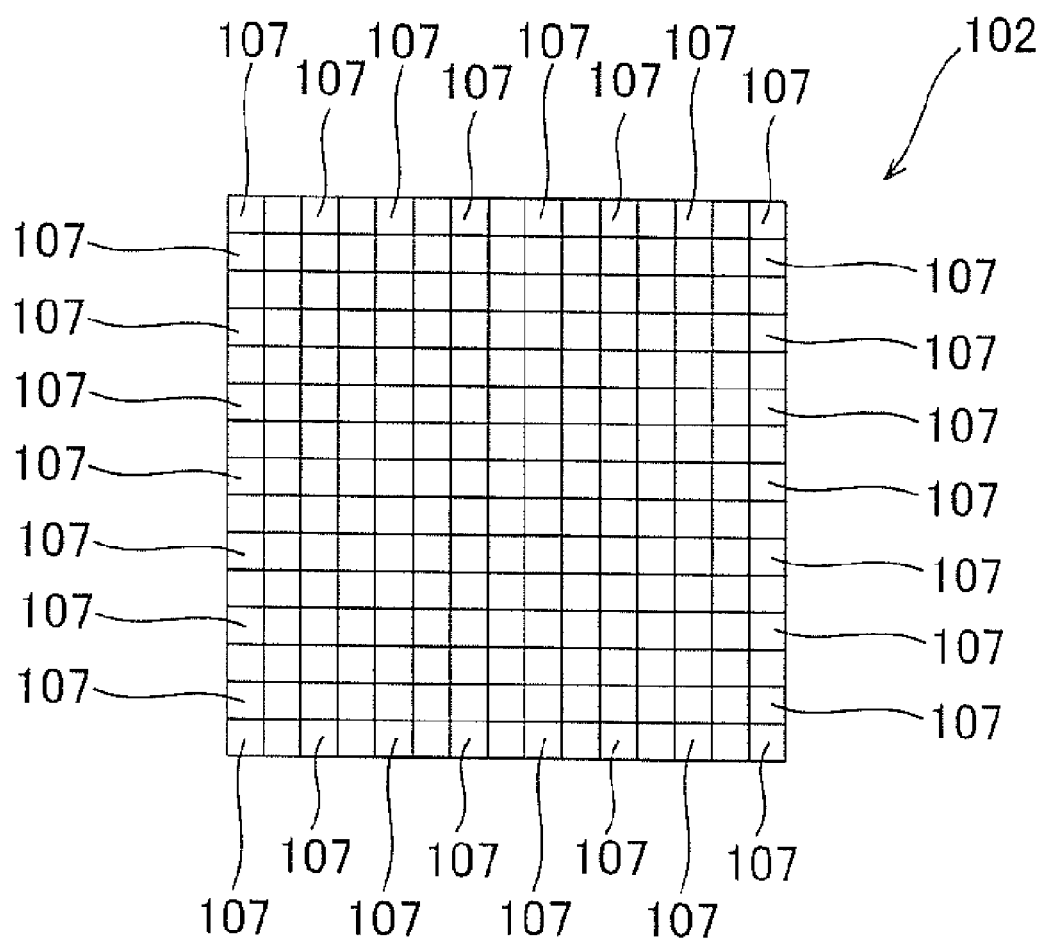
FIG. 29 is a diagram showing an image sensor including a plurality of pixels of the image pickup apparatus according to the fifteenth embodiment of the present invention.

As shown in FIG. 29, the image sensor 102 is formed by a plurality of the pixels 107 arranged in the form of a matrix. In the fifteenth embodiment, the case where the increased frequency is controlled every pixel 7 will be described. The increased frequency may be alternatively controlled every group of two or more pixels in place of every pixel 7.

Figure 30:
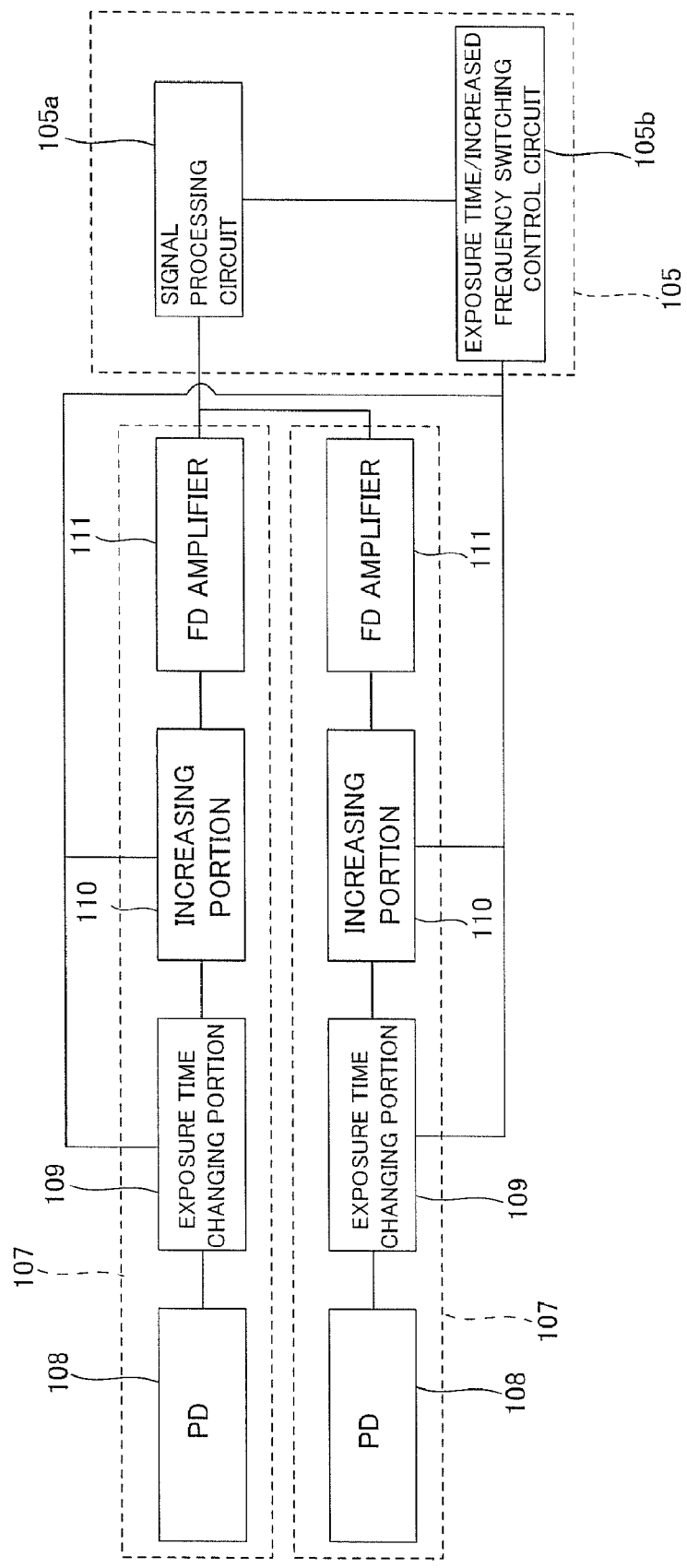
FIG. 30 is a block diagram showing control of an increasing operation of the pixels of the image pickup apparatus according to the fifteenth embodiment of the present invention.

As shown in FIG. 30, each pixel 107 includes a photodiode (PD) 108 for storing charges generated by photoelectric conversion, having a photoelectric conversion function, an exposure time changing portion 109 for controlling exposure time of the pixel 107, the charge increasing portion 110 and a floating diffusion (FD) amplifier 111. The PD 108 is an example of the "storage portion" in the present invention. The PDs 108 are connected to the exposure time changing portions 109 respectively, and the exposure time changing portions 109 are connected to the increasing portions 110 respectively. The digital processing circuit portion 105 connected to the FD amplifiers 111 includes a signal processing circuit 105a and an exposure time/increased frequency switching control circuit 105b, and the exposure time changing portion 109 and the increasing portion 110 of each pixel 107 are so formed as to be independently controlled by the signal processing circuit 105a and the exposure time/increased frequency switching control circuit 105b. FIG. 30 shows only two pixels 107 among the plurality of pixels 107 arranged in the form of a matrix.

Figure 31:
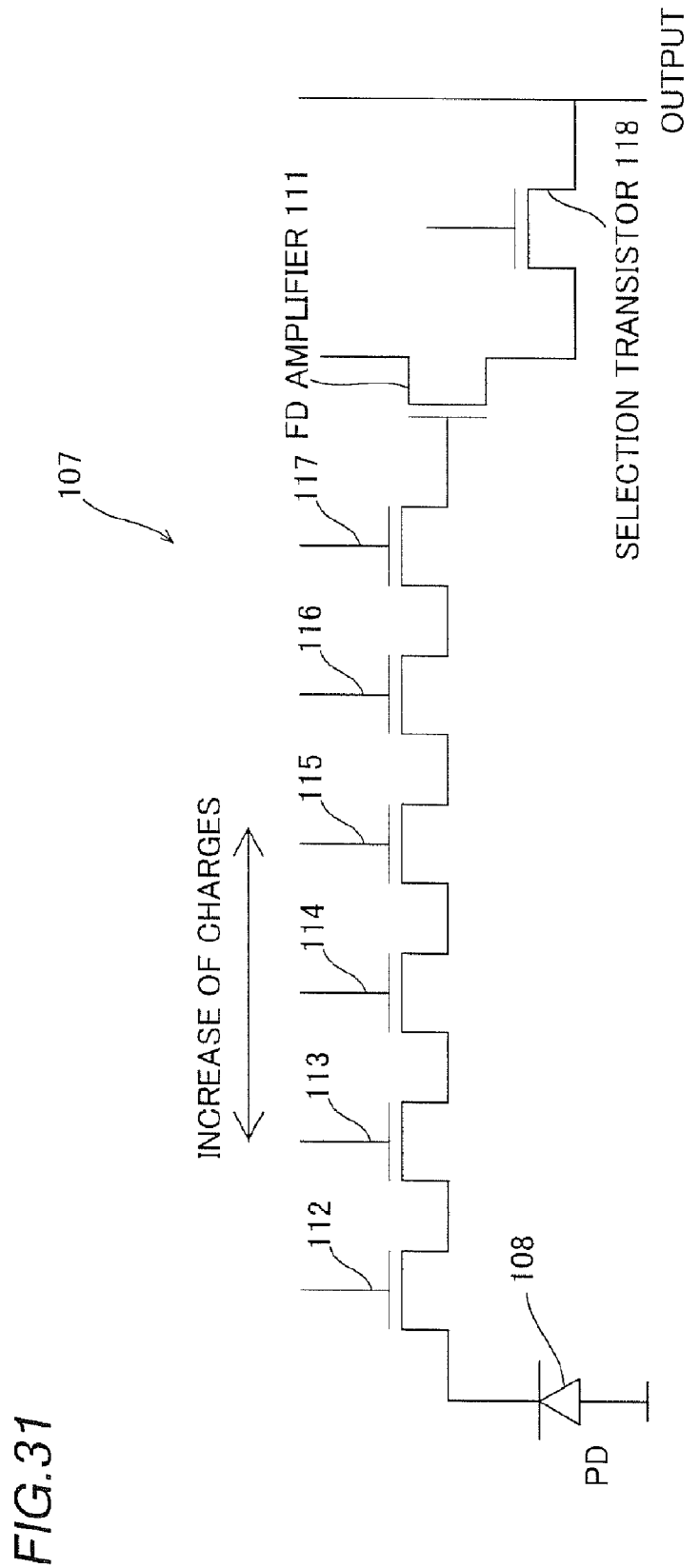
FIG. 31 is a circuit diagram showing a structure of the pixel of the image pickup apparatus according to the fifteenth embodiment of the present invention.

As shown in FIG. 31, each pixel 107 includes the PD 108, transfer gate electrodes 112 to 115 provided adjacent to the PD 8, read gate electrodes 116 and 117, the FD amplifier 111 having a gate connected to the read gate electrode 117 and a selection transistor 118 connected to one of source/drain regions of the FD amplifier 111. According to the fifteenth embodiment, the transfer gate electrode 112 is included in the exposure time changing portion 109 and is so formed as to have a function of controlling the exposure time of the pixel. The transfer gate electrode 112 is an example of the "second transfer gate electrode" in the present invention. An operation of increasing charges is performed under the transfer gate electrodes 113 to 115. According to the fifteenth embodiment, the read gate electrode 116 is so formed as to control output in a column direction of the pixels 107 arranged in the form of a matrix and the read gate electrode 117 is so formed as to control output in a row direction. The read gate electrodes 116 and 117 are examples of the "second read gate electrode" and the "first read gate electrode" in the present invention respectively. The read gate electrode 116 may be so formed as to control output in the row direction of the pixels 7 and the read gate electrode 117 may be so formed as to control output in the column direction.

An operation of the image pickup apparatus according to the fifteenth embodiment of the present invention will be described with reference to FIGS. 32 to 34. In the operation of the image pickup apparatus, the frequency of increasing charges is controlled on the basis of the image information of a last frame and different every pixel 107. In this embodiment, the frequency of the increase operation is set to 0 time, 100 times and 10000 times for the respective pixels 7 on the basis of the image information of a last frame. The number of the pixels in the frame is 25 pixels of 5×5 as an example.

Figure 32:
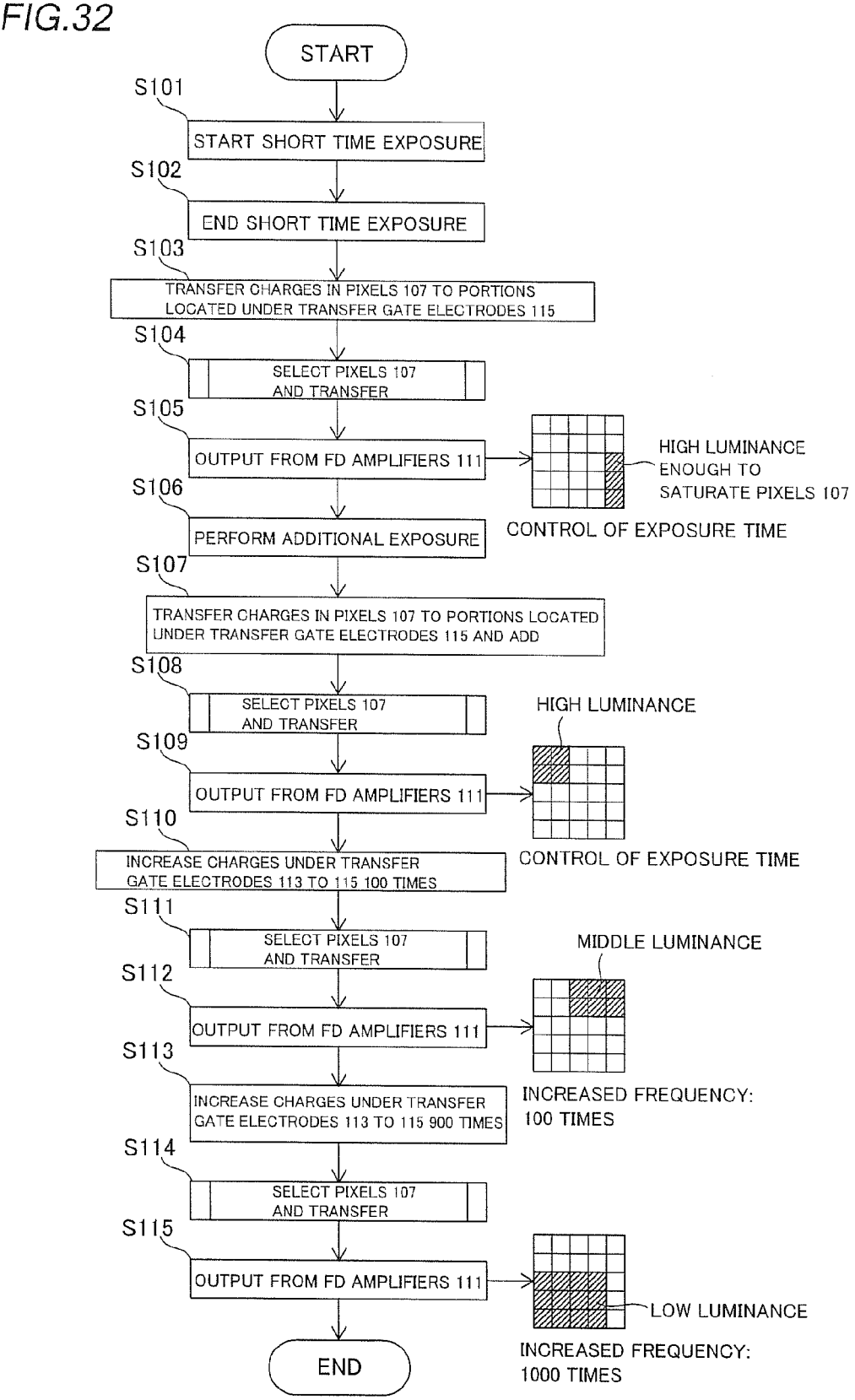
FIG. 32 is a flowchart showing control flow of an operation of the image pickup apparatus according to the fifteenth embodiment of the present invention.
Figure 33:
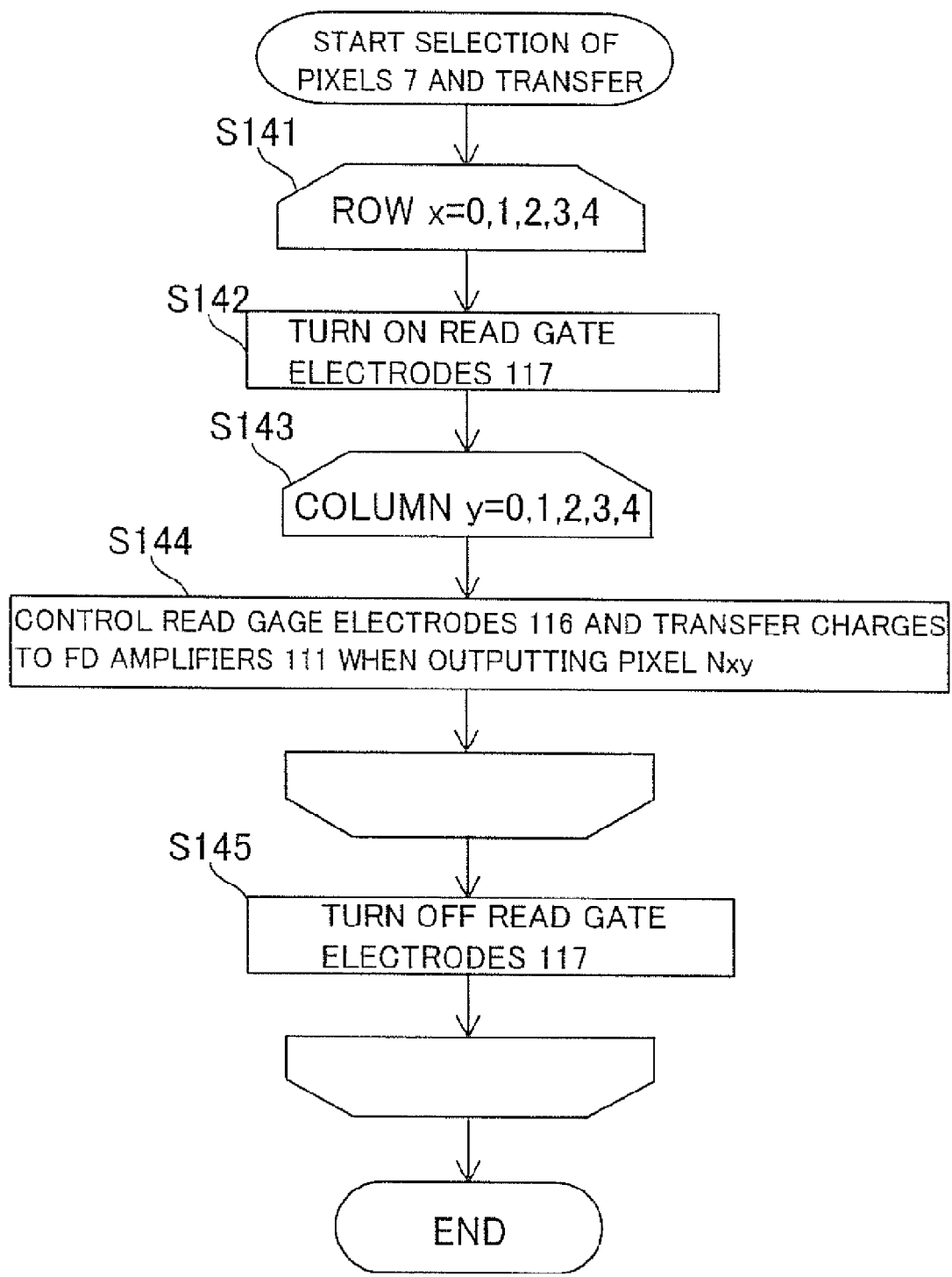
FIG. 33 is a flowchart of a control flow of selection of the pixels of the image pickup apparatus according to the fifteenth embodiment of the present invention.

As shown in FIG. 32, the pixels 107 are exposed for a short time at a step S101. This short exposure time is an example of the "first exposure time" in the present invention. As shown in FIG. 34, this short time exposure is performed for suppressing saturation of the pixels 107 when luminance of light incident upon the pixels 107 is high luminance such that a usual exposure time causes saturation of the pixels 107. At a step S102, the short time exposure is ended. Thus, the charges are stored in the PDs 108. Then, the charges stored in the PDs 108 are stored in portions located under the transfer gate electrodes 115 through portions located under the transfer gate electrodes 112 to 114 at a step S103.

At a step S104, the prescribed pixels 107 (having high luminance enough to be saturated) are selected, and the charges stored in the portions located under the transfer gate electrodes 115 are transferred to the FD amplifiers 111. More specifically, the pixels 107 at the 0th row are selected at a step S141 and the read gate electrodes 117 are turned on at a step S142, as shown in FIG. 33. Then the pixels 107 at the zeroth column to the fourth column are successively selected at a step S143. At a step S144, in the pixels 107 having the high luminance enough to be saturated, the read gate electrodes 116 are turned on and the charges stored in the pixels 107 are transferred to the FD amplifiers 111. The read gate electrodes 117 are turned off at a step S145. Similarly, the charges stored in the pixels 107 having the high luminance enough to be saturated are transferred to the FD amplifiers 111 by successively performing the row selection operation of the step S141 from the first row to the fourth row.

As shown in FIG. 32, signals are output from the FD amplifiers 111 of the pixels 107 having high luminance enough to be saturated by turning on the selection transistors 118 (see FIG. 31) at a step S105.

At a step S106, the pixels 107 are exposed additionally. This additional exposure time is an example of the "second exposure time" in the present invention. Thus, the pixels 107 are exposed for the usual exposure time. At a step S107, the charges stored in the PDs 108 are stored in the portions located under the transfer gate electrodes 115 through the transfer gate electrodes 112 to 114. At this time, the charges transferred at the steps S103 and 107 are added.

At a step S108, the prescribed pixels 107 (having high luminance) are selected similarly to the step S104 and the charges stored in the portions located under the transfer gate electrodes 115 are transferred to the FD amplifiers 111. At a step S109, the selection transistors 118 (see FIG. 31) are turned on, thereby outputting a signal from the FD amplifiers 111 of the pixels 107 having the high luminance.

At a step S110, charges are increased between the portions located under the transfer gate electrodes 113 to 115. More specifically, charges are increased in high-field regions formed on interfaces between the portions located under the transfer gate electrodes 113 and the portions located under the transfer gate electrodes 114 by collisional ionization when the charges stored in the temporary storage wells formed on the portions located under the transfer gate electrodes 115 get over the charge transfer barriers formed on the portions located under the transfer gate electrodes 114 and move to the charge accumulation wells formed on the portions located under the transfer gate electrodes 113. According to the fifteenth embodiment, each high-field region is formed by applying a high voltage to the transfer gate electrode 113. The high-field region formed on the interface between the portions located under the transfer gate electrodes 113 and 114 is an example of the "increasing portion" in the present invention. The transfer gate electrode 113 is an example of the "first transfer gate electrode" in the present invention. The charges are repeatedly moved between the temporary storage wells and the charge accumulation wells so that the charges are further increased. At this time, the charges are increased 100 times. Although this increasing operation of the charges is performed for all of the pixels 107 in the image sensor 102 (see FIG. 29), any influence is not exerted on the image even when the operation of increasing charges in the pixels 107 having high luminance is performed since the signals of the pixels 107 having the high luminance enough to be saturated or the pixels having the luminance not enough to be saturated but the high luminance are already output at the steps S105 and 109.

At a step S111, the charges in the pixels 7 (having middle luminance) on a prescribed region of the image sensor 102 are transferred to the FD amplifiers 111, similarly to the step S108. Thereafter signals of the pixels 107 having the middle luminance are output at a step S112.

At a step S113, the charges are increased between the portions located under the transfer gate electrodes 113 to 115 similarly to the step S110. At this time, the charges are increased 900 times. Thus, the charges are increased 1000 times in total by adding the frequency of increasing charges at the step S110. The increasing operation of the charges is performed for all of the pixels 107 in the image sensor 102 similarly to the step S110.

At a step S114, the charges in the pixels 107 (having low luminance) on a prescribed region of the image sensor 102 are transferred to the FD amplifiers 111 similarly to the steps S104, 108 and S111. Thereafter signals of the pixels 7 having low luminance are output at the step S115.

Digital composition of the image will be now described with reference to FIG. 34.

Figure 34:
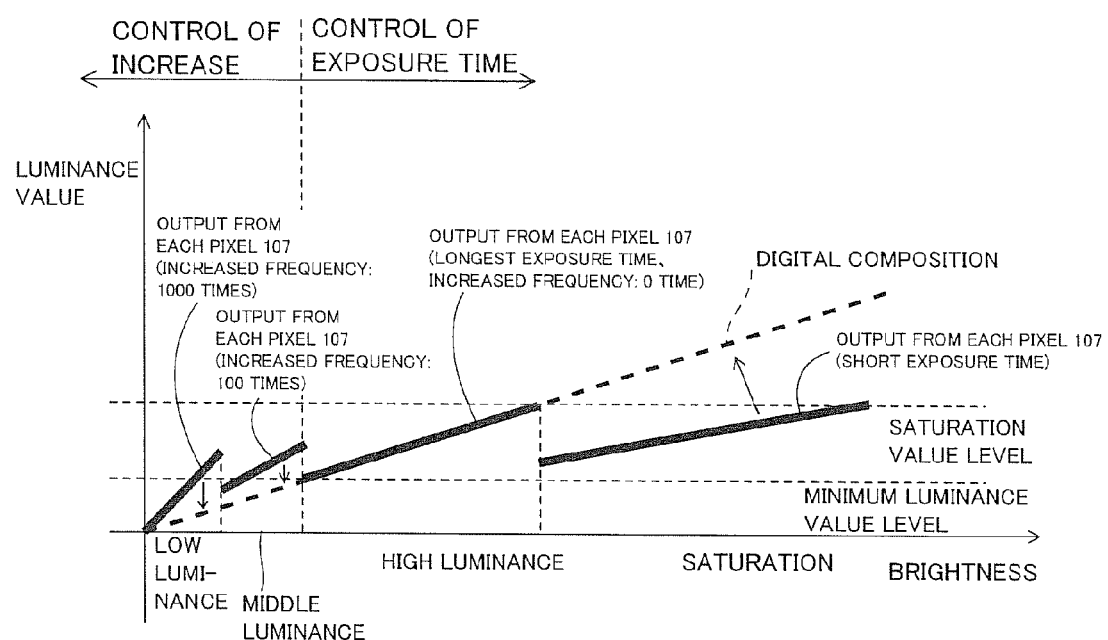
FIG. 34 is a diagram showing the relation between brightness (luminance) of light incident upon the pixels and luminance value after the operation of increasing charges and luminance value after control of exposure time.

As shown in FIG. 34, when the light incident upon the pixels 107 is bright enough to be saturated, the exposure time of the pixels 107 is controlled to be rendered shorter than the usual exposure time. When the light incident upon the pixels 107 is not enough to be saturated but bright (high luminance), the charges are not increased (0 time). In this case, the luminance of the light incident upon the pixels 107 is luminance values output from the pixels 107. When the light incident upon the pixels 7 is middle (middle luminance), the charges are increased 100 times and the luminance of the increased charges is the luminance values output from the pixels 107. Then the light incident upon the pixels 107 is dark (low luminance), the charges are increased 1000 times, and the luminance of the increased charges is the luminance values output from the pixels 107. The digital composition of the image is performed with reference to the luminance values output from all of the pixels 107 and the increased frequencies. Thus, according to the fifteenth embodiment, the control of the exposure time and the control of the frequency of increasing charges are so switched that sensitivity is adjusted by controlling the exposure time of the pixels 107 when the light incident upon the pixels 107 is high luminance or more, while the sensitivity is adjusted by controlling the frequency of increasing charges when the light incident upon the pixels 107 is middle luminance or less.

An operation of the control of the sensitivity according to the fifteenth embodiment of the present invention will be described with reference to FIG. 35. In this embodiment, the sensitivity is controlled independently every pixel 107 in the plurality of pixels 107 included in the image sensor 102.

Figure 35:
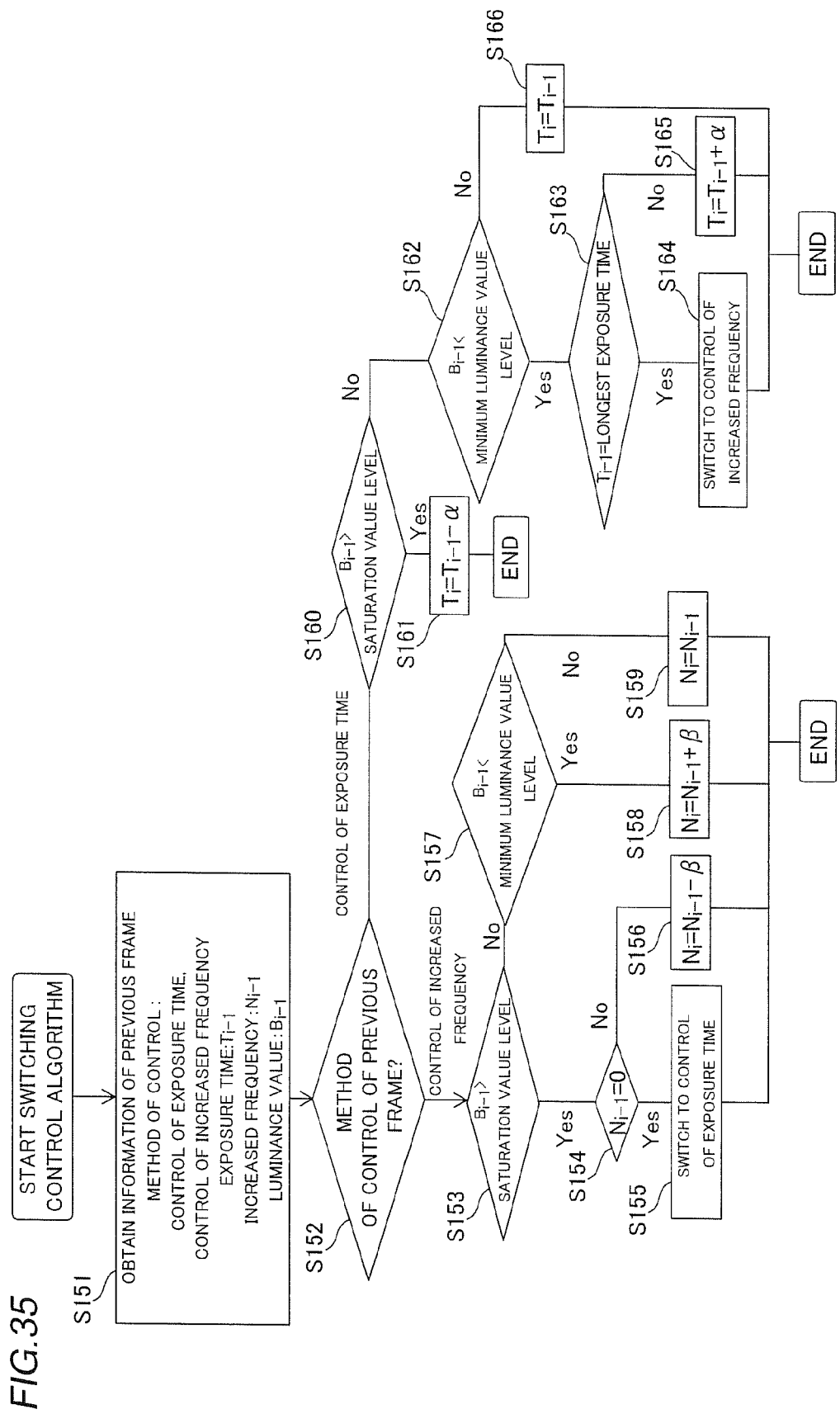
FIG. 35 is a flowchart showing control flow of sensitivity of the image pickup apparatus according to the fifteenth embodiment of the present invention.

As shown in FIG. 35, the information as to whether the sensitivity of prescribed pixels 107 of a last frame is adjusted by the control of the exposure time or by the control of the frequency of increasing charges is obtained at a step S151. Additionally, the information of exposure time ($T_{i-1}$), a frequency ($N_{i-1}$) of increasing charges and luminance ($B_{i-1}$) are obtained. At a step S152, when the sensitivity of each prescribed pixel 107 of the last frame is adjusted by control of the frequency of increasing charges the last frame, the process proceeds to a step S153. At this time, it is determined whether the luminance value ($B_{i-1}$) of the prescribed pixel 107 of the last frame is higher or lower than the saturation value level of the pixel 107. The saturation value level means a maximum level capable of obtaining linear characteristics in the relation between brightness of the light incident upon each pixel 107 and the luminance value. The luminance value other than the saturation value level may be employed as the level for determination. When the luminance ($B_{i-1}$) of the prescribed pixel 107 of the last frame is higher than the saturation value level of the pixel 107, it is determined whether the frequency ($N_{i-1}$) of increasing charges in the prescribed pixel 107 of the last frame is 0 time or not. When the frequency ($N_{i-1}$) of increasing charges is 0 time, the process is proceed to a step S155 and the control is switched from the control of the frequency of increasing charges to the control of the exposure time. When the frequency ($N_{i-1}$) of increasing charges is not 0 time, the process is proceed to a step S156 and a frequency ($N_i$) of increasing charges in the prescribed pixel 107 of a current frame is set to a value obtained by subtracting a certain frequency (β) from the frequency ($N_{i-1}$) of increasing charges in the prescribed pixel 107 of the last frame.

At a step S153, when the luminance value ($B_{i-1}$) of each prescribed pixel 107 of the last frame is lower than the saturation value level of each pixels 107, the process proceeds to a step S157. At this time, it is determined whether the luminance ($B_{i-1}$) of the prescribed pixel 107 of the last frame is higher or lower than the minimum luminance value level of the pixel 107. The minimum luminance value level means a minimum level capable of obtaining prescribed accuracy of the image pickup apparatus in the relation between brightness of the light incident upon each pixel 107 and the luminance value. The luminance value other than the minimum luminance value level may be employed as the level for determination. When the luminance value ($B_{i-1}$) of each prescribed pixel 107 of the last frame is lower than the minimum luminance value level of the pixel 107, the process proceeds to a step S158 and the frequency ($N_i$) of increasing charges in each prescribed pixel 107 of the current frame is set to a value obtained by adding the certain frequency (β) to the frequency ($N_{i-1}$) of increasing charges in the prescribed pixel 107 of the last frame. When the luminance ($B_{i-1}$) of the prescribed pixel 107 of the last frame is higher than the minimum luminance value level of the pixel 107, the process proceeds to a step S159 and the frequency ($N_i$) of increasing charges in the prescribed pixel 107 of the current frame is set to the same number of times as the frequency ($N_{i-1}$) of increasing charges in the prescribed pixel 107 of the last frame.

At a step S152, when the sensitivity of each prescribed pixel 107 of the last frame is adjusted by control of the exposure time, the process proceeds to a step S160. At this time, it is determined whether the luminance value ($B_{i-1}$) of each prescribed pixel 107 of the last frame is higher or lower than the saturation value level of each pixel 107. When the luminance value ($B_{i-1}$) of the prescribed pixel 107 of the last frame is higher than the saturation value level of the pixel 107, the process is proceed to a step S161 and exposure time ($T_i$) of each prescribed pixels 107 of a current frame is set to a value obtained by subtracting certain time (α) from exposure time ($T_{i-1}$) of the prescribed pixel 107 of the last frame. When the luminance value ($B_{i-1}$) of the prescribed pixel 107 of the last frame is lower than the saturation value level of the pixel 107, the process is proceed to a step S162. At this time, it is determined whether the luminance value ($B_{i-1}$) of the prescribed pixel 107 of the last frame is higher or lower than the minimum luminance value level of the pixel 107. When the luminance ($B_{i-1}$) of the prescribed pixel 107 of the last frame is lower than the minimum luminance value level of the pixel 107, the process is proceed to a step S163 and it is determined whether the exposure time ($T_{i-1}$) of the prescribed pixel 107 of the last frame is equal to maximum exposure time previously set. At this time, when the exposure time ($T_{i-1}$) is equal to the maximum exposure time, the process proceeds to a step S164 and the control is switched from the control of the exposure time to the control of the frequency of increasing charges. When the exposure time ($T_{i-1}$) is not equal to the maximum exposure time, the process proceed to a step S165 and the exposure time ($T_i$) of each prescribed pixel 107 of the current frame is set to a value obtained by adding the certain time (α) to the exposure time ($T_{i-1}$) of the prescribed pixel 107 of the last frame.

When the luminance ($B_{i-1}$) of the prescribed pixel 107 of the last frame is higher than the minimum luminance value level of each pixel 107, the process proceeds to a step S166 and the exposure time ($T_i$) of the prescribed pixel 107 of the current frame is set to the same exposure time 107 ($T_{i-1}$) of the prescribed pixel 107 of the last frame.

The control of the frequency of increasing charges may be performed every region of the image sensor 102 or may be performed every frame. Alternatively, the control of the frequency of increasing charges may be parallelized for all of the pixels 107 or may be serially processed every pixel 107.

According to the fifteenth embodiment, as hereinabove described, the control of the frequency of increasing the charges stored in the pixels 107 and the control of the exposure time of the pixels 107 are switched every pixel in response to the luminance of the light incident upon the pixels 107 so that the sensitivity of the image pickup apparatus is changed, whereby the saturation of the pixels 107 can be suppressed by reducing the exposure time when the luminance is high enough to saturate the pixels 107, and the operation of increasing the charges can be performed by the increasing portions 110 when the luminance is low. Thus, reduction in the dynamic range of the image pickup apparatus can be suppressed.

According to the fifteenth embodiment, as hereinabove described, the sensitivity is adjusted by controlling the frequency of increasing the charges with the increasing portions 110 when the luminance of the light incident upon the pixels 107 is lower than the prescribed value, and the sensitivity is adjusted by controlling the exposure time of the pixels 107 with the exposure time changing portions 109 when the luminance of the light incident upon the pixels 107 is higher than the prescribed value, whereby an optimum image can be easily obtained by controlling the frequency of increasing the charges when the luminance is low and the optimum image can be easily obtained by controlling the exposure time when the luminance is high enough to saturate the pixels 107.

According to the fifteenth embodiment, as hereinabove described, each of the pixels 107 includes the transfer gate electrode 133 transferring the charges and applying a voltage for increasing the charges, whereby the charges can be easily transferred while increasing the charges.

According to the fifteenth embodiment, as hereinabove described, each pixel 107 is formed adjacent to the PD 108 and includes the transfer gate electrode 112 having a function of transferring the charges and included in the exposure time changing portion 109, and the exposure time of the pixel 107 is controlled by the transfer gate electrode 112, whereby the exposure time of the pixel 107 can be easily controlled by controlling ON/OFF timing to the transfer gate electrode 112.

According to the fifteenth embodiment, as hereinabove described, the frequency of increasing the charges and the exposure time are controlled in response to the luminance of the light incident upon the pixels 107, whereby reduction in the dynamic range of the image pickup apparatus can be suppressed by reducing the exposure time for portions where the pixels are saturated, reducing the frequency of increasing charges for bright portions and increasing the frequency of increasing charges for dark portions even when the bright portions and the dark portions mix in the image of one frame.

Sixteenth Embodiment

In a sixteenth embodiment, a structure of an image pickup apparatus controlling the frequency of increasing charges every frame will be described with reference to FIG. 36, dissimilarly to the aforementioned fifteenth embodiment.

Figure 36:
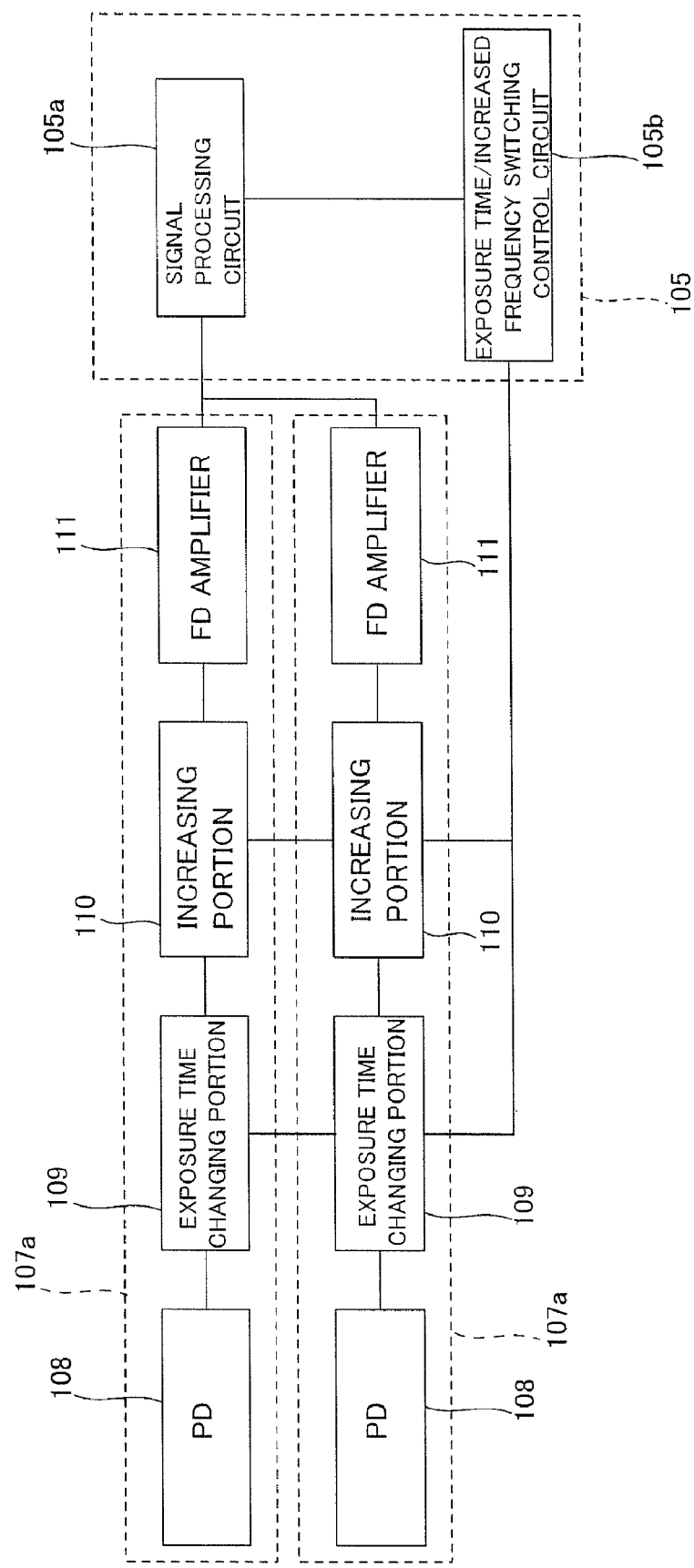
FIG. 36 is a block diagram of control of increasing portions of pixels of an image pickup apparatus according to a sixteenth embodiment of the present invention.

As shown in FIG. 36, each of pixels 107a of the image pickup apparatus according to the sixteenth embodiment includes a photodiode (PD) 108, an exposure time changing portion 109 for controlling exposure time of the pixel 107a, the charge increasing portion 110 and an FD amplifier 111. A digital processing circuit portion 105 includes a signal processing circuit 105a and an exposure time/increased frequency switching control circuit 105b, and the signal processing circuit 105a and the exposure time/increased frequency switching control circuit 105b give the same control to the exposure time changing portions 109 and the increasing portions 110 of all of the pixels 107a included in the image sensor 102. FIG. 36 shows only two pixels 107a among the plurality of pixels 107a arranged in the form of a matrix.

The remaining structure of the sixteenth embodiment is similar to that of the aforementioned fifteenth embodiment.

An operation of the image pickup apparatus according to the sixteenth embodiment of the present invention will be described with reference to FIG. 37.

Figure 37:
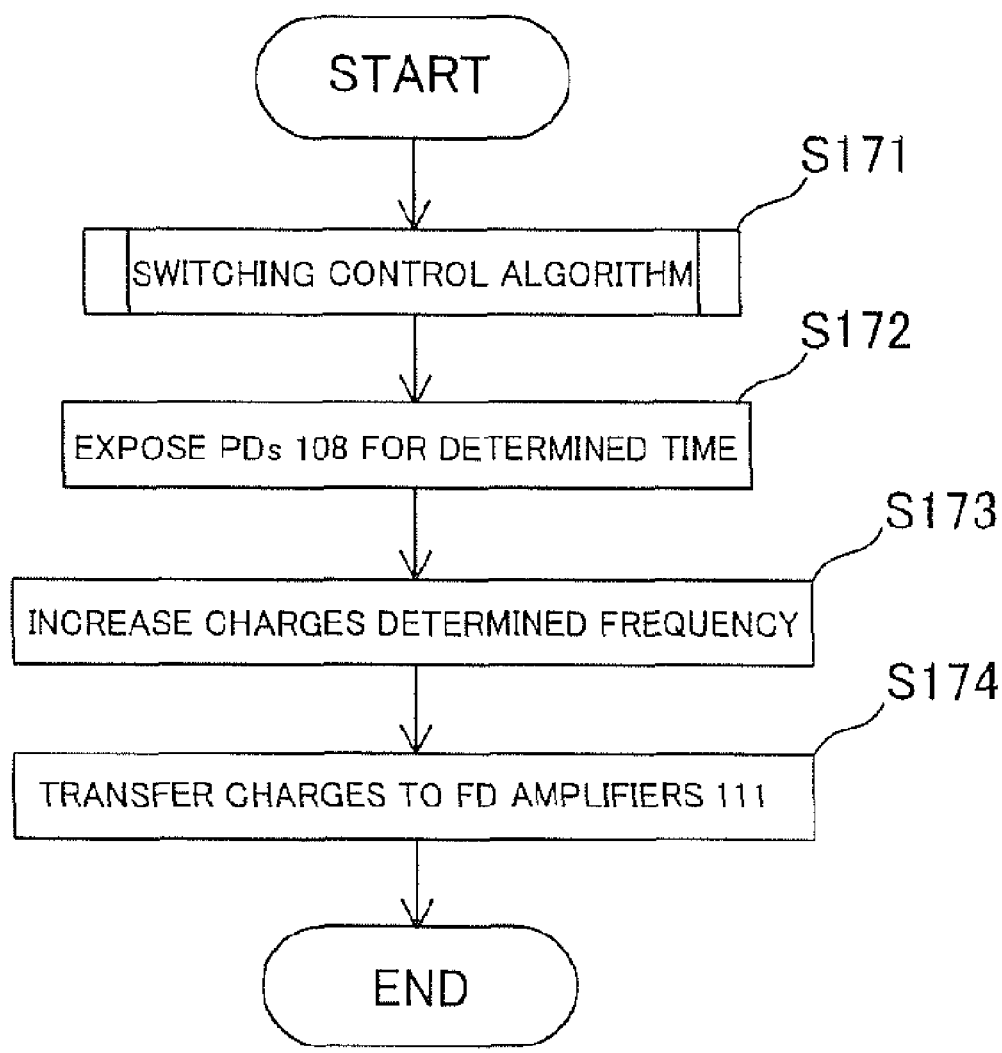
FIG. 37 is a flowchart showing control flow of the image pickup apparatus according to the sixteenth embodiment of the present invention.

As shown in FIG. 37, switching control algorithm (see FIG. 35) is performed at a step S171. The switching control algorithm is performed every frame on the basis of the image information of a last frame. At a step S172, the PDs 108 (see FIG. 36) are exposed on the basis of the exposure time determined at the step S171. At a step S173, charges are increased on the basis of the increased frequency determined at the step S171. Thereafter the charges are transferred to the FD amplifiers 111 (see FIG. 36) at a step S174.

According to the sixteenth embodiment, as hereinabove described, the control of the frequency of increasing the charges stored in the pixels 107a and the control of the exposure time of the pixels 107a are switched every frame in response to the luminance of the light incident upon the pixels 107a so that the sensitivity of the image pickup apparatus is changed, whereby the saturation of the pixels 107a can be suppressed by reducing the exposure time when the luminance is high enough to saturate the pixels 107a, and the operation of increasing the charges can be performed by the increasing portions 110 when the luminance is low. Thus, reduction in the dynamic range of the image pickup apparatus can be suppressed.

According to the sixteenth embodiment, as hereinabove described, the control of the frequency of increasing the charges stored in the pixels 107a and the control of the exposure time of the pixels 107a are switched every frame in response to the luminance of light incident upon the pixels 107a, whereby the control can be simplified as compared with the case where the control of the frequency of increasing the charges stored in the pixels 107a and the control of the exposure time of the pixels 107a are switched every pixel 107.

Seventeenth Embodiment

Figure 38:
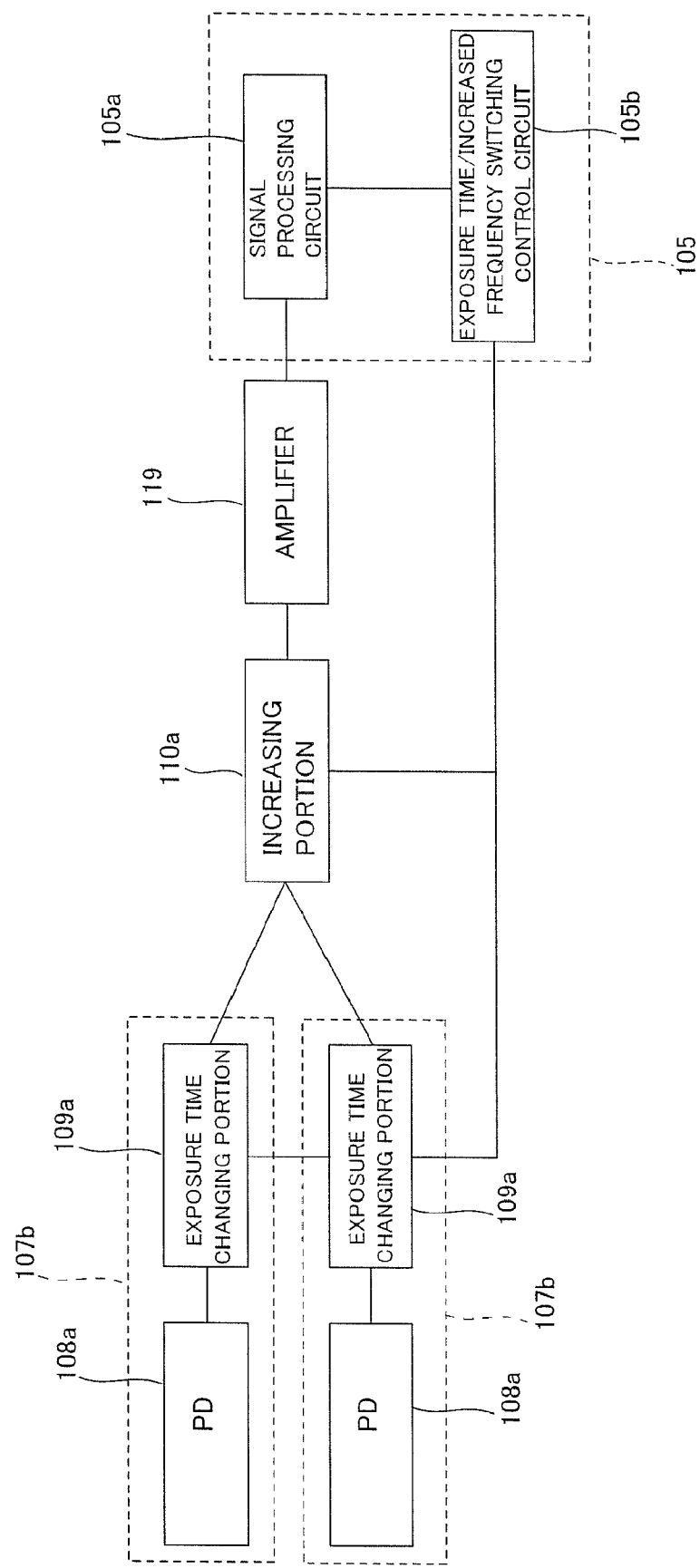
FIG. 38 is a block diagram of control of an increasing portion of pixels of an image pickup apparatus according to a seventeenth embodiment of the present invention.

A structure of a CCD image pickup apparatus according to a seventeenth embodiment will be described with reference to FIG. 38, dissimilarly to the aforementioned sixteenth embodiment.

In the CCD image pickup apparatus according to the seventeenth embodiment, each of the pixels 107b includes a PD 108a, and an exposure time changing portions 109a, and a plurality of the PDs 108a are connected to an increasing portion 110a provided outside the pixels 107b. The PD 108a is an example of the "storage portion" in the present invention. The increasing portion 110a is connected to an amplifier 119 and the amplifier 119 is connected to a signal processing circuit 105a. The signal processing circuit 105a, the exposure time changing portions 109a and the increasing portion 110a are connected to an exposure time/increased frequency switching control circuit 105*b*. FIG. 38 shows only two pixels 107 among the plurality of pixels 107 arranged in the form of a matrix. In the CCD image pickup apparatus, the exposure time of the pixels 107*b* and the frequency of increasing charges are controlled every frame on the basis of the information of a last frame similarly to the aforementioned sixteenth embodiment.

The remaining structure and operation of the seventeenth embodiment are similar to those of the aforementioned sixteenth embodiment.

The effects of the seventeenth embodiment are similar to those of the aforementioned sixteenth embodiment.

Eighteenth Embodiment

In an eighteenth embodiment, an image pickup apparatus where charges in all of pixels 107 are simultaneously read after transferring the charges stored in all of the pixels 107 to FD amplifiers 111 will be described with reference to FIG. 39, dissimilarly to the aforementioned fifteenth embodiment.

A structure of the pixels 107 of the image pickup apparatus according to this eighteenth embodiment is similar to that of the aforementioned fifteenth embodiment shown in FIG. 31.

An operation of the image pickup apparatus according to the eighteenth embodiment of the present invention will be now described with reference to FIG. 39.

Figure 39:
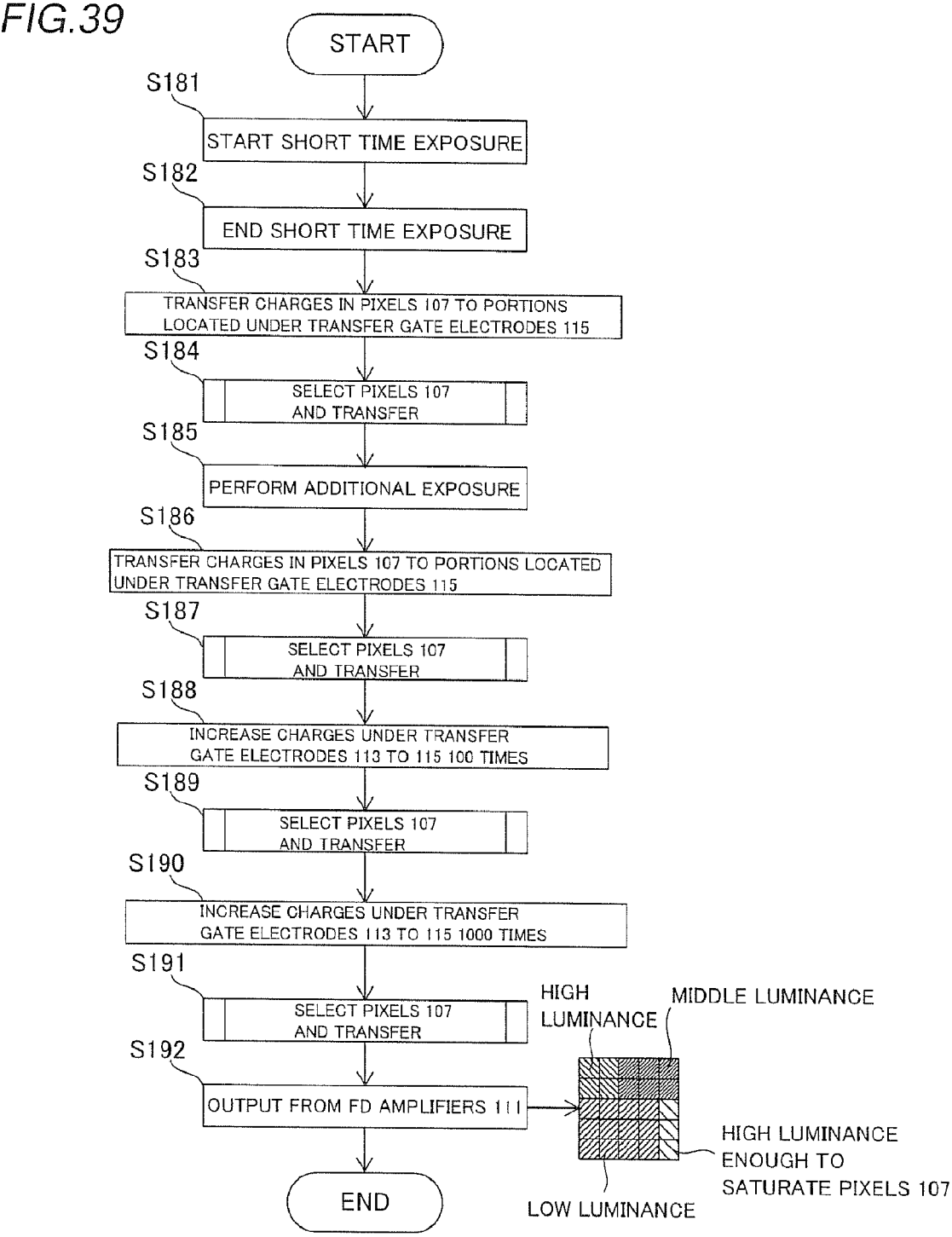
FIG. 39 is a flowchart showing control flow of an image pickup apparatus according to an eighteenth embodiment of the present invention.

As shown in FIG. 39, the pixels 107 are exposed for a short time at a step S181. This short time exposure is performed for suppressing saturation of the pixels 107 when luminance of light incident upon the pixels 107 is high luminance such that a usual exposure time causes saturation of the pixels 107 similarly to the aforementioned fifteenth embodiment. At a step S182, the short time exposure is ended. Thus, the charges are stored in the PDs 108. Then, the charges stored in the PDs 108 are stored in portions located under the transfer gate electrodes 115 through portions located under the transfer gate electrodes 112 to 114 at a step S183.

At a step S184, the prescribed pixels 107 (having high luminance enough to be saturated) are selected, and the charges stored in the portions located under the transfer gate electrodes 115 are transferred to the FD amplifiers 111. More specifically, the operation is similar to that of the aforementioned fifteenth embodiment shown in FIG. 33.

At a step S185, the pixels 107 are exposed additionally. Thus, the pixels 107 are exposed for the usual exposure time. At a step S186, the charges stored in the PDs 108 are stored in the portions located under the transfer gate electrodes 115 through the transfer gate electrodes 112 to 114. At this time, the charges transferred at the steps S183 and 186 are added.

At a step S187, prescribed pixels 107 (having high luminance) are selected similarly to the step S184 and the charges stored in the portions located under the transfer gate electrodes 115 are transferred to the FD amplifiers 111.

At a step S188, charges are increased between the portions located under the transfer gate electrodes 113 to 115. The specific operation is similar to that of the aforementioned fifteenth embodiment. The charges are increased 100 times. Although this increasing operation of the charges is performed for all of the pixels 107 in the image sensor 102, any influence is not exerted on the image even when the operation of increasing charges in the pixels 107 having high luminance is performed since the signals of the pixels 107 having the high luminance are already transferred to the FD amplifiers 111 at the steps S184 and 187.

At a step S189, the charges in the pixels 7 (having middle luminance) on a prescribed region of the image sensor 102 are transferred to the FD amplifiers 111, similarly to the step S187.

At a step S190, the charges are increased between the portions located under the transfer gate electrodes 113 to 115 similarly to the step S188. At this time, the charges are increased 900 times. Thus, the charges are increased 1000 times in total by adding the frequency of increasing charges at the step S188. The increasing operation of the charges is performed for all of the pixels 107 in the image sensor 102 similarly to the step S188. At a step S191, the charges are transferred to the FD amplifiers 111 similarly to the steps S184, S187 and S189.

At a step S192, signals of the charges stored in the FD amplifiers 111 in all of the pixels 107 are simultaneously output. Thus, a single operation of outputting the signals can be performed dissimilarly to the case where the signals of the pixels 107 having high luminance, middle luminance and low luminance respectively are output separately, and hence the outputting operation of the image sensor 102 can be performed at a high speed.

The remaining effects of the eighteenth embodiment are similar to those of the aforementioned fifteenth embodiment.

Nineteenth Embodiment

Figure 40:
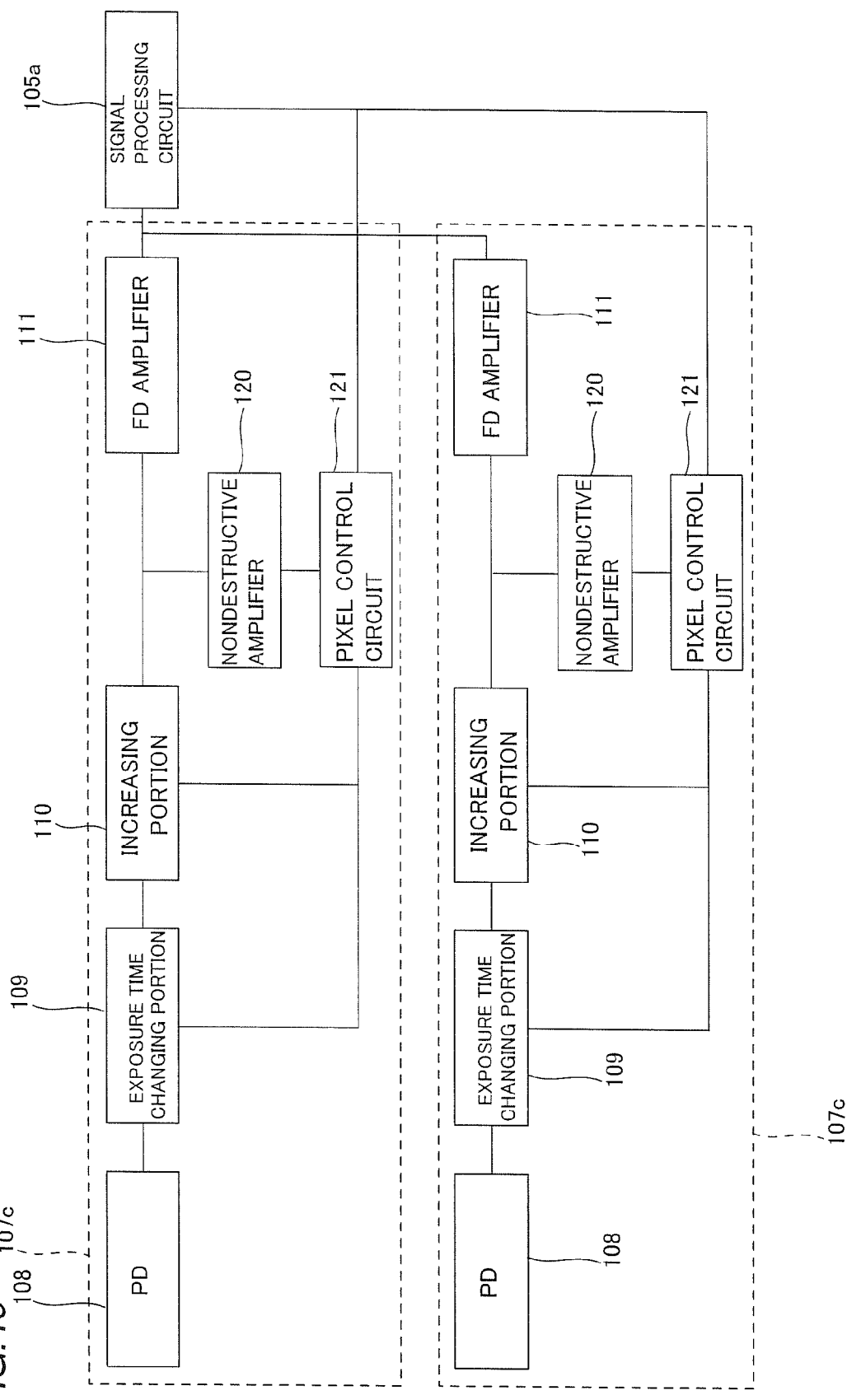
FIG. 40 is a block diagram showing control of pixels of an image pickup apparatus according to a nineteenth embodiment of the present invention.

In a nineteenth embodiment, a structure of an image pickup apparatus where control of an increasing operation and exposure time is performed in pixels 107*c* will be described with reference to FIGS. 40 and 41, dissimilarly to the aforementioned fifteenth embodiment.

Each of the pixels 107*c* according to the nineteenth embodiment includes a PD 108, an exposure time changing portion 109, a charge increasing portion 110, an FD amplifier 111, a nondestructive amplifier (floating gate amplifier: FG amplifier) 120 and a pixel control circuit 121, as shown in FIG. 40. The PD 108 is connected to the exposure time changing portion 109 connected to the increasing portion 110. The increasing portion 110 is connected to the FD amplifier 111. The nondestructive amplifier 120 is connected to the increasing portion 110 and the FD amplifier 111. In the FD amplifier 111, signal charges are reset after detecting signals and therefore the signal charges can not be reused. In the nondestructive amplifier 120, on the other hand, signals can be detected while holding the signal charges. The pixel control circuit 121 is connected to the increasing portion 110 and the nondestructive amplifier 120. The signal processing circuit 105*a* is provided outside the pixels 107*c* and is connected to the FD amplifier 111 and the pixel control circuit 121 of each pixel 107*c*. According to the nineteenth embodiment, the frequency of increasing charges in each pixel 107*c* and the exposure time is controlled by the pixel control circuit 121.

Figure 41:
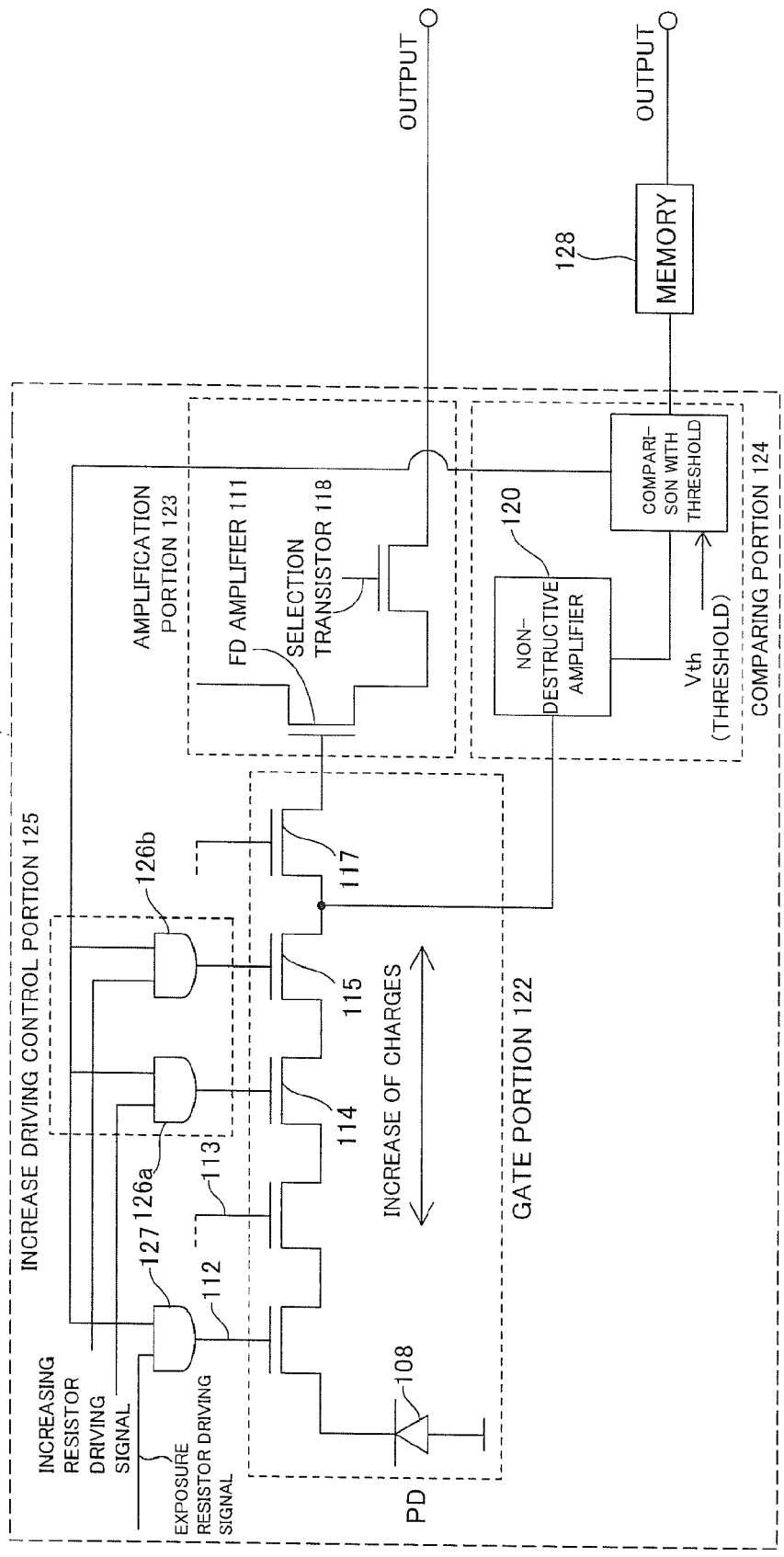
FIG. 41 is a circuit diagram showing a structure of the pixel of the image pickup apparatus according to the nineteenth embodiment of the present invention.

As shown in FIG. 41, each of the pixels 107*c* includes a gate portion 122, an amplifier portion 123, a comparing portion 124 and an increase driving control portion 125. The gate portion 122 is constituted by a PD 108, transfer gate electrodes 112 to 115 provided adjacent to the PD 108 and a read gate electrode 117. In an operation of increasing charges, the charges are increased under the transfer gate electrodes 113 to 115.

The amplifier portion 123 is constituted by the FD amplifier 111 and the selection transistor 118. The FD amplifier 111 is connected to the read gate electrode 117 of the gate portion 122 and the selection transistor 118. A signal is output through the selection transistor 118.

The comparing portion 124 is constituted by the nondestructive amplifier 120 and the nondestructive amplifier 120 is connected to a portion between the transfer gate electrodes 115 and the read gate electrode 117. The nondestructive amplifier 120 is so formed as to control increase of the charges by comparing the charges stored in the pixel 107*c* with a threshold ($V_{th}$) of a prescribed voltage.

The increase driving control portion 125 includes a logic circuit selecting whether or not an increasing resistor driving signal is applied on the basis of output of the comparing portion 124. For example, the increase driving control portion 125 is constituted by two AND circuits 126*a* and 126*b* shown in FIG. 41. The AND circuits 126*a* and 126*b* are so formed as to receive signals obtained by comparing the charges stored in each pixel 107*c* with the thresholds ($V_{th}$) respectively.

A gate of the transfer gate electrode 112 is connected to output of a logic circuit selecting whether or not an exposure resistor driving signal is applied on the basis of the comparing portion 124. For example, the gate of the transfer gate electrode 112 is constituted by an AND circuit 127 shown in FIG. 41. The AND circuit 127 is so formed as to receive the exposure resistor driving signal and a signal obtained by comparing the charges stored in each pixel 107*c* with the threshold ($V_{th}$), and the exposure time of the PD 108 is so controlled by turning on/off the gate of the transfer gate electrode 112.

A memory 128 is provided outside the pixels 107*c* and stores frequencies of control of the increased frequency and exposure time until the charges stored in the pixels 107*c* exceed the threshold ($V_{th}$).

The remaining structure of the nineteenth embodiment is similar to that of the aforementioned fifteenth embodiment.

Figure 43:
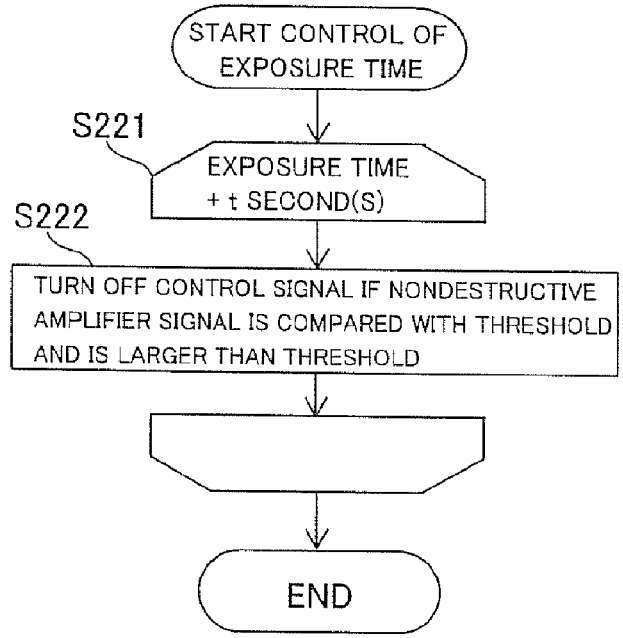
FIG. 43 is a flowchart showing control flow of exposure time of the image pickup apparatus according to the nineteenth embodiment of the present invention.
Figure 44:
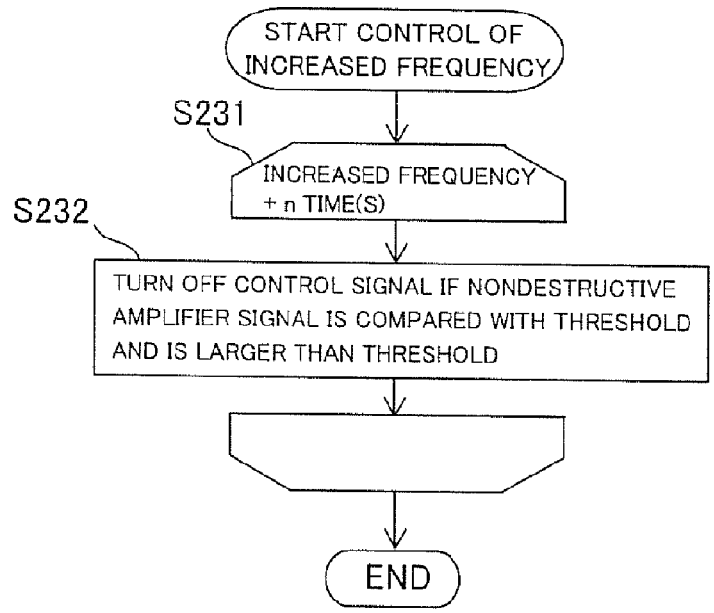
FIG. 44 is a flowchart showing control flow of the frequency of an increasing operation of charges of the image pickup apparatus according to the nineteenth embodiment of the present invention.

An operation of the pixels 107*c* according to the nineteenth embodiment of the present invention will be described with reference to FIGS. 42 to 44.

Figure 42:
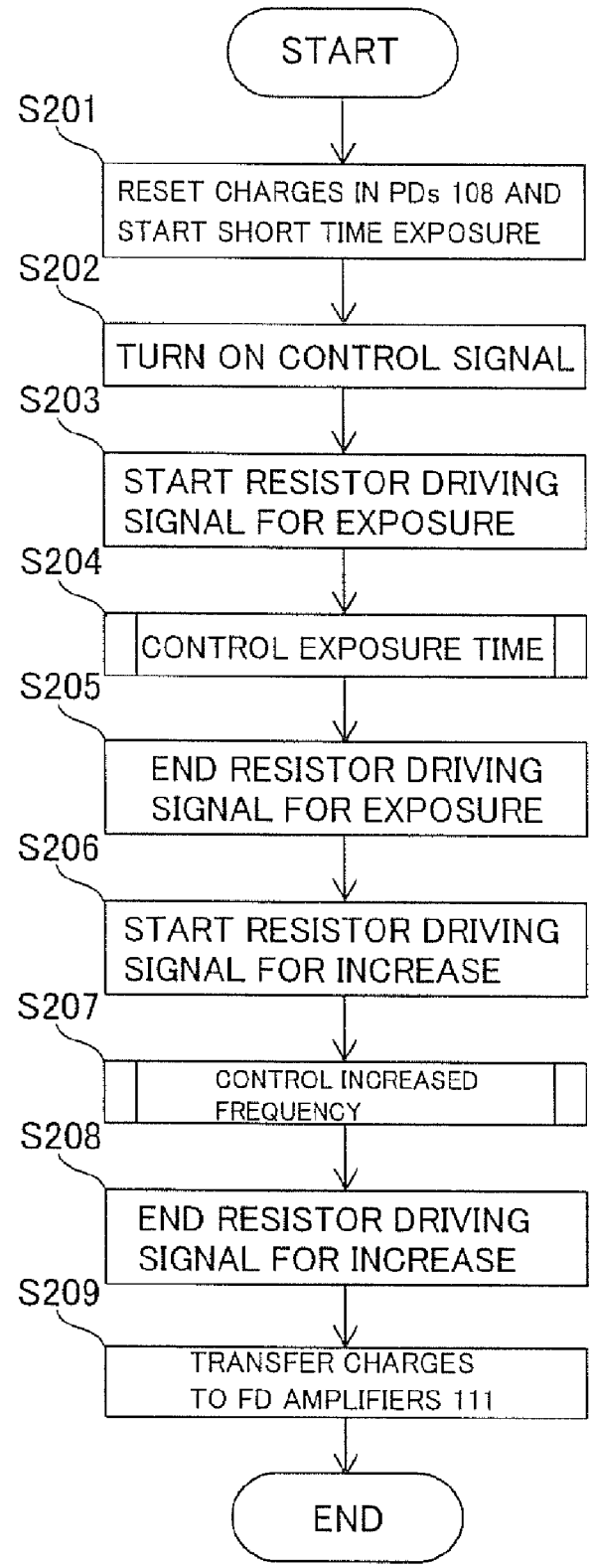
FIG. 42 is a flowchart showing control flow of the pixels of the image pickup apparatus according to the nineteenth embodiment of the present invention.

As shown in FIG. 42, the pixels 107*c* are exposed after resetting charges to be stored in the PDs 108 at a step S201. Thus, the charges are stored in PDs 108. At a step S202, the control signals of controlling the exposure time and the increased frequency are turned on. Then, the transfer gate electrodes 112 (see FIG. 41) start receiving the exposure resistor driving signals for controlling exposure at a step S203.

At a step S204, the exposure time is controlled. More specifically, t second(s) is added to the exposure time at a step S221, as shown in FIG. 43. At a step S222, if signals by the charges stored in the PDs 108 and transferred to the nondestructive amplifiers 120 are compared with the threshold ($V_{th}$) and signals of the nondestructive amplifiers 120 are larger than the threshold ($V_{th}$), the control signals of controlling the exposure time are turned off. The operation of adding the t second(s) to the exposure time at a step S221 is repeated a prescribed number of times.

As shown in FIG. 42, input of the register driving signals for exposure is ended at a step S205. At a step S206, the transfer gate electrodes 114 and 115 (see FIG. 41) start receiving the increasing resistor driving signals for controlling the frequency of the increasing operation.

At a step S207, the increased frequency is controlled. More specifically, n time(s) is added to the increased frequency at a step S231, as shown in FIG. 44. At a step S232, if signals by the charges increased on portions located under the transfer gate electrodes 113 and transferred to the nondestructive amplifiers 120 are compared with the threshold ($V_{th}$) and signals of the nondestructive amplifiers 120 are larger than the threshold ($V_{th}$), the control signals of controlling the increased frequency are turned off. The operation of adding the n time(s) to the increased frequency at the step S231 is repeated a prescribed number of times.

As shown in FIG. 42, input of the register driving signals for the increasing operation is ended at a step S208. At a step S209, the charges are transferred to the FD amplifiers 111.

According to the nineteenth embodiment, as hereinabove described, each of the pixels 107*c* includes the pixel control circuit 121 switching the control of the exposure time changing portion 109 and the increasing portion 110, whereby the sensitivity of the image pickup apparatus can be controlled by employing the signals in the same frame dissimilarly to the case where the pixel control circuit 121 is provided outside each pixel 107*c*.

Twentieth Embodiment

In a twentieth embodiment, a structure of an image pickup apparatus increasing charges between PDs 108 and portions located under transfer gate electrodes 113*a* and 114*a* will be described with reference to FIG. 45 dissimilarly to the aforementioned fifteenth embodiment.

Figure 45:
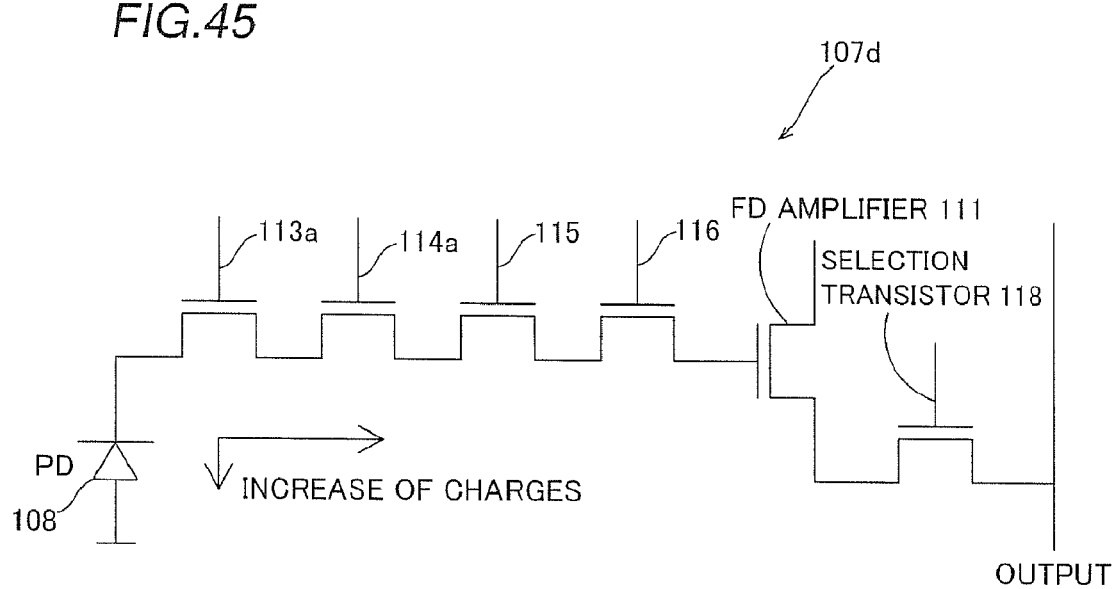
FIG. 45 is a circuit diagram showing a structure of a pixel of an image pickup apparatus according to a twentieth embodiment of the present invention.

Each of pixels 107*d* of the image pickup apparatus according to the twentieth embodiment includes the PD 108, transfer gate electrodes 113*a* and 114*a* provided adjacent to the PD 8 and read gate electrodes 115 and 116, a FD amplifier portion 111, and a selection transistor 118 as shown in FIG. 45. The charges are increased in the PDs 108 and the portions located under the transfer gate electrodes 113*a* and 114*a*. The read gate electrode 115 is so formed as to control output in a column direction of the pixels 107*d* arranged in the form of a matrix and the read gate electrode 116 is so formed as to control output in a row direction.

The remaining structure of the twentieth embodiment is similar to that of the aforementioned fifteenth embodiment.

An operation of increasing charges according to the twentieth embodiment of the present invention will be described with reference to FIG. 45.

First, the charges stored in the PDs 108 get over charge transfer barriers formed on the portions located under the transfer gate electrodes 113*a* and move to charge accumulation wells formed on the portions located under the transfer gate electrodes 114*a*. At this time, the charges are increased in high-field regions formed on interfaces between the portions located under the transfer gate electrodes 113*a* and the portions located under the transfer gate electrodes 114*a* by collisional ionization. The high-field region formed on the interface between the portion located under the transfer gate electrodes 113*a* and the portion located under the transfer gate electrode 114*a* is an example of the "increasing portion" in the present invention. The charges are repeatedly moved between the PDs 108 and the charge accumulation wells so that the charges are further increased.

The remaining operation of the twentieth embodiment is similar to that of the aforementioned fifteenth embodiment.

Although the present invention has been described and illustrated in detail, it is clearly understood that the same is by way of illustration and example only and is not to be taken by way of limitation, the spirit and scope of the present invention being limited only by the terms of the appended claims.

For example, while the pixels are divided into the three groups of the pixels having the high, middle and low luminance respectively so that the charges are output in each of the aforementioned first, sixth, fifteenth and eighteenth embodiments, the present invention is not restricted to this but the pixels may be divided into two or four or more groups so that the charges are output.

While the charges are increased in the portions located under the transfer gate electrodes 12 in each of the aforementioned first and fourth embodiments, the present invention is not restricted to this but the charges may be increased in the portions located under any transfer gate electrodes other than the transfer gate electrodes 12.

While the pixel group includes the plurality of pixels having the green (G) color sensitivity characteristics among the pixels having the RGB color sensitivity characteristics in the aforementioned thirteenth embodiment, the present invention is not restricted to this but the pixel group may be include a plurality of the pixels having red (R) or blue (B) color sensitivity characteristics. The color is not restricted to RGB, but the color may be composed of complementary color (cyan (C), magenta (M), yellow (Y)). Alternatively, no color filter may be mounted, that is, the color may be composed of white (W). The pixel group may include pixels having the same color sensitivity characteristics and different absolute quantities of pixel output (two pixels having the same color sensitivity characteristics and different sizes, for example), and these pixel output may be normalized.

While the frequency of increasing charges of one of two pixels having two green (G) color sensitivity characteristics respectively in the pixel group is fixed to 0 time in the aforementioned thirteenth embodiment, the present invention is not restricted to this but the frequency of increasing charges may be fixed to any value other than 0.

While the frequency of increasing charges of one of two pixels having the green (G) color sensitivity characteristics respectively in the pixel group is fixed to 0 time in the aforementioned thirteenth embodiment, the present invention is not restricted to this but one of the pixels may not be provided with an increasing portion.

While the charges are increased in the portions located under the transfer gate electrodes 113 in each of the aforementioned fifteenth and nineteenth embodiments, the present invention is not restricted to this but the charges may be increased under any transfer gate electrodes other than the transfer gate electrodes 113.

What is claimed is:

1. An image pickup apparatus comprising:
a plurality of pixels; and
increasing portions increasing charges stored in said pixels, wherein
the frequency of increasing the charges is controlled every group of at least one pixel in response to luminance of light incident upon said pixels by said increasing portions.

2. The image pickup apparatus according to claim 1, wherein
said control of the frequency of increasing the charges is so performed that the frequency of increasing the charges is reduced when a luminance value obtained from the luminance of the light incident upon said pixels is higher than a first luminance value level while the frequency of increasing the charges is increased when the luminance value obtained from the luminance of the light incident upon said pixels is lower than a second luminance value level.

3. The image pickup apparatus according to claim 1, wherein
each of said pixels includes a storage portion for storing the charges generated by photoelectric conversion, having a photoelectric conversion function, a read gate electrode for reading the charges from said pixel and a transfer gate electrode for transferring the charges stored in said storage portion, provided between said storage portion and said read gate electrode, wherein
said increase of the charges is performed under said transfer gate electrode.

4. The image pickup apparatus according to claim 3, wherein
said read gate electrode functions also as said transfer gate electrode in said increase of the charges.

5. The image pickup apparatus according to claim 1, wherein
each of said pixels includes a storage portion for storing the charges generated by photoelectric conversion, having a photoelectric conversion function and a transfer gate electrode for transferring the charges stored in said storage portion, provided adjacent to said storage portion, and
said increase of the charges is performed between said storage portion and said transfer gate electrode.

6. The image pickup apparatus according to claim 1, wherein
said plurality of pixels are composed of a plurality of pixels having color sensitivity characteristics and are divided into groups including two or more pixels having the same color sensitivity characteristics, and
the frequency of increasing charges of at least one of said two or more pixels having the same color sensitivity characteristics is fixed to 0 or a prescribed value, and the frequency of increasing charges is calculated by comparing output from said pixel where the frequency of increasing the charges is controlled and output from said pixel where the frequency of increasing the charges is fixed.

7. The image pickup apparatus according to claim 1, wherein
said control of the frequency of increasing the charges is performed every pixel.

8. The image pickup apparatus according to claim 1, wherein
said control of the frequency of increasing the charges is performed every frame.

9. The image pickup apparatus according to claim 1, further comprising a plurality of column decoders for reading the charges stored in said pixels, connected to said pixels.

10. The image pickup apparatus according to claim 1, wherein
said pixels further include voltage conversion portions each converting the charges to a voltage, and
each of said voltage conversion portions is provided for a plurality of said pixels.

11. The image pickup apparatus according to claim 1, further comprising exposure time changing portions changing the exposure time of said pixels, wherein
control of the frequency of increasing the charges stored in said pixels and control of the exposure time of said pixels are switched every group of at least one pixel in response to the luminance of the light incident upon said pixels.

12. The image pickup apparatus according to claim 11, wherein
sensitivity is adjusted by the control of the frequency of increasing the charges with said increasing portions when the luminance of the light incident upon said pixels is lower than a prescribed value, while the sensitivity is adjusted by the control of the exposure time of said pixels with said exposure time changing portion when the luminance of the light incident upon said pixels is higher than the prescribed value.

13. The image pickup apparatus according to claim 11, wherein
  each of said pixels includes a first transfer gate electrode having a function of transferring the charges and applying a voltage for increasing the charges.

14. The image pickup apparatus according to claim 11, wherein
  each of said pixels includes a storage portion for storing the charges generated by photoelectric conversion, having photoelectric conversion function and a second transfer gate electrode formed adjacent to said storage portion, transferring the charges and included in said exposure time changing portion, and
  said second transfer gate electrode controls the exposure time of said pixel.

15. The image pickup apparatus according to claim 14, wherein
  each of said pixels includes a first read gate electrode for reading a signal by the charges stored in said storage portion every row from said plurality of pixels and a second read gate electrode for reading the signal by the charges stored in said storage portion every column.

16. The image pickup apparatus according to claim 11, wherein
  each of said pixels includes a pixel control circuit switching control of said increasing portion and control of said exposure time changing portion.

17. The image pickup apparatus according to claim 11, wherein
  said control of the frequency of increasing the charges and said control of the exposure time of said pixels are performed every pixel.

18. The image pickup apparatus according to claim 11, wherein
  said control of the frequency of increasing the charges and said control of the exposure time of said pixels are performed every frame.

19. The image pickup apparatus according to claim 11, wherein
  said exposure time includes first exposure time shorter than usual exposure time and additional second exposure time.

20. An image pickup apparatus comprising:
  a plurality of pixels;
  increasing portions increasing charges stored in said pixels; and
  exposure time changing portions changing exposure time of said pixels, wherein
  control of the frequency of increasing the charges stored in said pixels and control of the exposure time of said pixels are switched every group of at least one pixel in response to luminance of light incident upon said pixels.

* * * * *